United States Patent
Matsuki et al.

(10) Patent No.: US 9,531,313 B2
(45) Date of Patent: Dec. 27, 2016

(54) APPARATUS FOR CONTROLLING CONTROLLED VARIABLE OF ROTARY MACHINE TO COMMAND VALUE

(71) Applicant: DENSO CORPORATION, Kariya, Aichi-pref. (JP)

(72) Inventors: Yousuke Matsuki, Chiryu (JP); Tomoya Takahashi, Kasugai (JP)

(73) Assignee: DENSO CORPORATION, Kariya (JP)

( * ) Notice: Subject to any disclaimer, the term of this patent is extended or adjusted under 35 U.S.C. 154(b) by 51 days.

(21) Appl. No.: 14/716,251

(22) Filed: May 19, 2015

(65) Prior Publication Data

US 2015/0333681 A1 Nov. 19, 2015

(30) Foreign Application Priority Data

May 19, 2014 (JP) ................................. 2014-103546

(51) Int. Cl.
| | | |
|---|---|---|
| H02P 21/00 | (2016.01) | |
| H02P 21/14 | (2016.01) | |
| H02P 21/06 | (2016.01) | |

(52) U.S. Cl.
CPC ....... H02P 21/0085 (2013.01); H02P 21/0035 (2013.01); H02P 21/06 (2013.01); H02P 21/148 (2013.01); H02P 21/22 (2016.02)

(58) Field of Classification Search
CPC ........................... H02P 21/0035; H02P 21/148
(Continued)

(56) References Cited

U.S. PATENT DOCUMENTS 5,872,435 A * 2/1999 Bolte ...................... H02P 6/06
                                                                318/400.13
6,583,593 B2 * 6/2003 Iijima ...................... H02P 6/183
                                                                318/400.02
(Continued)

FOREIGN PATENT DOCUMENTS

| JP | 2004-129381 | 4/2004 |
|---|---|---|
| JP | 2008-312420 | 12/2008 |

(Continued)

OTHER PUBLICATIONS

H. Sugimoto et al., "Factual Report on Theory and Design of AC Servo System", May 1990, 2 pages.

*Primary Examiner* — Bentsu Ro
(74) *Attorney, Agent, or Firm* — Nixon & Vanderhye PC

(57) ABSTRACT

In a control apparatus, an interference-reduction current calculator calculates, as an interference reduction current, a component of a current vector in a coordinate axis in a rotating coordinate system defined with respect to a rotor of the rotary machine. The current vector flows in the rotary machine, and the coordinate axis serves as an interference reduction coordinate axis in which the component of the current vector has reduced interference from change of the phase of the output voltage vector. An amplitude setter sets, as a manipulated variable for feedback controlling the interference reduction current to a command current value based on a command value for a controlled variable, one of: an amplitude of the output voltage vector, and an amplitude parameter indicative of a component of the output voltage vector. The component of the output voltage vector depends on the amplitude of the output voltage vector.

15 Claims, 20 Drawing Sheets

(58) Field of Classification Search
USPC .................. 318/448, 565, 609, 610, 611, 629
See application file for complete search history.

(56) References Cited

U.S. PATENT DOCUMENTS

| 7,057,361 B2* | 6/2006 | Kitahata | ............... H02M 5/458 |
| | | | 318/139 |
| 2009/0237021 A1 | 9/2009 | Yamamoto et al. | |
| 2010/0127656 A1 | 5/2010 | Ohtani et al. | |
| 2011/0181231 A1 | 7/2011 | Ito et al. | |
| 2011/0298403 A1 | 12/2011 | Yamamoto et al. | |

FOREIGN PATENT DOCUMENTS

| JP | 2009-232531 | 10/2009 |
| JP | 2010-088205 | 4/2010 |
| JP | 2012-023943 | 2/2012 |
| JP | 2012-085485 | 4/2012 |

* cited by examiner (N1<N2<N3)

FIG.8 COMPARATIVE EXAMPLE

COMPARATIVE EXAMPLE

FIRST EMBODIMENT

OCCURRENCE OF DISTURBANCE

COMPARATIVE EXAMPLE

OCCURRENCE OF DISTURBANCE

COMPARATIVE EXAMPLE

APPARATUS FOR CONTROLLING CONTROLLED VARIABLE OF ROTARY MACHINE TO COMMAND VALUE

CROSS REFERENCE TO RELATED APPLICATIONS

This application is based on and claims the benefit of priority from Japanese Patent Application 2014-103546 filed on May 19, 2014, the disclosure of which is incorporated in its entirety herein by reference.

TECHNICAL FIELD

The present disclosure relates to apparatuses for controlling a controlled variable of a rotary machine to a command value.

BACKGROUND

A typical apparatus for controlling a controlled variable of a rotary machine controls on and off operations of switching elements of a power converter, which are electrically connected to the rotary machine. This controls a value of the controlled variable to follow a command value. An example of such a control apparatus is disclosed in Japanese Patent Application Publication No. 2012-23943, which will be referred to as patent document 1.

The control apparatus disclosed in the patent document 1 uses a phase and amplitude of an output voltage vector of the power converter to control the controlled variable of the rotary machine to match with the command value; the amplitude of the controlled variable will also be called a norm hereinafter. The control apparatus disclosed in the patent document 1 determines a value of the amplitude of the output voltage vector using a map. The map includes a correlation of values of the amplitude of the output voltage vector with respect to values of a rotational speed of a rotor of the rotary machine. Reduction in the accuracy of the correlation of the map may thus result in reduction of the controllability of the rotary machine.

In order to address such controllability reduction, the control apparatus disclosed in the patent document 1 measures an actual value of a d-axis current flowing in the rotary machine and a command value of the d-axis current using a feedback loop. Then, the control apparatus calculates the difference between the actual value and the command value of the d-axis current, and calculates, based on the calculated difference, a correction value for the amplitude of the output voltage vector to thereby reduce the calculated difference. The amplitude correction aims to maintain, at a higher level, the controllability of the controlled variable of the rotary machine even if the accuracy of the correlation of the map decreases.

SUMMARY

The method of correcting the amplitude of the output voltage vector disclosed in the patent document 1 aims to maintain the controllability of the controlled variable of the rotary machine under a steady state condition of the rotary machine. Unfortunately, the method disclosed in patent document 1 fails to disclose or suggest an interference between the first control for the controlled variable based on the phase of the output voltage vector of the power converter, and the second control for the controlled variable based on the amplitude of the output voltage vector of the power converter. Such an interference may cause a disturbance having an influence on the amplitude of the output voltage vector to reduce the controllability of the controlled variable of the rotary machine.

Additionally, such an interference may also cause change of the rotary machine from the steady state condition to a transient condition to reduce the controllability of the controlled variable of the rotary machine. Thus, it is desirable to provide a creative idea to address the reduction in the controllability of a controlled variable of such a rotary machine.

In view of the circumstances set forth above, one aspect of the present disclosure seeks to provide apparatuses for controlling a rotary machine, which are designed, based on such a creative idea, to address the reduction in the controllability of a controlled variable of the rotary machine.

Specifically, an alternative aspect of the present disclosure aims to provide such apparatuses, each of which is capable of maintaining, at a higher level, the controllability of a controlled variable of a rotary machine even if a disturbance occurs and/or the rotary machine changes from the steady state condition to a transient condition; the disturbance has an influence on amplitude of an output voltage vector of a power converter.

According to a first exemplary aspect of the present disclosure, there is provided an apparatus for feedback controlling a controlled variable of a rotary machine based on a phase of an output voltage vector of a power converter including a switching element. The apparatus includes an interference-reduction current calculator configured to calculate, as an interference reduction current, a component of a current vector flowing in a coordinate axis in a rotating coordinate system defined with respect to a rotor of the rotary machine. The coordinate axis serves as an interference reduction coordinate axis, and the component of the current vector flowing in the interference reduction coordinate axis and having reduced interference from change of the phase of the output voltage vector. The apparatus includes an amplitude setter configured to set, as a manipulated variable for feedback controlling the interference reduction current to a command current value based on a command value for the controlled variable, one of:

(1) An amplitude of the output voltage vector, and (2) An amplitude parameter indicative of a component of the output voltage vector, the component of the output voltage vector depending on the amplitude of the output voltage vector. The apparatus includes a switching unit configured to perform switching operations of the switching element of the power converter based on the manipulated variable and the phase of the output voltage vector, thus causing the controlled variable to follow the command value.

According to a second exemplary aspect of the present disclosure, there is provided an apparatus for controlling a controlled variable of a rotary machine based on electric power converted by a power converter including a switching element. The apparatus includes a phase setter configured to set, as a first manipulated variable for feedback controlling the controlled variable to a command value, one of (1) A phase of an output voltage vector of the power converter in a rotating coordinate system defined with respect to a rotor of the rotary machine (2) A phase parameter indicative of one of a first component and a second component of the output voltage vector in an orthogonal coordinate system having a first axis and a second axis. The first axis and the second axis are perpendicular to each other. One of the first component and the second component depends on the phase of the output voltage vector. The apparatus includes an interference-reduction current calculator configured to calculate, as an interference-reduction current, a component of a current vector flowing in a coordinate axis in the rotating coordinate system. The coordinate axis serves as an interference reduction coordinate axis, and the component of the current vector flows in the interference reduction coordinate axis, and has reduced interference from change of the phase of the output voltage vector. The apparatus includes an amplitude setter configured to set, as a second manipulated variable for feedback controlling the interference reduction current to a command current value based on the command value, one of 1. An amplitude of the output voltage vector
2. An amplitude parameter indicative of the other of the first component and the second component of the output voltage vector in the orthogonal coordinate system. The other of the first component and the second component depends on the amplitude of the output voltage vector. The apparatus includes a switching unit configured to perform switching operations of the switching element of the power converter based on the first manipulated variable and the second manipulated variable to match the controlled variable with the command value.

The inventors of the present application have focused on a component of the current vector, which flows in the rotary machine, in the coordinate axis in the rotating coordinate system defined in the rotor. The coordinate axis serves as an influence reduction coordinate axis in which the component of the current vector has reduced influence from change of the phase of the output voltage vector. That is, performing feedback control of the controlled variable using the component of the current vector flowing in the coordinate axis (influence reduction coordinate axis) makes it possible to reduce an interference between (1) The feedback control based on the phase of the output voltage vector
(2) The feedback control based on the amplitude of the output voltage vector or amplitude parameter associated with the amplitude of the output voltage vector.

Thus, the control apparatus according to each of the first and second exemplary aspects improves the controllability of the controlled variable of the rotary machine even if a disturbance having an influence on the amplitude of the output voltage vector occurs, or the rotary machine changes from the steady state condition to a transient condition.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
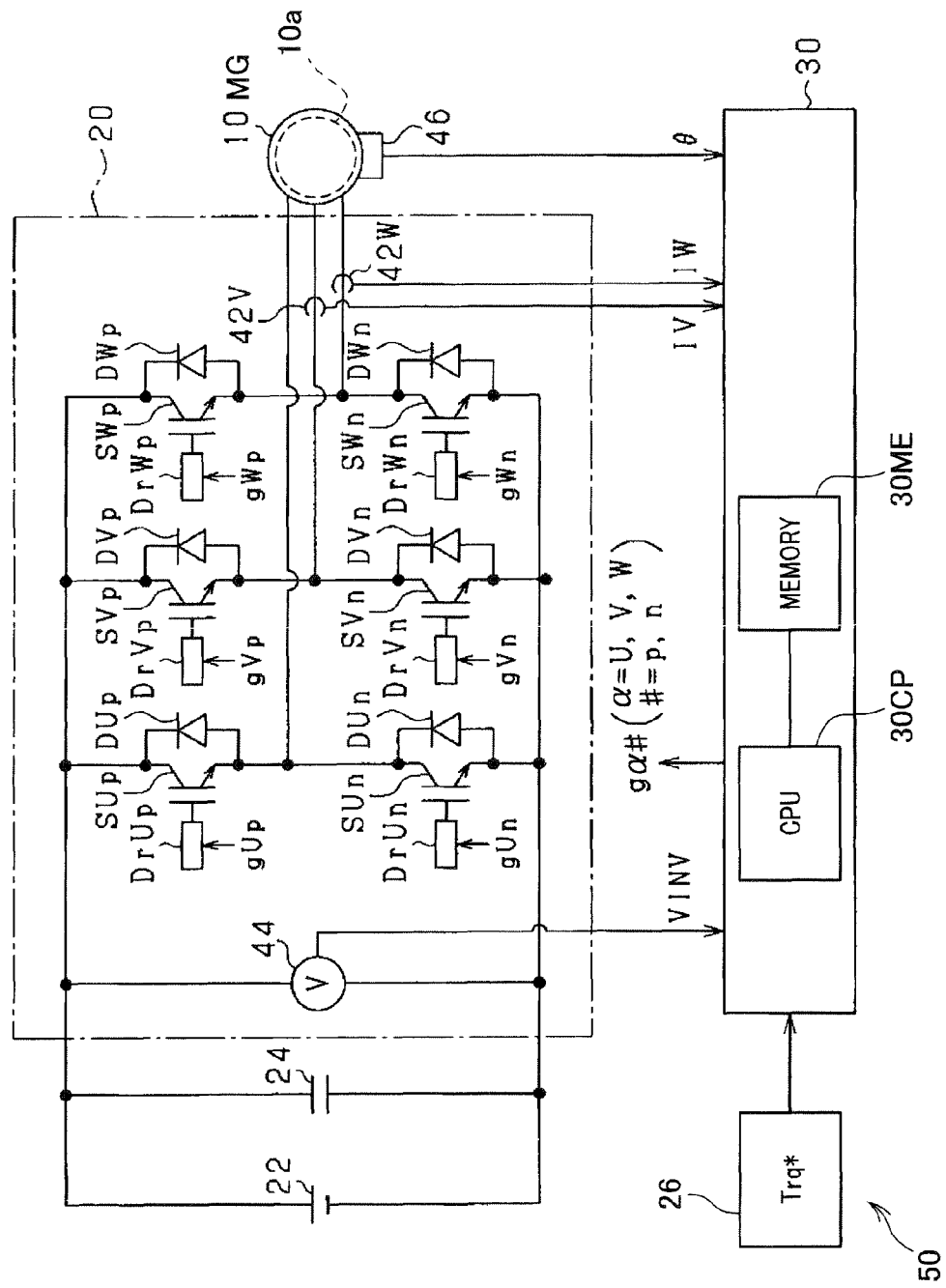
FIG. 1 is a circuit diagram of a control apparatus for controlling a motor-generator according to the first embodiment of the present disclosure.

Embodiments of the present disclosure will be described hereinafter with reference to the accompanying drawings. In the embodiments, like parts between the embodiments, to which like reference characters are assigned, are omitted or simplified to avoid redundant description.

First Embodiment

Referring to FIG. 1, there is illustrated a three-phase motor-generator, referred to simply as "motor-generator" 10 installed in a target vehicle as an example of rotary machines according to the present disclosure. In each of the first embodiment and the following embodiments, a motor having a salient-pole structure is used as the motor-generator 10. For example, an interior permanent magnet synchronous motor (IPMSM) is used as the motor-generator 10.

In FIG. 1, there is also illustrated a control system 50. The control system 50 is equipped with an inverter 20 serving as a power converter, a high-voltage battery 22 serving as a DC power supply, a smoothing capacitor 24, a control system 26, and a control apparatus CA.

The motor-generator 10 and the high-voltage battery 12 can establish electrical connection therebetween via the inverter 20.

For example, the motor-generator 10 is provided with an annular rotor 10a having an iron rotor core and rotatably disposed in the motor-generator 10. The iron rotor core is, for example, directly or indirectly coupled to a crankshaft of an engine installed in the target vehicle to be rotatable together with the crankshaft.

The rotor 10a has a salient-pole structure.

The rotor core of the rotor 10a is specifically provided at its circumferential portions with at least one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor 10a has a direct axis (d-axis) in line with a direction of magnetic flux created by the N pole, in other words, in line with an N-pole center line. The rotor 10a also has a quadrature axis (q-axis) with a phase being $\pi/2$-radian electrical angle leading with respect to a corresponding d-axis during rotation of the rotor 10a. In other words, the q-axis is electromagnetically orthogonal to the d-axis.

The d and q axes constitute a d-q coordinate system, i.e. a two-phase rotating coordinate system, defined relative to the rotor 10a of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor 10a.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings, i.e. armature windings, wound in the slots of the stator.

The three-phase windings, i.e. U-, V-, and W-phase windings, are wound in the slots such that the U-, V-, and W-phase windings are shifted, i.e. offset, by an electrical angle of, for example, $2\pi/3$ radian in phase from each other.

For example, the three-phase armature windings, i.e. U-, V-, and W-phase windings, each have one end connected to a common junction, i.e. a neutral point, and the other end to a separate terminal in, for example, a star-configuration.

The motor-generator 10 is operative to receive, at each of the three-phase windings, one of the three phase currents to thereby generate a rotating magnetic flux; this allows the rotor 10a to turn based on magnetic attractive force between the rotating magnetic flux and a magnetic flux of the rotor 10a.

The high-voltage battery 22 is capable of outputting a voltage equal to or higher than 100 V. The smoothing capacitor 24 is disposed between the high-voltage battery 22 and the inverter 20. The smoothing capacitor 24 is operative to smooth the output voltage from the high-voltage battery 22, and supply the smoothed output voltage to the inverter 20 as input voltage.

The inverter 20 is designed as a three-phase inverter. The inverter 20 is provided with a first pair of series-connected upper- and lower-arm (high- and low-side) switching elements SUp and SUn, a second pair of series-connected upper- and lower-arm switching elements SVp and SVn, and a third pair of series-connected upper- and lower-arm switching elements SWp and SWn. The inverter 20 is also provided with flywheel diodes DUp, DUn, DVp, DVn, DWp, and DWn electrically connected in antiparallel to the respective switching elements SUp, SUn, SVp, SVn, SWp, and SWn.

In the first embodiment, as the switching elements $S\alpha\#$ ($\alpha$=U, V, and W, and #=p and n), IGBTs are respectively used.

When power MOSFETs are used as the switching elements $S\alpha\#$, intrinsic diodes of the power MOSFETs can be used as the flywheel diodes, thus eliminating the need for external flywheel diodes.

The first to third pairs of switching elements are parallely connected to each other in bridge configuration.

A connection point through which the switching elements SUp and SUn of the first pair are connected to each other in series is connected to an output lead extending from the separate terminal of the U-phase winding. Similarly, a connection point through which the switching elements SVp and SVn of the second pair are connected to each other in series is connected to an output lead extending from the separate end of the V-phase winding. Moreover, a connection point through which the switching elements SWp and SWn of the third pair are connected to each other in series is connected to an output lead extending from the separate end of the W-phase winding.

One end of the series-connected switching elements of each of the first, second, and third pairs is connected to the positive terminal of the high-voltage battery 22 via a positive terminal of the inverter 20. The other end of the series-connected switching elements of each of the first, second, and third pairs is connected to the negative terminal of the high-voltage battery 22 via a negative terminal of the inverter 20.

The control system 50 also includes current sensors 42V and 42W, a voltage sensor 44, and a rotational angle sensor 46.

The current sensor 42V is arranged to allow measurement of an instantaneous V-phase alternating current iv actually flowing through the V-phase winding of the stator. Similarly, the current sensor 42W is arranged to allow measurement of an instantaneous W-phase alternating current iw actually flowing through the W-phase winding of the stator.

The current sensors 42V and 42W are communicable with the control apparatus CA.

Each of the current sensors 42V and 42W is operative to send, to the control apparatus CA, the instantaneous value of a corresponding one of the V-, and W-phase alternating currents.

The voltage sensor 44 is arranged to allow measurement of the input voltage, referred to as an input voltage VINV, to be supplied to the inverter 20 from the high-voltage power source 22 via the smoothing capacitor 24. The voltage sensor 42 is communicable with the control apparatus CA, and operative to send, to the control apparatus CA, the input voltage VINV.

The rotational angle sensor 46 includes, for example, a resolver. The rotational angle sensor 46 is configured to measure, i.e. monitor, a rotational angle, i.e. an electrical rotational angle, $\theta$ of the rotor 10a of the motor-generator 10; the rotational angle $\theta$ of the rotor 10a of the motor-generator 10 represents a rotational angle of the d-axis of the rotor 10a. The rotational angle sensor 46 is communicable with the control apparatus CA, and operative to send, to the control apparatus CA, the monitored rotation angle $\theta$ of the rotor 10a.

The control apparatus CA includes drivers Dr$\alpha$# and a controller 30. The drivers Dr$\alpha$# are connected to the control terminals of the respective switching elements S$\alpha$#, and to the controller 30. The controller 30 is designed as, for example, a computer circuit including essentially of for example, a CPU 30CP and a memory 30ME serving as, for example, a storage according to the present disclosure.

The controller 30 is connected to the control system 26 for inputting, to the control apparatus CA, request torque, i.e. command torque, Trq* for the motor-generator 10. For example, a controller, which is higher in hierarchy than the controller 30, can be used as the control system 26 if the controllers are arranged in a hierarchical relationship.

The controller 30 is designed to receive the measured values output from the sensors 42V, 42W, 44, and 46, and the request torque Trq* as received pieces of data. Then, the controller 30 is designed to periodically generate, based on the received pieces of data set forth above, drive signals, i.e. pulse-width modulated (PWM) signals, g$\alpha$# for individually driving the respective switching elements S$\alpha$# of the inverter 20. The period for generating the drive signals g$\alpha$# will be referred to a drive-signal generation period hereinafter.

The controller 30 is designed to supply the drive signals g$\alpha$# to the respective drivers Dr$\alpha$#. The drivers Dr$\alpha$# are operative to output the drive signals g$\alpha$# to the control terminals of the respective switching elements S$\alpha$# of the inverter 20.

This individually turns on or off the respective switching elements S$\alpha$#, thus converting the input voltage VINV into a controlled AC voltage, so that the controlled AC voltage is supplied to the motor-generator 10. The drive signals g$\alpha$# aim to switch the respective switching elements S$\alpha$# to feedback control at least one controlled variable, such as torque, generated by the motor-generator 10 so that the at least one controlled variable matches the request torque Trq*.

For example, the controller 30 outputs the drive signals g$\alpha$# that complementarily turns on the upper- and lower-arm switching elements S$\alpha$p and S$\alpha$n of each pair while dead times during which the upper- and lower-arm switching elements S$\alpha$p and S$\alpha$n are simultaneously turned off are ensured. Introducing the dead time prevents the upper and lower-arm switching elements S$\alpha$p and S$\alpha$n from being simultaneously on.

Each of the drive signals g$\alpha$# has a predetermined duty factor, i.e. a controllable on-pulse width for each switching cycle, in other words, a predetermined ratio, i.e. percentage, of on duration to the total duration of each switching cycle for a corresponding one of the switching elements S$\alpha$#.

Next, an example of the specific structure of the controller 30 for performing torque control, i.e. torque feedback control, including amplitude control and phase control will be described with reference to FIG. 2.

Figure 2:
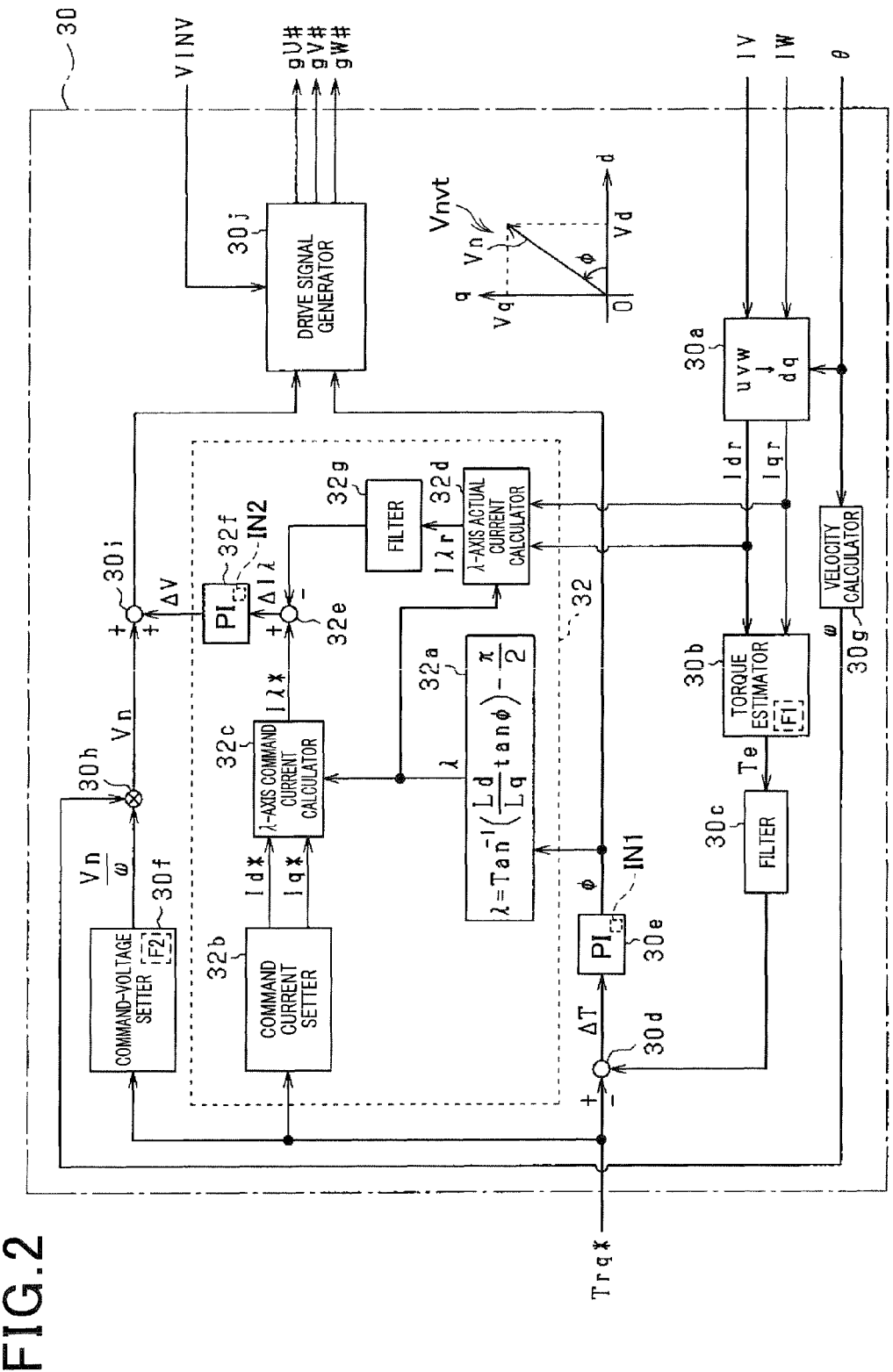
FIG. 2 is a block diagram schematically illustrating an example of the specific structure of a controller of the control apparatus according to the first embodiment.

As illustrated in FIG. 2, the controller 30 includes a two-phase converter 30a, a torque estimator 30b, a filter 30c, a torque deviation calculator 30d, a phase setter 30e, a command voltage setter 30f, a velocity multiplier 30h, a corrector 30i, a drive signal generator 30j, and a correction calculator 32.

For example, the modules 30a to 30j and 32 cooperatively operate to carry out the torque control including the phase control and the amplitude control described in detail hereinafter. The modules 30a to 30j and 32 can be implemented as hardware modules, software modules, and hardware-software hybrid modules.

First, operations of some of the modules 30a to 30j and 32 for performing mainly the phase control will be described.

The two-phase converter 30a receives instantaneous V- and W-phase currents Iv and Iw measured by the respective current sensors 42V and 42W and the rotational angle $\theta$ of the d-axis of the rotor 10a measured by the rotational angle sensor 46.

The two-phase converter 30a, which serves as, for example, an actual current calculator, calculates an instantaneous U-phase current Iu based on the instantaneous V- and W-phase currents Iv and Iw in accordance with Kirchhoff's law. Then, the two-phase converter 30a converts the instantaneous U-, V-, and W-phase currents Iu, Iv, and Iw in a three-phase fixed-coordinate system into d- and q-axis currents Idr and Iqr in the d-q coordinate system of the rotor 10a based on the rotational angle $\theta$ of the rotor 10a. The stator coordinate system is fixedly defined relative to the stator; the stator coordinate system has fixed three axes corresponding to the three-phase windings of the stator. The two-phase converter 30a performs the conversion using correlations between the d-q coordinate system and the stator coordinate system as a function of the rotational angle θ.

The torque estimator 30b is operatively connected to the two-phase converter 30a. The torque estimator 30b is operative to calculate estimated torque Te for torque actually created by the motor-generator 10 based on the d-axis and q-axis currents Idr and Iqr input from the two-phase converter 30a.

For example, the torque estimator 30b calculates the estimated torque Te using, for example, information F1 including a map in data-table format and/or one or more model equations. When the information F1 includes a map, the map, which is for example stored in the memory 30ME, includes a function, i.e. correlation, of values of the estimated torque Te with respect to the pair of values of the d-axis current Idr, and values of the q-axis current Iqr. The torque estimator 30b can retrieve a value of the estimated torque Te corresponding to values of the d-axis and q-axis currents Idr and Iqr in the map.

When the information F1 includes one or more model equations, the one or more model equations are defined based on variables of the d-axis and q-axis currents Idr and Iqr. The torque estimator 30b can assign values of the d-axis and q-axis currents Idr and Iqr to the one or more model equations, thus calculating estimated torque Te.

The filter 30c is operatively connected to the torque estimator 30b, and is designed as, for example, a low-pass filter that eliminates high-frequency components, which are higher than a predetermined threshold frequency, from the estimated torque Te calculated by the torque estimator 30b. Hereinafter, a value of the estimated torque Te, from which the high-frequency components have been eliminated, will be referred to as corrected estimated torque Te hereinafter.

The torque deviation calculator 30d is operatively connected to the filter 30c, and subtracts the corrected estimated torque Te from the request torque Trq* to thereby calculate a torque deviation ΔT between the corrected estimated torque Te and the request torque Trq*.

The phase setter 30e is operatively connected to the torque deviation calculator 30d. The phase setter 30e sets, i.e. calculates, based on the torque deviation ΔT, a phase φ of an output voltage vector Vnvt of the inverter 20 in the d-q coordinate system. That is, the phase φ of the output voltage vector Vnvt serves as a manipulated variable for feedback controlling the corrected estimated torque Te to match with the request torque Trq*. The voltage vector Vnvt has a d-axis voltage component Vd and a q-axis voltage component Vq in the d-q coordinate system (see FIG. 2).

Specifically, the phase setter 30e according to the first embodiment calculates the phase φ of the output voltage vector Vnvt in accordance with a predetermined proportional gain Kpφ and a predetermined integral gain Kiφ, i.e. feedback gains Kpφ and Kiφ, of a proportional-integral (PI) feedback control algorithm (PI algorithm) using the torque deviation ΔT as its input.

In the PI algorithm, the phase φ of the output voltage vector Vnvt is expressed based on the sum of an output φp, i.e. a proportional gain term, of a proportional unit based on the proportional gain Kpφ and an output φi, i.e. an integral gain term, of an integrator IN1 based on the integral gain Kiφ.

The proportional gain Kpφ for the phase φ of the output voltage vector Vnvt contributes to change in the phase φ of the output voltage vector Vnvt in proportion to the temporal torque deviation ΔT from a target value of zero.

The integral gain Kiφ is proportional to an accumulated offset of instantaneous values of the torque deviation ΔT over time to reset the accumulated offset (steady-state deviation) over time to zero.

Note that, for the proportional gain Kpφ, simulations and/or experiments using, for example, the control apparatus 50 have been performed, so that a constant value has been determined to be set to the proportional gain Kpφ. The constant value of the proportional gain Kpφ will also be referred to as a basic proportional gain hereinafter. Similarly, for the integral gain Kiφ, simulations and/or experiments using, for example, the control apparatus 50 have been performed, so that a constant value has been determined to be set to the integral gain Kiφ. The constant value of the integral gain Kiφ will also be referred to as a basic integral gain hereinafter.

The phase φ of the output voltage vector Vnvt, which will be referred to as a voltage phase φ, is defined such that a counter clockwise rotational direction from the positive side of the d-axis toward the positive side of the q-axis represents the positive direction of the voltage phase φ (see FIG. 2). The phase setter 30e advances, in accordance with the definition of the voltage phase φ, the voltage phase φ when the corrected estimated torque Te is lower than the request torque Trq*. The phase setter 30e also delays, in accordance with the definition of the voltage phase φ, the voltage phase φ when the corrected estimated torque Te is higher than the request torque Trq*.

Figure 3:
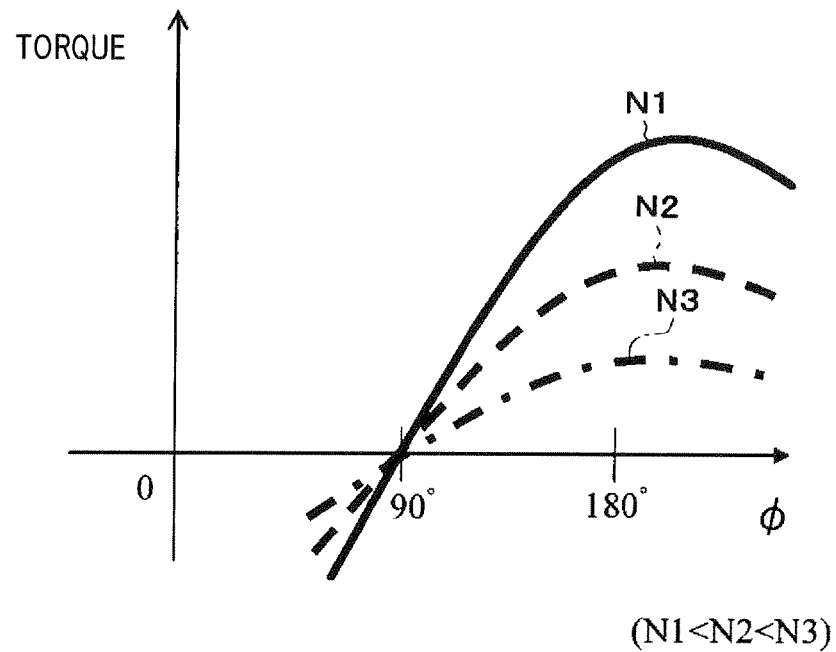
FIG. 3 is a graph schematically illustrating a correlation between torque of the motor-generator and a phase of an output voltage vector of an inverter illustrated in FIG. 1, referred to as a voltage phase.

Note that FIG. 3 also illustrates that the torque generated by the motor-generator 10 depends on the rotational speed, i.e. the electrical angular velocity ω, of the rotor 10a of the motor-generator 10.

Next, operations of some of the modules 30a to 30j and 32 for performing mainly the amplitude control will be described.

The command-voltage setter 30f has, for example, information F2 in data-table (map) format, in mathematical expression format, and/or program format. The information F2, which is for example stored in the memory 30ME, includes a function, i.e. a correlation, of values of a normalized amplitude Vn/ω of the output voltage vector Vnvt in the d-q coordinate system with respect to values of the request torque Trq*. The amplitude Vn of the output voltage vector Vnvt of the inverter 20 is defined as the square root of the sum of the square of the d-axis voltage component Vd and the square of the q-axis voltage component Vq of the output voltage vector Vnvt. The normalized amplitude Vn/ω of the output voltage vector Vnvt represents division of the command value of the amplitude Vn of the output voltage vector Vnvt from the inverter 20 by the electrical angular velocity ω of the rotor 10a.

The velocity calculator 30g is operatively connected to the command-voltage setter 30f, and calculates the electrical angular velocity ω of the rotor 10a based on the rotational angle θ of the rotor 10a measured by the rotational angle sensor 46.

The velocity multiplier 30h is operatively connected to the command-voltage setter 30f and to the velocity calculator 30g, and multiplies the normalized command-voltage amplitude Vn/ω by the electrical angular velocity ω. This multiplication calculates a value of the amplitude Vn of the output voltage vector Vnvt. The value of the amplitude Vn of the output voltage vector Vnvt serves as a manipulated variable for feedforward controlling the torque of the motor-generator 10 to match with the request torque Trq*.

The corrector 30*i* is operatively connected to the velocity multiplier 30*h*, and adds, to the value of the amplitude Vn of the output voltage vector Vnvt output from the velocity multiplier 30*h*, an amplitude correction ΔV calculated by the correction calculator 32. This addition calculates the sum of the value of the amplitude Vn of the output voltage vector Vnvt and the amplitude correction ΔV, as a correction value of the value of the amplitude Vn of the output voltage vector Vnvt. The sum of the value of the amplitude Vn of the output voltage vector Vnvt and the amplitude correction ΔV will be referred to as a corrected voltage amplitude (Vn+ΔV) hereinafter. Detailed operations of the correction calculator 32 will be described later.

The drive signal generator 30*j* is operatively connected to the phase setter 30*e* and the corrector 30*i*. The drive signal generator 30*j*, which serves as, for example, a switching unit, calculates a modulation factor M based on normalization of the input voltage VINV using the value of the voltage amplitude Vn. Specifically, the drive signal generator 30*j* divides the value of the voltage amplitude Vn by half of the input voltage VINV to obtain a quotient, and divides the quotient by $\sqrt{1.5}$, i.e.

$$\sqrt{\frac{3}{2}},$$

thus calculating the modulation factor M.

When the modulation factor M becomes a value equal to or smaller than a first specified value Ma of, for example, 1.15, the drive signal generator 30*j* generates the drive signals gα# in accordance with sinusoidal PWM control.

Specifically, the drive signal generator 30*j* converts the voltage amplitude Vn and the phase φ of the output voltage vector Vnvt into a command d-axis voltage Vd* and a command q-axis voltage Vq*. Then, the drive signal generator 30*j* transforms, based on the rotational angle θ of the rotor 10*a*, the command d- and q-axis voltages Vd* and Vq* into three-phase sinusoidal command voltages that are shifted by an electrical angle of 2π/3 radian, i.e. 120 electrical degrees, in phase from each other.

Successively, the drive signal generator 30*j* compares in amplitude each of the three-phase sinusoidal command voltages with a carrier signal, such as a triangular carrier signal, which has an amplitude predetermined based on an amplitude of each of the three-phase sinusoidal command voltages, thus generating the drive signals gα#. The drive signals gα# control on and off operations of the switching elements Sα#, thus causing the output voltage, i.e. a line-line voltage, of the inverter 20 to have a pseudo sinusoidal waveform with the electrical angular velocity ω.

When the modulation factor M becomes a value greater than the first specified value Ma and smaller than a second specified value Mb of, for example, 1.27, that is greater than the first specified value Ma, the drive signal generator 30*j* generates the driving signals gα# based on the torque control including the amplitude control and the phase control set forth above. The torque control, i.e. torque feedback control, including the amplitude control and the phase control will be referred to as an over-modulation torque control, in other words, an over-modulation torque feedback control.

Specifically, the drive signal generator 30*j* converts the corrected voltage amplitude (Vn+ΔV) and the phase φ of the output voltage vector Vnvt into a command d-axis voltage Vd* and a command q-axis voltage Vq*. Then, the drive signal generator 30*j* transforms, based on the rotational angle θ of the rotor 10*a*, the command d- and q-axis voltages Vd* and command q-axis voltage Vq* into three-phase sinusoidal command voltages that are shifted by an electrical angle of 2π/3 radian in phase from each other.

That is, the amplitude of each of the three-phase sinusoidal command voltages in the over-modulation torque control is higher than the amplitude of the carrier signal.

Successively, the drive signal generator 30*j* compares in amplitude each of the three-phase sinusoidal command voltages with a carrier signal, such as a triangular carrier signal, which has an amplitude predetermined based on an amplitude of each of the three-phase sinusoidal command voltages, thus generating the drive signals gα#. The drive signals gα# control on and off operations of the switching elements Sα#, thus causing the output voltage, i.e. the line-to-line voltage, of the inverter 20, which is applied to the motor-generator 10, to have a distorted sinusoidal waveform. That is, a fundamental component of the output voltage of the inverter 20 in the over-modulation torque control has an amplitude and a root-mean-square (rms) value greater than respective amplitude and an rms value of a fundamental component of the output voltage of the inverter 20 for the sinusoidal PWM control.

In particular, when the modulation factor M becomes equal to or greater than the second specified value Mb, the drive signal generator 30*j* generates the driving signals gα# based on rectangular-pulse torque control including the phase control. When the modulation factor M becomes equal to or greater than the second specified value Mb, the amplitude of the output voltage of the inverter 20 is fixed to the input voltage VINV. In the rectangular-pulse torque control, the drive signals gα# generates on-off pulse patterns of the switching elements Sα# such that the ratio of an on duration to an off duration for each of the switching elements Sα# are set to 1:1 every period of the electrical rotational angle θ of the rotor 10*a*.

Next, how to design the correction calculator 32 will be described hereinafter with reference to FIGS. 4 to 6.

A voltage equation for a permanent-magnet synchronous motor is expressed by the following equation [eq1]:

$$\begin{bmatrix} Vd \\ Vq \end{bmatrix} = \begin{bmatrix} p \cdot Ld + R & -\omega \cdot Lq \\ \omega \cdot Ld & p \cdot Lq + R \end{bmatrix} \begin{bmatrix} Idr \\ Iqr \end{bmatrix} + \begin{bmatrix} 0 \\ \omega \cdot \psi \end{bmatrix} \qquad [eq1]$$

Where p represents a differential operator, R represents the resistance of each-phase armature winding, Ld represents the inductance in the d-axis, Lq represents the inductance in the q-axis, and ψ represents an rms value of permanent-magnet flux linkage to each-phase armature winding.

A steady state of the motor-generator 10, in which the rpm of the rotor 10*a* is kept constant, permits a transient state of the motor-generator 10 to be ignorable, resulting in the value of the differential operator p being set to zero. In the steady state of the motor-generator 10, it is assumed that the following conditions are satisfied:

(1) The rpm of the rotor 10*a* of the motor-generator 10 is a sufficiently high value (2) The resistance R of each-phase armature winding is sufficiently smaller than a value of ω·Ld, which is expressed by R<<ω·Ld (3) The resistance R of each-phase armature winding is sufficiently smaller than a value of ω·Lq, which is expressed by R<<ω·Lq.

This assumption permits the following voltage equation [eq2] to be derived from the voltage equation [eq1]:

$$\begin{bmatrix} Vd \\ Vq \end{bmatrix} = \begin{bmatrix} 0 & -\omega \cdot Lq \\ \omega \cdot Ld & 0 \end{bmatrix} \begin{bmatrix} Idr \\ Iqr \end{bmatrix} + \begin{bmatrix} 0 \\ \omega \cdot \psi \end{bmatrix} \quad [eq2]$$

The correspondence among the d- and q-axis voltage components Vd and Vq, the voltage phase φ, and the value of the amplitude Vn of the output voltage vector Vnvt is given by the following equation [eq3]:

$$\begin{bmatrix} Vd \\ Vq \end{bmatrix} = \begin{bmatrix} Vn \cdot \cos\phi \\ Vn \cdot \sin\phi \end{bmatrix} \quad [eq3]$$

A voltage equation of a permanent-magnet synchronous motor when the voltage phase φ changes by an infinitesimal value Δφ is expressed by the following equation [eq4] based on the equations [eq2] and [eq3]:

$$\begin{bmatrix} Vd\phi \\ Vq\phi \end{bmatrix} = \begin{bmatrix} 0 & -\omega \cdot Lq \\ \omega \cdot Ld & 0 \end{bmatrix} \begin{bmatrix} Id\phi \\ Iq\phi \end{bmatrix} + \begin{bmatrix} 0 \\ \omega \cdot \psi \end{bmatrix} \quad [eq4]$$

Where $Vd\phi = Vn \cos(\phi + \Delta\phi) = Vn(\cos\phi \cos\Delta\phi - \sin\phi \sin\Delta\phi) \approx Vd - \Delta\phi \cdot Vn \sin\phi$ $Vq\phi = Vn \sin(\phi + \Delta\phi) = Vn(\sin\phi \cos\Delta\phi + \cos\phi \sin\Delta\phi) \approx Vq + \Delta\phi \cdot Vn \cos\phi$ Subtracting the equation [eq2] from the equation [eq4] derives the following equation [eq5]:

$$\begin{bmatrix} Vd\phi - Vd \\ Vq\phi - Vq \end{bmatrix} = \begin{bmatrix} 0 & -\omega \cdot Lq \\ \omega \cdot Ld & 0 \end{bmatrix} \begin{bmatrix} Id\phi - Idr \\ Iq\phi - Iqr \end{bmatrix} \quad [eq5]$$

The value (idφ−Idr) at the right side of the equation [eq5] represents a d-axis current change ΔIdφ, and the value (Iqφ−Iqr) at the right side of the equation [eq5] represents a q-axis current change ΔIqφ. Solving the equation [eq5] in terms of the d-axis current change ΔIdφ and the q-axis current change ΔIqφ derives the following equation [eq6]:

$$\begin{bmatrix} \Delta Id\phi \\ \Delta Iq\phi \end{bmatrix} = \begin{bmatrix} 0 & -\omega \cdot Lq \\ \omega \cdot Ld & 0 \end{bmatrix} \begin{bmatrix} Vd\phi - Vd \\ Vq\phi - Vq \end{bmatrix} = \frac{Vn}{\omega}\begin{bmatrix} \dfrac{\cos\phi}{Ld} \\ \dfrac{\sin\phi}{Lq} \end{bmatrix} \Delta\phi \quad [eq6]$$

Figure 4:
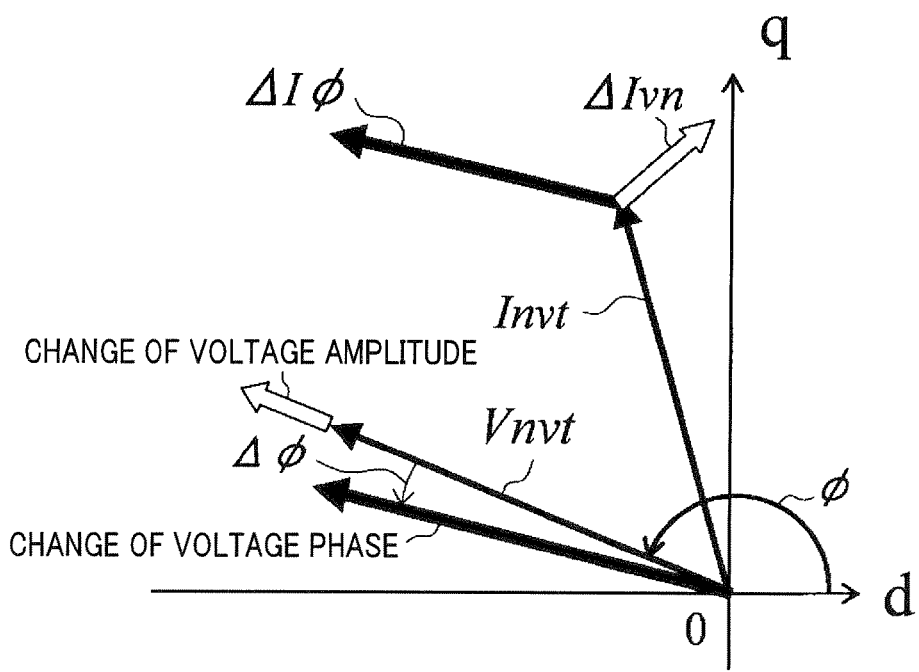
FIG. 4 is a graph schematically illustrating change of a current vector depending on an infinitesimal change of the voltage phase, and change of the current vector as a result of an infinitesimal change of the amplitude of the output voltage vector.

FIG. 4 illustrates the voltage vector Vnvt having the voltage phase φ and a current vector Invt based on the voltage vector Vnvt. A current vector Invt is defined as the square root of the sum of the square of a d-axis current Idr and the square of a q-axis current Iqr. FIG. 4 also illustrates change of the current vector Invt depending on an infinitesimal change Δφ of the voltage phase φ using reference character ΔIφ. FIG. 4 further illustrates change of the current vector Invt depending on an infinitesimal change ΔVn of the amplitude Vn of the output voltage vector Vnvt using reference character ΔIvn.

Figure 5:
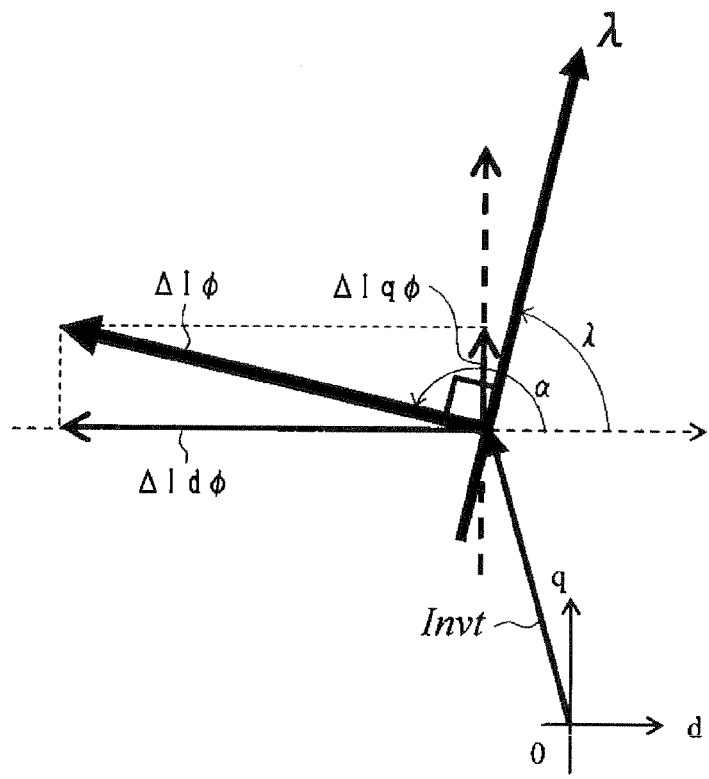
FIG. 5 is a graph, which is an enlarged view of the change the current vector depending on the infinitesimal change of the voltage phase illustrated in FIG. 4.

FIG. 5 is an enlarged view of the change ΔIφ of the current vector Invt depending on the infinitesimal change Δφ of the voltage phase φ. The equation [eq6] permits the change direction a of the current vector Invt with respect to the d-axis depending on the infinitesimal change Δφ of the voltage phase φ to be expressed by the following equation [eq7]:

$$\alpha = \tan^{-1}\left(\frac{\Delta Iq\phi}{\Delta Id\phi}\right) = \tan^{-1}\left(\frac{Ld}{Lq}\tan\phi\right) \quad [eq7]$$

FIG. 5 shows that the arctangent operation in the equation [eq7] permits the change direction α of the current vector Invt with respect to the d-axis to be calculated between −π and +π inclusive.

The controller 30 according to the first embodiment particularly calculates the change direction α of the current vector Invt with respect to the d-axis as +π/2 when the denominator of $$\frac{\Delta Iq\phi}{\Delta Id\phi}$$

at the right side of the equation [eq7] becomes zero and the numerator thereof becomes a positive value. The controller 30 according to the first embodiment also calculates the change direction α of the current vector Invt with respect to the d-axis as −π/2 when the denominator of $$\frac{\Delta Iq\phi}{\Delta Id\phi}$$

at the right side of the equation [eq7] becomes zero and the numerator thereof becomes a negative value.

Figure 6:
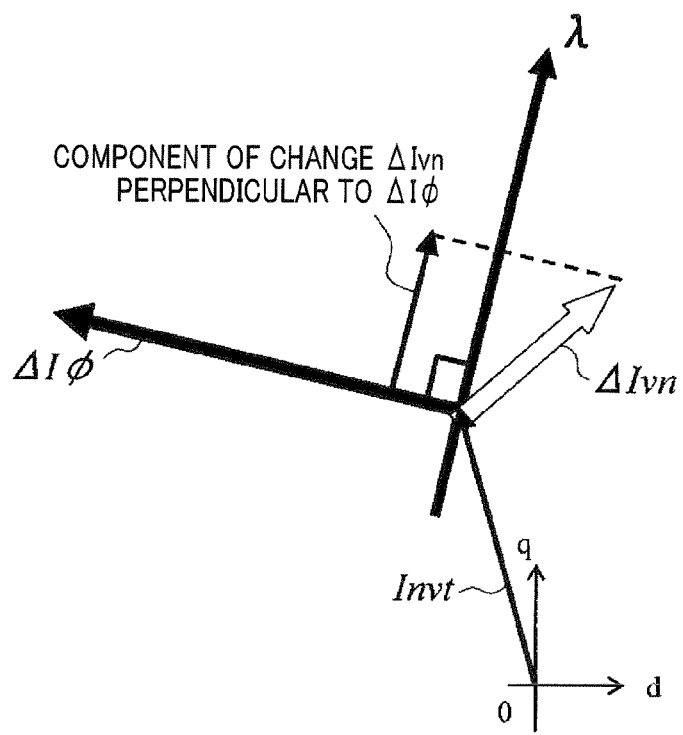
FIG. 6 is a graph schematically illustrating an λ-axis extending perpendicularly with respect to the changing direction of the current vector according to the first embodiment.

FIG. 6 illustrates a coordinate axis, which is referred to as a λ-axis, extending perpendicularly with respect to the changing direction of the current vector Invt. A λ-axis component of the change ΔIvn of the current vector Invt depending on the infinitesimal change ΔVn of the amplitude Vn of the output voltage vector Vnvt means a component of the change ΔIvn of the current vector Invt projected on the λ-axis. The λ-axis component of the change ΔIvn of the current vector Invt illustrated in FIG. 6 is a current independent from change of the voltage phase φ. The correction calculator 32 according to the first embodiment is designed to use the λ-axis component of the change ΔIvn of the current vector Invt for calculation of the amplitude correction ΔV. Using the λ-axis component of the change ΔIvn of the current vector Invt permits interference between the amplitude control and the phase control to be reduced. The angle λ between the d-axis and the X-axis, which is required to set the λ-axis, is expressed by the following equation [eq8]:

$$\lambda = \alpha - \frac{\pi}{2} = \tan^{-1}\left(\frac{Ld}{Lq}\tan\phi\right) - \frac{\pi}{2} \quad [eq8]$$

Next, an example of the functional structure of the correction calculator 32 based on the design concept set forth above will be described with reference to FIG. 2.

The correction calculator 32 includes a λ-axis setter 32a, a command current setter 32b, a λ-axis command current calculator 32c, a λ-axis actual current calculator 32d, a current deviation calculator 32e, an amplitude correction calculator 32f, and a filter 32g.

The λ-axis setter 32a is operatively connected to the phase setter 30e. The λ-axis setter 32a, which serves as, for example, an interference-reduction coordinate axis setter, calculates, based on the d- and q-axis inductances Ld and Lq, the voltage phase φ output from the phase setter 30e, the angle λ between d-axis and the λ-axis in accordance with the equation [eq8].

The λ-axis setter 32a serves as means, i.e. a unit, for setting an interference reduction axis, i.e. a non-interference axis or an independent axis, in the d-q coordinate system. That is, the λ-axis setter 32a sets the λ-axis. The λ-axis is configured such that a component of change of the current vector Invt, which is projected on the λ-axis, has reduced interferences, for example, no interferences or little interference, from change of the voltage phase φ. In other words, the component of change of the current vector Invt projected on the λ-axis is sufficiently free from interferences from change of the voltage phase φ. The λ-axis set by the λ-axis setter 32a changes depending on change of the driven conditions of the motor-generator 10. Note that the feature that the component of change of the current vector Invt, which is projected on the λ-axis, causes reduced interferences from change of the voltage phase φ can include that both (1) The λ-axis does not interfere at all from change of the voltage phase φ

(2) The λ-axis allows a minimum level of interference from change of the voltage phase φ unless the minimum level of interference reduces the controllability of the controlled variable, such as the estimated torque Te, of the motor-generator 10.

The command current setter 32b sets a d-axis command current Id* and a q-axis command current Iq* that carry out maximum torque control. Note that the maximum torque control is designed to always achieve a maximum torque at any value of the current vector Invt, in other words, most efficiently achieve the torque of the motor-generator 10 at any value of the current vector Invt.

Specifically, the command current setter 32b sets the d-axis command current Id* and a q-axis command current Iq* in accordance with the following equation [eq8a]:

$$Id^* = \frac{\psi}{2(Lq - Ld)} - \sqrt{\frac{\psi^2}{4(Lq - Ld)^2} + Iq^{*2}}$$ [eq8a]

For example, the maximum torque control is described on page 23 of "Design and Control of Interior Permanent Magnet Synchronous motor" authored by Takeda et al and published by Ohmsha, Ltd, at page 23.

The λ-axis command current calculator 32c is operatively connected to the λ-axis setter 32a and the command current setter 32b. The λ-axis command current calculator 32c calculates, based on the angle λ set by the λ-axis setter 32a and the d- and q-axis command currents Id* and Iq* set by the command current setter 32b, a λ-axis command current Iλ* in accordance with the following equation [eq9] (see FIG. 7):

$$I\lambda^* = Id^* \cdot \cos \lambda + Iq^* \cdot \sin \lambda$$ [eq9]

Figure 7:
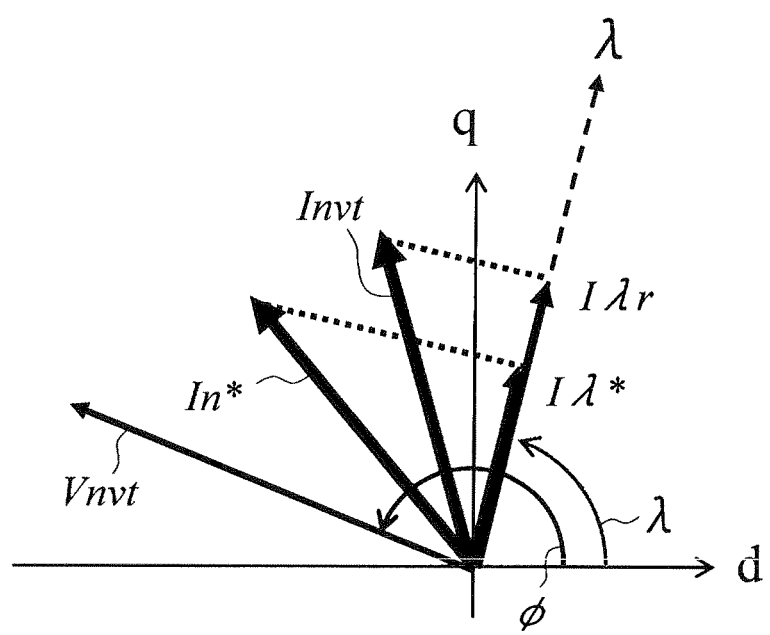
FIG. 7 is a graph schematically illustrating a λ-axis command current in a d-q-coordinate system according to the first embodiment.

Note that FIG. 7 illustrates an actual command current vector In* having the d- and q-axis axis command currents Id* and Iq*, and a present current vector Ivnt having a d-axis current Idr and a q-axis current Iqr actually obtained by the two-phase converter 30a.

The λ-axis actual current calculator 32d is operatively connected to the two-phase converter 30a and the λ-axis setter 32a. The λ-axis actual current calculator 32d, which serves as, for example, an influence-reduction current calculator, calculates, based on the d-axis and q-axis currents Idr and Iqr obtained by the two-phase converter 30a and the angle λ set by the λ-axis setter 32a, an actual λ-axis current Iλr in accordance with the following equation [eq10] (see FIG. 7):

$$I\lambda r = Idr \cdot \cos \lambda + Iqr \cdot \sin \lambda$$ [eq10]

The filter 32g is operatively connected to the λ-axis actual current calculator 32d, and is designed as, for example, a low-pass filter that eliminates high-frequency components higher than a predetermined threshold frequency from the λ-axis current Iλr actually obtained by the λ-axis actual current calculator 32d. Hereinafter, a value of the λ-axis current Iλr, from which the high-frequency components have been eliminated, will be referred to as a corrected λ-axis current Iλr hereinafter.

The current deviation calculator 32e is operatively connected to the filter 32g and the λ-axis command current calculator 32c. The current deviation calculator 32e subtracts the corrected λ-axis current Iλr from the λ-axis command current Iλ* to thereby calculate a current deviation ΔIλ between the corrected λ-axis current Iλr and the λ-axis command current iλ*.

The amplitude correction calculator 32f is operatively connected to the current deviation calculator 32e. The amplitude correction calculator 32f, which serves as, for example, an amplitude setter, calculates, based on the current deviation ΔIλ, the amplitude correction ΔV serving as a manipulated variable for feedback controlling the corrected λ-axis current Iλr to match with the λ-axis command current Iλ*, in other words, for feedback controlling the corrected estimated torque Te to match with the request torque Trq*.

Specifically, in the first embodiment, the amplitude correction calculator 32f calculates the amplitude correction ΔV in accordance with a predetermined proportional gain Kpλ and a predetermined integral gain Kiλ of a PI feedback control algorithm (PI algorithm) using the current deviation ΔIλ as its input.

In the PI algorithm, the amplitude correction ΔV is expressed based on the sum of an output ΔVpro, i.e. a proportional gain term, of a proportional unit based on the proportional gain Kpλ and an output ΔVi, i.e. an integral gain term, of an integrator IN2 based on the integral gain Kiλ.

The proportional gain Kpλ for the amplitude correction ΔV contributes to change in the amplitude correction ΔV in proportion to the temporal current deviation ΔIλ from a target value of zero.

The integral gain Kiλ is proportional to an accumulated offset of instantaneous values of the current deviation ΔIλ over time to reset the accumulated offset (steady-state deviation) over time to zero.

Note that, for the proportional gain Kpλ, simulations and/or experiments using, for example, the control apparatus 50 have been performed, so that a constant value has been determined to be set to the proportional gain Kpλ. The constant value of the proportional gain Kpλ will also be referred to as a basic proportional gain hereinafter. Similarly, for the integral gain Kiλ, simulations and/or experiments using, for example, the control apparatus 50 have been performed, so that a constant value has been determined to be set to the integral gain Kiλ. The constant value of the integral gain Kiλ will also be referred to as a basic integral gain hereinafter.

Specifically, the amplitude correction calculator 32f calculates the amplitude correction ΔV as the sum of the output of the proportion unit and the output of the integrator IN2 in accordance with the following equation [eq11]:

$$\Delta V = Kp\lambda \cdot \Delta I\lambda r + Ki\lambda \int \Delta I\lambda r \cdot dt = \Delta Vp + \Delta Vi \quad [\text{eq}11]$$

Next, technical advantages achieved by the structure of the controller 30 of the control system 50 according to the first embodiment will be described hereinafter with reference to FIGS. 8 to 13 while comparing with that of a controller 30X of a control system 50X according to a comparative example.

Figure 8:
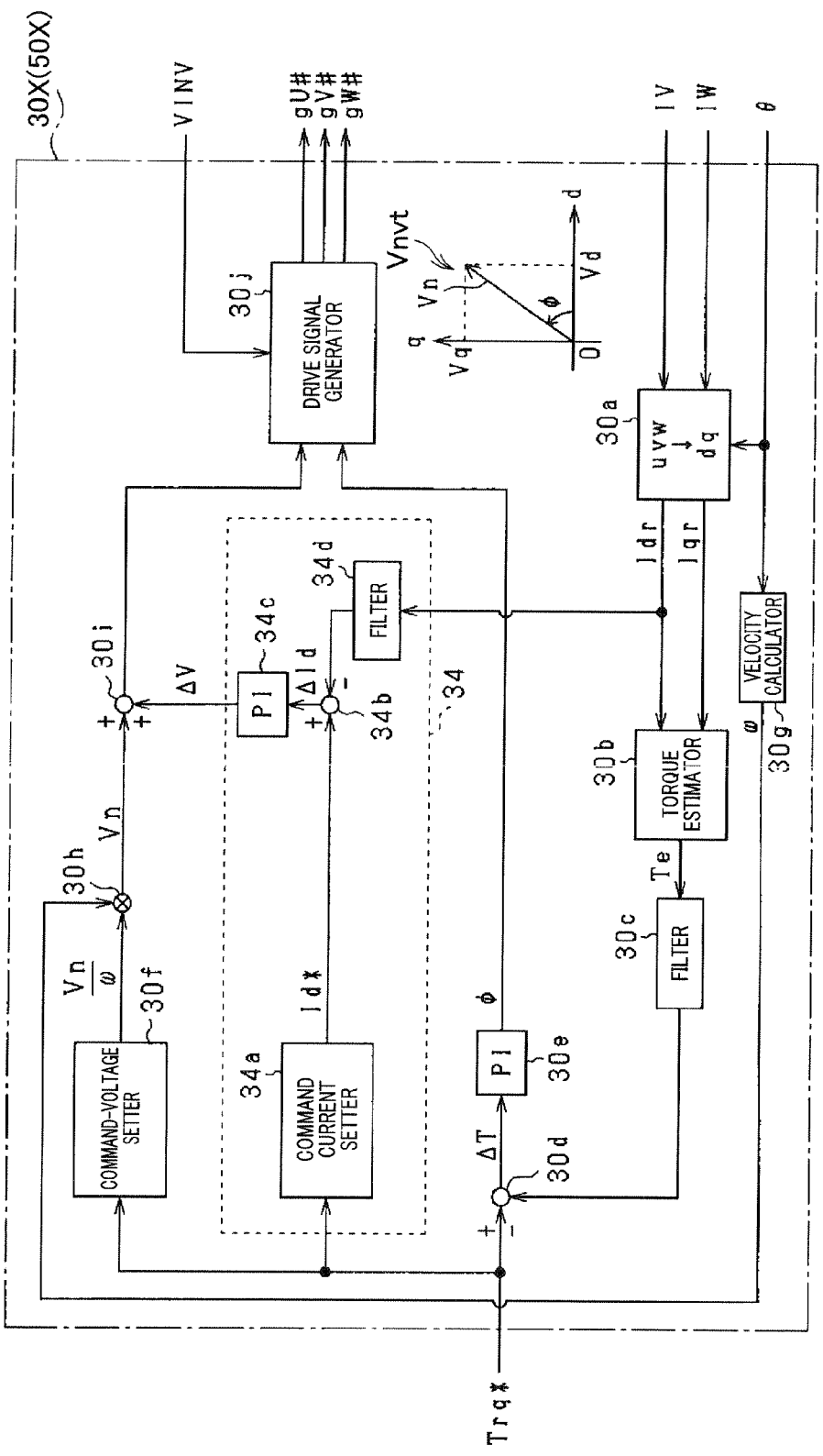
FIG. 8 is a block diagram schematically illustrating an example of the specific structure of a controller of a control apparatus for controlling a motor-generator according to a comparative example.
Figure 9:
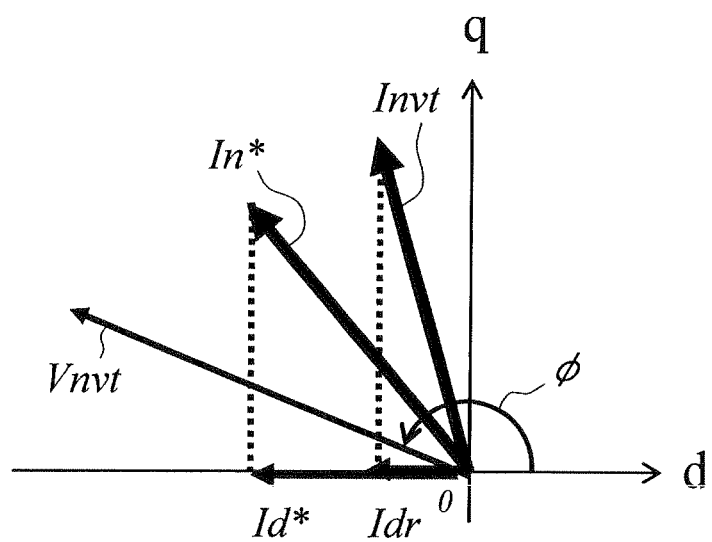
FIG. 9 is a graph schematically illustrating a d-axis command current in a d-q-coordinate system according to the comparative example.

First, the structure of the controller 30X according to the comparative example will be described hereinafter with reference to FIG. 8.

The controller 30X according to the comparative example includes a correction calculator 34. The correction calculator 34 includes a command current setter 34a, a current deviation calculator 34b, an amplitude correction calculator 34c, and a filter 34d.

The command current setter 34a has the same function as the function of the command current setter 32b. The filter 34d is operatively connected to the two-phase converter 30a, and is designed as, for example, a low-pass filter that eliminates high-frequency components higher than a predetermined threshold frequency from the d-axis current Idr obtained by the two-phase converter 30a. Hereinafter, a value of the d-axis current Idr, from which the high-frequency components have been eliminated, will be referred to as a corrected d-axis current Idr hereinafter.

The current deviation calculator 34b is operatively connected to the command current setter 34a and the filter 34d. The current deviation calculator 34b subtracts the corrected d-axis current Idr from the d-axis command current Id* to thereby calculate a current deviation ΔId between the corrected d-axis current Idr and the d-axis command current Id*.

The amplitude correction calculator 34c is operatively connected to the current deviation calculator 34b. The amplitude correction calculator 34c calculates, based on the current deviation ΔId, the amplitude correction ΔV serving as a manipulated variable for feedback controlling the corrected d-axis current Idr to match with the d-axis command current Id*, in other words, for feedback controlling the corrected estimated torque Te to match with the request torque Trq* (see FIG. 9).

Figure 10:
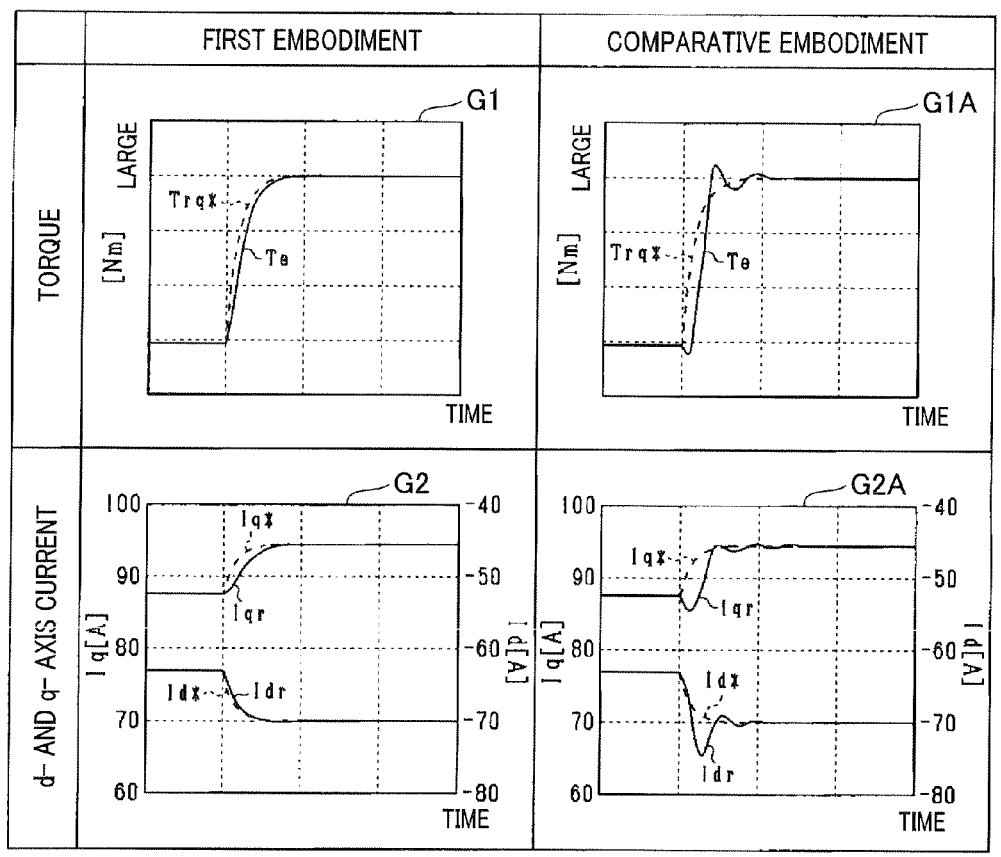
FIG. 10 is a diagram showing an advantage of improvement of current control accuracy achieved by the control apparatus according to the first embodiment as a result of comparison with respect to the control apparatus according to the comparative example.

FIG. 10 schematically illustrates (1) A first step response, i.e. a first transient response, of the corrected estimated torque Te of the motor-generator 10 driven by the control system 50 according to the first embodiment when the request torque Trq* transiently changes from a value to a predetermined higher value in a predetermined very short time (see graph G1)

(2) Changes of the corrected d- and q-axis currents Idr and Iqr and the d- and q-axis command currents Id* and Iq* during the first step response according to the first embodiment (see graph G2)

(3) A second step response, i.e. a second transient response, of the corrected estimated torque Te of the motor-generator 10 driven by the control system 50A according to the comparative example when a value of the request torque Trq* transiently changes from a value to the predetermined higher value in the predetermined very short time (see graph G1A)

(4) Changes of the corrected d- and q-axis currents Idr and Iqr and the d- and q-axis command currents Id* and Iq* during the second step response according to the comparative example (see graph G2A).

Note that, in FIG. 10, reference character Id represents a collective term subsuming an actual d-axis current Idr and a d-axis command current Id*, and reference character Iq represents a collective term subsuming an actual q-axis current Iqr and a q-axis command current Iq*.

The scales of the vertical axes of the respective graphs G1, G2, G1A, and G2A are identical to each other, and the scales of the horizontal axes of the respective graphs G1, G2, G1A, and G2A are identical to each other.

As described above, calculation of the amplitude correction ΔV based on the λ-axis current Iλr in the λ-axis according to the first embodiment reduces interference between the amplitude control and the phase control. This interference reduction permits the controller 30 according to the first embodiment to control the corrected d- and q-axis currents id and iq to match with the respective d- and q-axis command currents Id* and Iq* with a higher accuracy (see the graph G2). This results in no ripples in the first step response of the motor-generator 10 driven by the control system 50 according to the first embodiment.

In contrast, the controller 30X according to the comparative example calculates the amplitude correction ΔV merely using the d-axis current Idr in the d-axis, yielding considerable interference between the amplitude control and the phase control. This considerable interference reduces the accuracy of controlling the corrected d- and q-axis currents idr and iqr to match with the respective d- and q-axis command currents Id* and Iq*, resulting in torque ripples in the second step response of the motor-generator 10 driven by the control system 50X according to the comparative example.

Figure 11A:
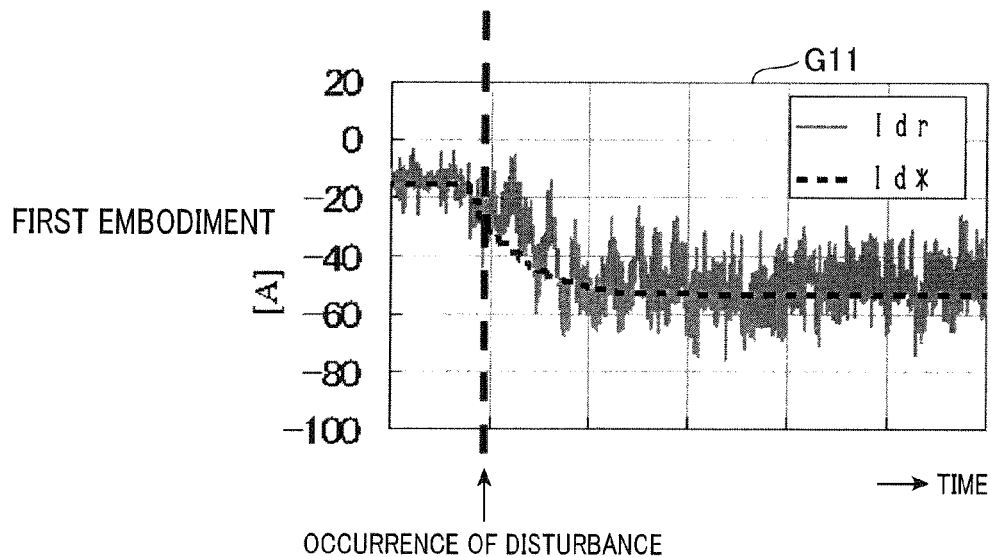
FIGS. 11A and 11B are graphs cooperatively showing an advantage of improvement of current control accuracy in view of the occurrence of a disturbance achieved by the control apparatus according to the first embodiment as a result of comparison with respect to the control apparatus according to the comparative example.
Figure 11B:
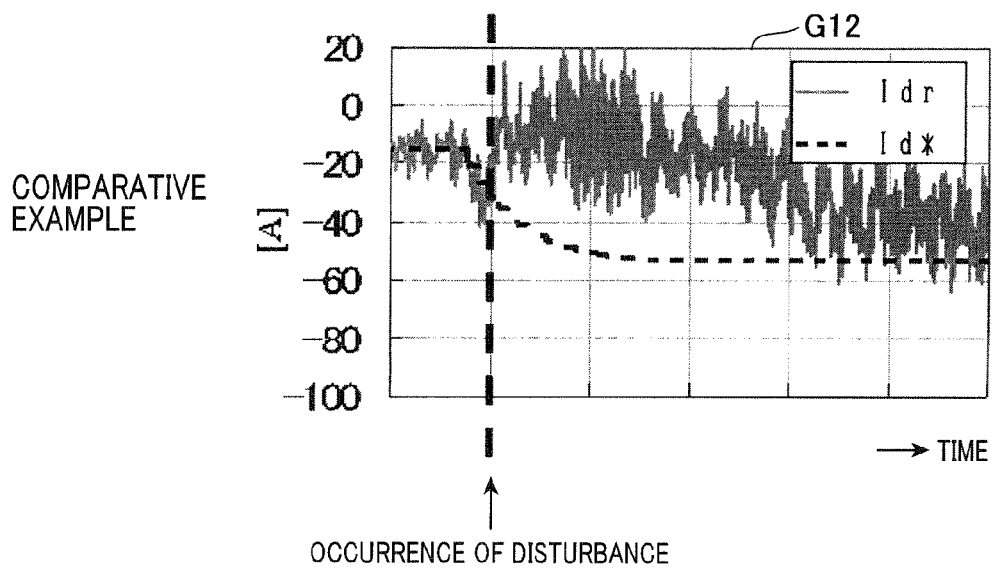

FIG. 11A is a graph G11 schematically illustrating how the d-axis current Idr changes when a simulated disturbance having an influence on the voltage amplitude Vn is applied to the voltage amplitude Vn output from the corrector 30i according to the first embodiment. In contrast, FIG. 11B is a graph G12 schematically illustrating how the d-axis current Idr changes when the same simulated disturbance is applied to the voltage amplitude Vn output from the corrector 30i according to the comparative example. Such disturbances having an influence on the voltage amplitude Vn include, for example, fluctuations of the input voltage VINV to the inverter 20, and variations of the dead times included in the drive signals gα#. The scales of the vertical and horizontal axes of the graph G11 are identical to those of the respective vertical and horizontal axes of the graph G12.

FIG. 11A shows that reduction in the interference between the amplitude control and the phase control controls the corrected d-axis current id to match with the d-axis command current Id* with a higher accuracy even if the simulated disturbance is applied to the voltage amplitude Vn. This results in no ripples in the torque of the motor-generator 10 driven by the control system 50 according to the first embodiment.

In contrast, FIG. 11B shows that considerable interference yielded between the amplitude control and the phase control reduces the accuracy of controlling the corrected d-axis current id to match with the d-axis command current Id*, resulting in ripples in the torque of the motor-generator 10 driven by the control system 50X according to the comparative example.

Note that ripples in the torque of the motor-generator 10 driven by the control system 50X according to the comparative example occur when the voltage phase φ is being within a predetermined angular region close to 180 electrical degrees while the modulation factor M is being within an over-modulation control range. The over-modulation control range is defined as an operation range of the inverter 20 in which the modulation factor M is greater than the first specified value Ma of, for example, 1.15 and smaller than the second predetermined value of, for example, 1.27. Note that an operation range of the inverter 20 in which the modulation factor M is equal to or smaller than the first specified value Ma is defined as a sinusoidal PWM control range. In addition, an operation range of the inverter 20 in which the modulation factor M is equal to or greater than the second specified value Mb is defined as a rectangular-pulse control range.

Figure 12A:
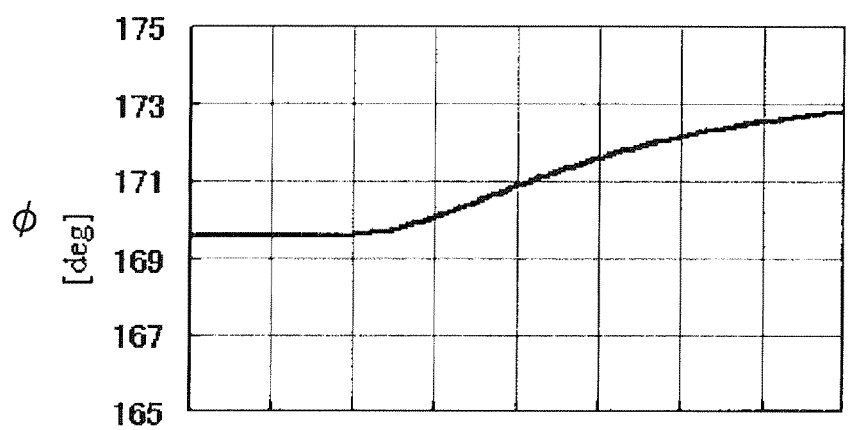
FIGS. 12A and 12B are graphs cooperatively showing a correlation between the voltage phase and d- and q-axis currents.
Figure 12B:
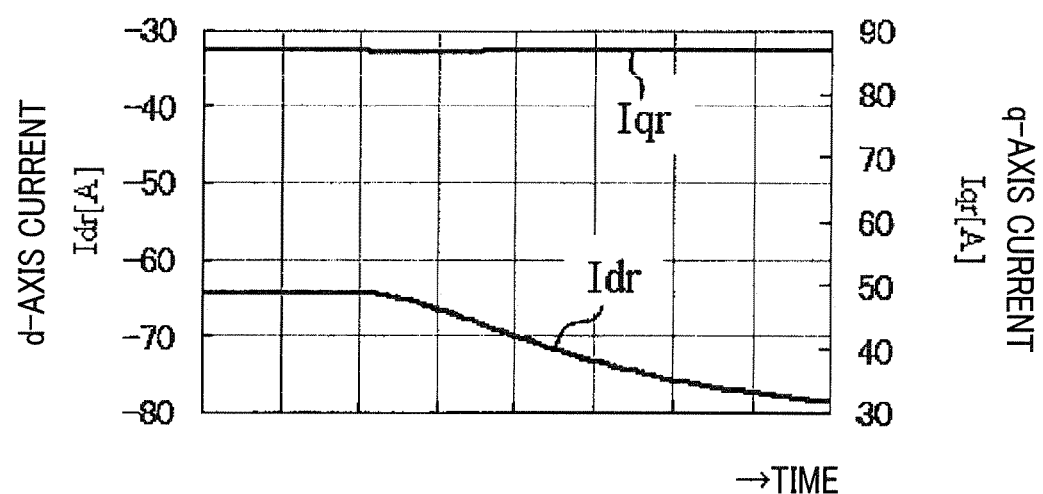

Specifically, as illustrated in FIGS. 12A and 12B, the predetermined angular region of the voltage phase φ close to 180 electrical degrees corresponds to a greatly-changed region of the d-axis current Idr. When the voltage phase φ is being within the predetermined angular region close to 180 electrical degrees while the modulation factor M is being within the over-modulation control range, calculation of the amplitude correction ΔV by the controller 30X illustrated in FIG. 8 causes an increase of interference between the amplitude control and the phase control. This increase of interference results in ripples in the torque of the motor-generator 10 according to the comparative example.

Unfortunately, even if the proportional gain and the integral gain of the amplitude correction calculator 34c increase, the occurrence of torque ripples are unavoidable unless interference between the amplitude control and the phase control.

Figure 13:
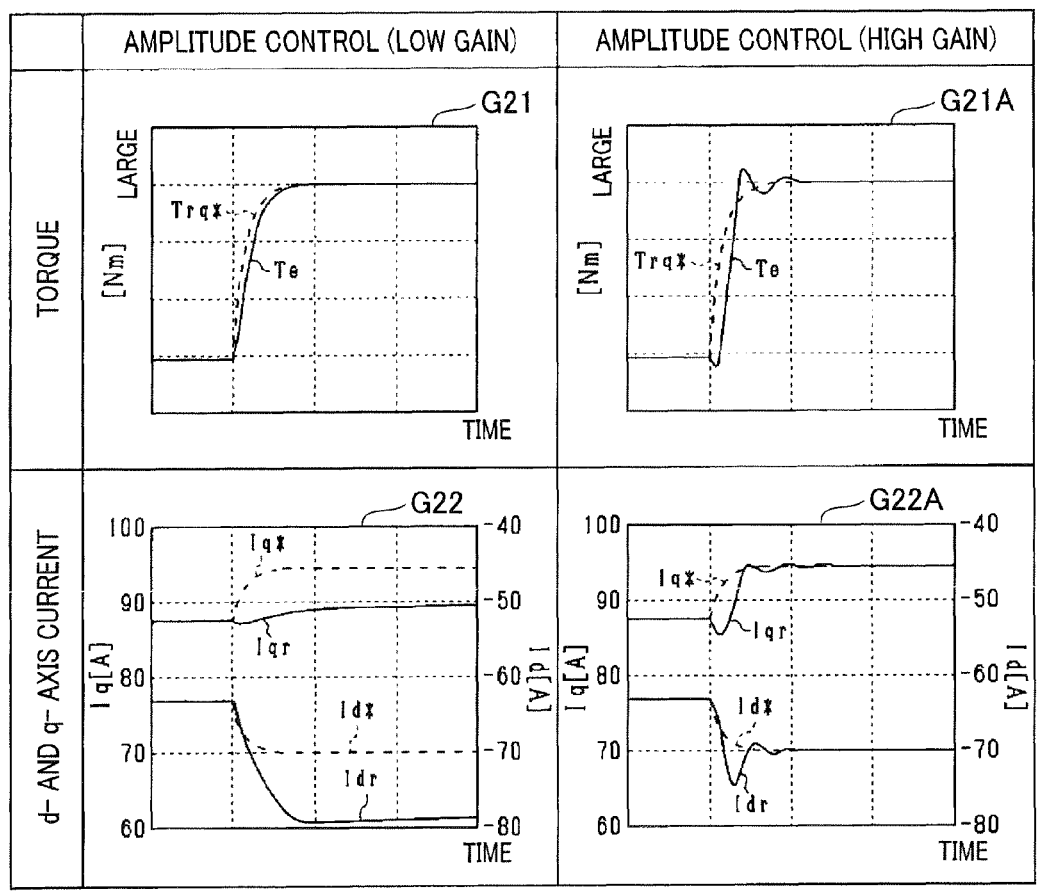
FIG. 13 is a diagram schematically illustrating how torque ripples occur for the control apparatus according to the comparative example.

Specifically, FIG. 13 schematically illustrates (1) A third step response of the corrected estimated torque Te of the motor-generator 10 driven by the control system 50X according to the comparative example when each of the proportional gain and the integral gain of the amplitude correction calculator 34c is set to a lower value (see graph G21)

(2) Changes of the corrected d- and q-axis currents Idr and Iqr and the d- and q-axis command currents Id* and Iq* during the third step response according to the comparative example (see graph G22)

(3) A fourth step response of the corrected estimated torque Te of the motor-generator 10 driven by the control system 50X according to the comparative example when each of the proportional gain and the integral gain of the amplitude correction calculator 34c is set to a higher value (see graph G21A)

(4) Changes of the corrected d- and q-axis currents Idr and Iqr and the d- and q-axis command currents Id* and Iq* during the fourth step response according to the comparative example (see graph G22A).

The scales of the vertical axes of the respective graphs G21, G22, G21A, and G22A are identical to each other, and the scales of the horizontal axes of the respective graphs G21, G22, G21A, and G22A are identical to each other.

The graph G22 shows that using a lower value of each of the proportional gain and the integral gain of the amplitude correction calculator 34c according to the comparative example reduces the controllability of each of the corrected d- and q-axis currents idr and iqr to match with the respective d- and q-axis command currents Id* and Iq*.

In addition, the graph G24 shows that using a higher value of each of the proportional gain and the integral gain of the amplitude correction calculator 34c improves the controllability of each of the corrected d- and q-axis currents id and iq to match with the respective d- and q-axis command currents Id* and Iq* as compared to that illustrated in the graph G22. However, the graph G23 shows that interference between the amplitude control and the phase control may yield ripples in the corrected estimated torque Te of the motor-generator 10 according to the comparative example.

In other words, FIG. 13 demonstrates that the occurrence of torque ripples is unavoidable unless interference between the amplitude control and the phase control is reduced.

As described above, the control apparatus 50 according to the first embodiment is configured to calculate the amplitude correction ΔV based on the λ-axis current Iλr in the λ-axis, which is a non-interference axis having no or little interference from change of the voltage phase φ. This configuration permits the proportional gain and the integral gain of the amplitude correction calculator 32f to increase. This gain increase improves a response, i.e. a response performance, of the feedback control in the amplitude control up to a level identical to a level of the response of the feedback control in the phase control. This improvement permits the control apparatus 50 to maintain both higher controllability of the torque of the motor-generator 10, and higher controllability of the three-phase currents flowing in the motor-generator 10 even if a disturbance having an influence on the voltage amplitude Vn occurs, or the request torque Trq* transiently changes.

The configuration of the control apparatus 50 also maintains both higher controllability of the torque of the motor-generator 10, and higher controllability of the three-phase currents flowing in the motor-generator 10 even if the feedforward control of the torque of the motor-generator 10 to match with the request torque Trq* is improperly carried out. The improperly execution of the feedforward control includes a case where the information F2 used by the command-voltage setter 30f is inappropriately determined.

Second Embodiment

Figure 14:
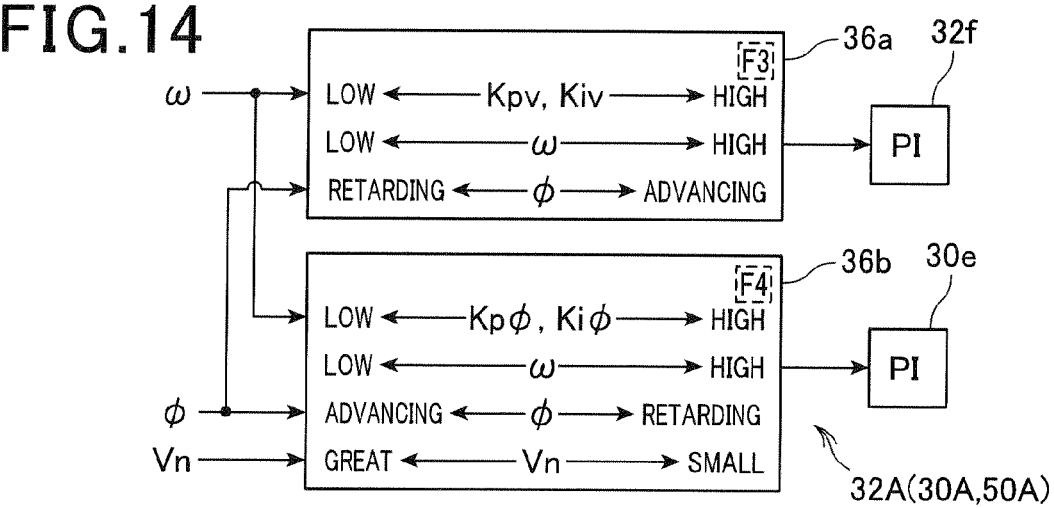
FIG. 14 is a block diagram schematically illustrating an amplitude gain setter and a phase gain setter of a controller of a control apparatus according to the second embodiment of the present disclosure.
Figure 15:
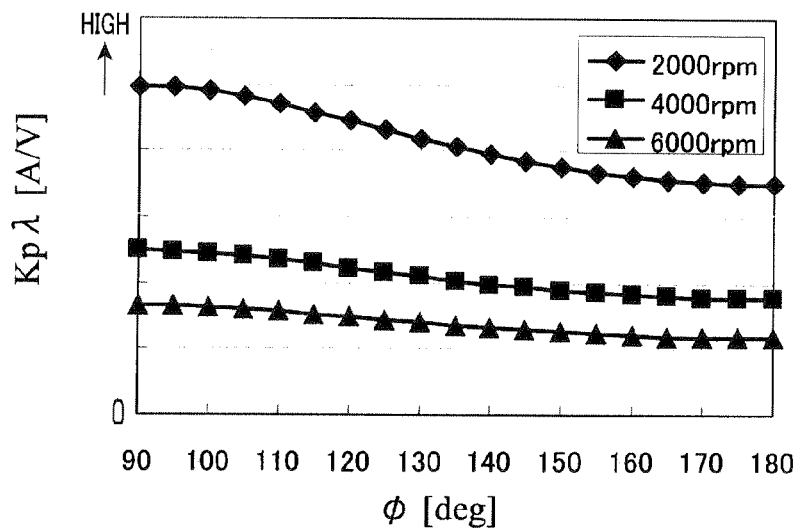
FIG. 15 is a graph schematically illustrating a relationship among an electric angular velocity of a rotor of the motor-generator, the voltage phase, and a proportional gain according to the second embodiment.

A control apparatus 50A for the motor-generator 10 according to the second embodiment of the present disclosure will be described with reference to FIGS. 14 to 16.

The structure and/or functions of the control apparatus 50A according to the second embodiment are different from the control apparatus 50 according to the first embodiment by the following points. So, the different points will be mainly described hereinafter.

A controller 30A of the control apparatus 50A includes a correction calculator 32A. The correction calculator 32A further includes an amplitude gain setter 36a and a phase gain setter 36b in addition to the structure of the correction calculator 32.

The amplitude gain setter 36a is operatively connected to the amplitude correction calculator 32f, the phase setter 30e, and the velocity calculator 30g. The amplitude gain setter 36a variably sets a value of at least one of a proportional gain Kpv and the integral gain Kiv, i.e. feedback gains Kpv and Kiv, used by the amplitude correction calculator 32f according to the second embodiment in accordance with, for example, change of the electrical angular velocity ω of the rotor 10a and the voltage phase φ.

The phase gain setter 36b is operatively connected to the phase setter 30e, the velocity calculator 30g, and the velocity multiplier 30h. The phase gain setter 36b variably sets a value of at least one of the proportional gain and the integral gain used by the phase setter 30e in accordance with, for example, change of the electrical angular velocity ω of the rotor 10a, the voltage phase φ fed back thereto from the phase setter 30e, and the voltage amplitude Vn calculated by the velocity multiplier 30h. The proportional gain and the integral gain used by the phase setter 30e will be referred to as a proportional gain Kpφ and an integral gain Kiφ hereinafter.

These settings aim to maintain, at a higher level, the response of the feedback control in each of the amplitude control and the phase control.

Next, how to variably set at least one of the proportional gain and the integral gain used by each of the amplitude correction calculator 32f and the phase setter 30e will be described hereinafter.

First, how to set at least one of the proportional gain Kpv and the integral gain Kiv used by the amplitude correction calculator 32f will be described hereinafter.

A voltage equation of a permanent-magnet synchronous motor when the voltage amplitude Vn changes by an infinitesimal value ΔVn is expressed by the following equation [eq12] based on the equations [eq2] and [eq3]:

$$\begin{bmatrix} Vdv \\ Vqv \end{bmatrix} = \begin{bmatrix} 0 & -\omega \cdot Lq \\ \omega \cdot Ld & 0 \end{bmatrix} \begin{bmatrix} Idv \\ Iqv \end{bmatrix} + \begin{bmatrix} 0 \\ \omega \cdot \psi \end{bmatrix} \quad [eq12]$$

Where $Vdv = (Vn + \Delta Vn)\cos\phi = Vd + \Delta Vn \cdot \cos\phi$ $Vqv = (Vn + \Delta Vn)\sin\phi = Vq + \Delta Vn \cdot \sin\phi$ Subtracting the equation [eq2] from the equation [eq12] derives the following equation [eq13]:

$$\begin{bmatrix} Vdv - Vd \\ Vqv - Vq \end{bmatrix} = \begin{bmatrix} 0 & -\omega \cdot Lq \\ \omega \cdot Ld & 0 \end{bmatrix} \begin{bmatrix} Idv - Idr \\ Iqv - Iqr \end{bmatrix} \quad [eq13]$$

The value (idv−Idr) at the right side of the equation [eq13] represents a d-axis current change ΔIdv, and the value (iqv−Iqr) at the right side of the equation [eq13] represents a q-axis current change ΔIqv. Solving the equation [eq13] in terms of the d-axis current change ΔIdv and the q-axis current change ΔIqv derives the following equation [eq14]:

$$\begin{bmatrix} \Delta Idv \\ \Delta Iqv \end{bmatrix} = \begin{bmatrix} 0 & -\omega \cdot Lq \\ \omega \cdot Ld & 0 \end{bmatrix} \begin{bmatrix} Vdv - Vd \\ Vqv - Vq \end{bmatrix} = \frac{1}{\omega} \begin{bmatrix} \frac{\sin\phi}{Ld} \\ \frac{\cos\phi}{Lq} \end{bmatrix} \Delta Vn \quad [eq14]$$

Turning the d-q coordinate system about an origin 0 of the d-q coordinate system by the angle λ in a clockwise direction creates a λ-O coordinate system having a λ-axis and an O axis with a phase being π/2-radian electrical angle leading with respect to the λ-axis. On the λ-O coordinate system, a λ-axis current change ΔIλ corresponding to the d-axis current change ΔIdv and an O-axis current change ΔIo corresponding to the q-axis current change ΔIqv are expressed by the following equation [eq15] in accordance with the equation [eq14]:

$$\begin{bmatrix} \Delta I\lambda \\ \Delta Io \end{bmatrix} = \frac{1}{\omega} \begin{bmatrix} \cos\lambda & \sin\lambda \\ -\sin\lambda & \cos\lambda \end{bmatrix} \begin{bmatrix} \frac{\sin\phi}{Ld} \\ -\frac{\cos\phi}{Lq} \end{bmatrix} \Delta Vn \quad [eq15]$$

$$= \begin{bmatrix} \frac{\sin\phi\cos\lambda}{\omega \cdot Ld} - \frac{\cos\phi\sin\lambda}{\omega \cdot Lq} \\ -\frac{\sin\phi\sin\lambda}{\omega \cdot Ld} - \frac{\cos\phi\cos\lambda}{\omega \cdot Lq} \end{bmatrix} \Delta Vn = \begin{bmatrix} Kp\lambda \\ Kpo \end{bmatrix} \Delta Vn$$

The angle λ included in the equation [eq15] is expressed by the equation [eq8]. This causes the proportional gain Kpλ to change depending on the voltage phase φ and the rotational speed, i.e. the electrical angular velocity ω, of the rotor 10a (see FIG. 15). Executing the feedback control in the amplitude control using constant values of the respective proportional gain Kpλ and integral gain Kiλ irrespective of characteristic changes of the respective proportional gain Kpλ and integral gain Kiλ set forth above may cause variations in the response of the amplitude control as the driven state of the motor-generator 10 changes. This may result in relative reduction in the response of the amplitude control at some driven states of the motor-generator 10. Maintaining, at a higher level, the response of the amplitude control even if the driven state of the motor-generator 10 changes requires variable setting of at least one of the respective proportional gain Kpv and integral gain Kiv used by the feedback control in the amplitude control.

In view of the requirement, the amplitude gain setter 36a variably sets at least one of the proportional gain Kpv and integral gain Kiv depending on change of the voltage phase φ and the electrical angular velocity ω. This variable set is designed to maintain, at a constant level, the response of the feedback control in the amplitude control even if the driven state of the motor-generator 10 changes. Specifically, the amplitude gain setter 36a increases at least one of the proportional gain Kpv and integral gain Kiv with an increase of the electrical angular velocity ω and/or with the voltage phase φ advancing (see FIG. 2).

The design of maintaining, at a constant level, the response of the feedback control in the amplitude control is equivalent to the design of maintaining, within a target time, a time constant for the λ-axis current Iλr when the λ-axis command current Iλ* transiently changes like a step without consideration of the feedforward system of the command voltage setter 30f and the velocity calculator 30h.

For example, the amplitude gain setter 36a calculates the proportional gain Kpλ and integral gain Kiλ in the following method.

As a typical example for setting the proportional gain Kpv, the amplitude gain setter 36a includes information F3 including a map in data-table format and/or one or more model equations. The information F3, which is for example stored in the memory 30ME, includes a function, i.e. correlation, of values of the reciprocal of the proportional gain Kpλ, illustrated in FIG. 15 with respect to values of the voltage phase φ. The reciprocal of the proportional gain Kpv will be referred to as a correction gain. The amplitude gain setter 36a retrieves a value of the correction gain, which matches with an actual value of the voltage phase φ, and multiplies the basic proportional gain described in the first embodiment by the retrieved value of the correction gain, thus calculating a value of the proportional gain Kpv according to the second embodiment. The amplitude gain setter 36a can set a value of the integral gain Kiv in the same approach as setting a value of the proportional gain Kpv.

Next, how to set at least one of the proportional gain Kpφ and the integral gain Kiφ used by the phase setter 30e will be described.

Solving the equation [eq2] in terms of the d-axis current Idr and the q-axis current Iqr derives the following equations [eq16a] and [eq16b] assuming that the motor-generator 10 is driven in a steady state and the influence of the resistance R of each-phase armature winding is ignored:

$$Idr = \frac{1}{Ld}\left(\frac{Vd}{\omega} - \psi\right) \quad [\text{eq16a}]$$

$$Iqr = -\frac{Vd}{\omega \cdot Ld} \quad [\text{eq16b}]$$

The torque, shown by τ, of the motor-generator 10 is expressed by the following equation [eq17]:

$$\tau = Pn[\psi \cdot Iq + (Ld - Lq)Idr \cdot Iqr] \quad [\text{eq17}]$$

Where Pn represents the number of pole pairs of the rotor 10a of the motor-generator 10.

The equations [eq16], [eq17], and [eq3] derives a relational equation between the voltage phase φ and the torque τ of the motor-generator 10 as the following equation [eq18]:

$$\tau = -\frac{Pn \cdot Vn^2}{\omega \cdot Ld}\left(\frac{\psi}{Vn} + \frac{Ld - Lq}{\omega \cdot Lq}\sin\phi\right)\cos\phi \quad [\text{eq18}]$$

Figure 16:
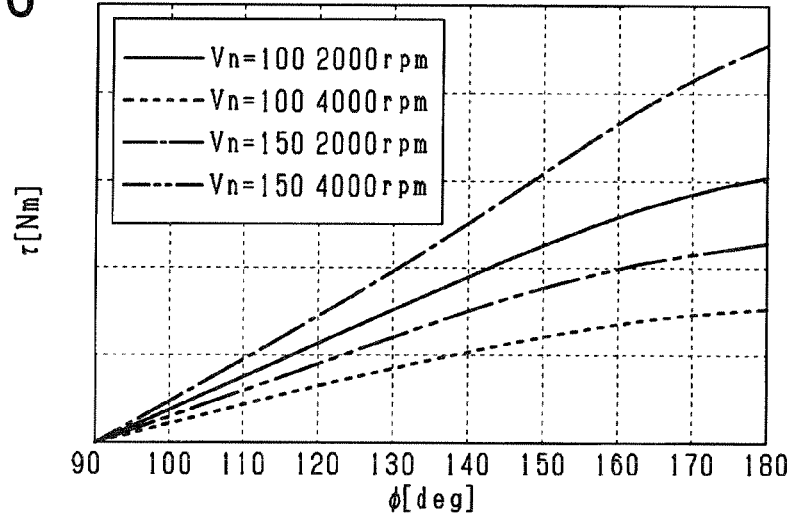
FIG. 16 is a graph schematically illustrating a relationship between the voltage phase and torque according to the second embodiment.

The equation [eq18] shows that the torque τ of the motor-generator 10 changes depending on the voltage amplitude Vn, the voltage phase φ, and electrical angular velocity w of the rotor 10a (see FIG. 16). Executing the feedback control in the phase control using constant values of the respective proportional gain Kpφ and integral gain Kiφ irrespective of characteristic changes of the respective proportional gain Kpφ and integral gain Kiφ set forth above may cause variations in the response of the phase control as the driven state of the motor-generator 10 changes. This may result in relative reduction in the response of the amplitude control at some driven states of the motor-generator 10. Maintaining, at a higher level, the response of the phase control even if the driven state of the motor-generator 10 changes requires variable setting of at least one of the respective proportional gain Kpφ and integral gain Kiφ used by the feedback control in the phase control.

In view of the requirement, the phase gain setter 36b variably sets at least one of the proportional gain Kpφ and integral gain Kiφ depending on change of the voltage amplitude Vn, the voltage phase φ, and electrical angular velocity ω of the rotor 10a. This variable set makes it possible to maintain, at a constant level, the response of the feedback control in the phase control even if the driven state of the motor-generator 10 changes. Specifically, the phase gain setter 36b increases at least one of the proportional gain Kpφ and integral gain Kiφ with an increase of the electrical angular velocity ω or a decrease of the voltage amplitude Vn, and/or with the voltage phase φ retarding (see FIG. 2).

Maintaining, at a constant level, the response of the feedback control in the phase control is equivalent to maintain, within a target time, a time constant for the corrected estimated torque Te when the request torque Trq* transiently changes like a step.

For example, the phase gain setter 36b calculates the proportional gain Kpφ and integral gain Kiφ in the following method.

Specifically, the phase gain setter 36b includes information F4 including a map in data-table format and/or one or more model equations. The information F4, which is for example stored in the memory 30ME, includes a function, i.e. correlation, of values of each of the gradients of the torque τ of the motor-generator 10 illustrated in FIG. 16 with respect to values of the voltage phase φ. The gradients are respectively determined based on the following driven conditions of the motor-generator 10:

(1) The voltage amplitude Vn is set to 100, and the electrical angular velocity ω is set to 2000 rpm (2) The voltage amplitude Vn is set to 100, and the electrical angular velocity ω is set to 4000 rpm (3) The voltage amplitude Vn is set to 150, and the electrical angular velocity ω is set to 2000 rpm (4) The voltage amplitude Vn is set to 150, and the electrical angular velocity ω is set to 4000 rpm.

Each of the gradients corresponding to the prepared driven conditions of the motor-generator 10 will be referred to as a correction gain.

The phase gain setter 36b selects one of the correction gains, which matches with a corresponding one of the driven condition of the motor-generator 10. Then, the phase gain setter 36b retrieves a value of the selected correction gain of the torque τ of the motor-generator 10, which matches with an actual value of the voltage phase φ. Successively, the phase gain setter 36b multiplies each of the basic proportional gain and the basic integral gain described in the first embodiment by the retrieved value of the selected correction gain, thus calculating a value of the proportional gain Kpφ and the integral gain Kiφ according to the second embodiment.

Note that the phase gain setter 36b can set the proportional gain Kpφ and the integral gain Kiφ using methods of setting the proportional gain Kpφ and the integral gain Kiφ disclosed in Japanese Patent Application Publication No. 2012-085485. The disclosure of the Japanese Patent Application Publication No. 2012-085485 is incorporated entirely herein by reference.

As described above, the control apparatus 50A according to the second embodiment is configured to (1) Correct at least one of the proportional gain Kpv and the integral gain Kiv used by the amplitude correction calculator 32f in accordance with change of the driven conditions of the motor-generator 10, i.e. the electrical angular velocity ω of the rotor 10a and the voltage phase φ

(2) Correct at least one of the proportional gain and the integral gain used by the phase setter 30e in accordance with change of the driven conditions of the motor-generator 10, i.e. the electrical angular velocity ω of the rotor 10a, the voltage phase φ, and the voltage amplitude Vn calculated by the velocity multiplier 30h.

This configuration maintains, at a higher level, the response performance of each of the amplitude control and the phase control independently of change of the driven conditions of the motor-generator 10.

Third Embodiment

A control apparatus 50B for the motor-generator 10 according to the third embodiment of the present disclosure will be described with reference to FIGS. 17 to 19.

The structure and/or functions of the control apparatus 50B according to the third embodiment are different from the control apparatus 50 according to the first embodiment by the following points. So, the different points will be mainly described hereinafter.

A controller 30B of the control apparatus 50B includes a correction calculator 32B. The design of the correction calculator 32B differs from the design of the correction calculator 30 according to the first embodiment.

Hereinafter, how to design the correction calculator 32B will be described with reference to FIG. 17.

As described above, assuming that the motor-generator 10 is in the steady state, the following equation [eq19] is derived from the equation [eq1]:

$$\begin{bmatrix} Vd \\ Vq \end{bmatrix} = \begin{bmatrix} 0 & -\omega \cdot Lq \\ \omega \cdot Ld & 0 \end{bmatrix} \begin{bmatrix} Idr \\ Iqr \end{bmatrix} + \begin{bmatrix} 0 \\ \omega \cdot \psi \end{bmatrix} \quad [eq19]$$

A voltage equation of a permanent-magnet synchronous motor when the d- and q-axis voltage components Vd and Vq changes by respective infinitesimal values ΔVd and ΔVq is expressed by the following equation [eq20] based on the equation [eq19]:

$$\begin{bmatrix} \Delta Vd \\ \Delta Vq \end{bmatrix} = \begin{bmatrix} R & -\omega \cdot Lq \\ \omega \cdot Ld & R \end{bmatrix} \begin{bmatrix} \Delta Id \\ \Delta Iq \end{bmatrix} \quad [eq20]$$

Figure 17:
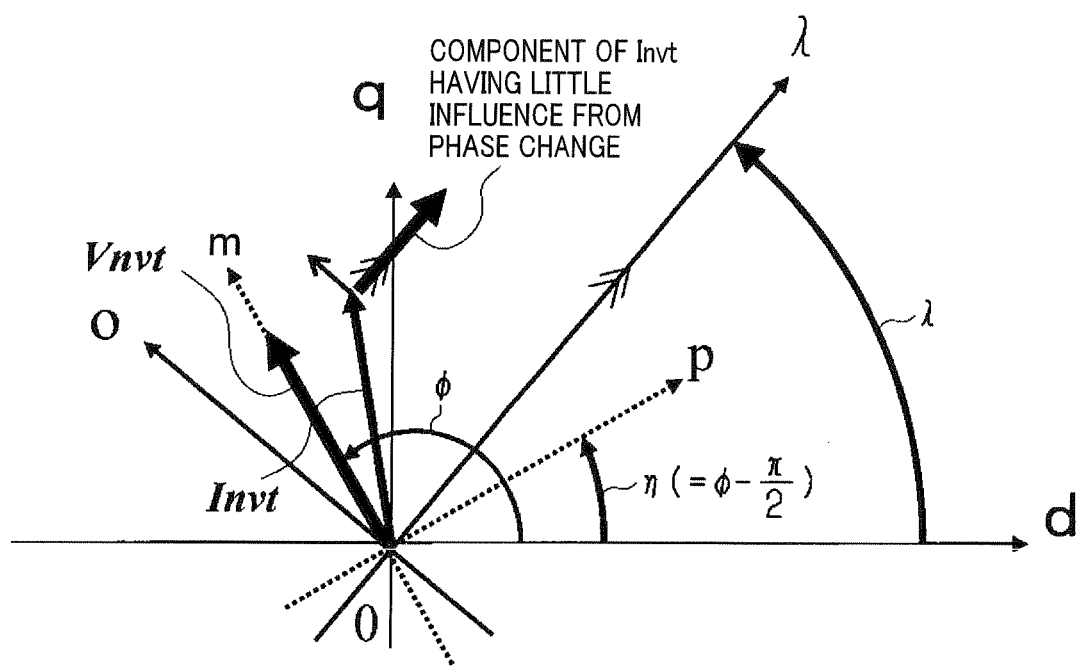
FIG. 17 is a graph schematically illustrating a correlation between the d-q coordinate system and a p-m coordinate system according to the third embodiment of the present disclosure.

FIG. 17 schematically illustrates a new orthogonal coordinate system, i.e. a p-m coordinate system (p-m coordinate system). The p-m coordinate system has an m axis extending from the same origin 0 of the d-q coordinate system in parallel to the direction of the output voltage vector Vnvt, and a p axis extending from the origin 0 perpendicularly to the direction of the output voltage vector Vnvt.

Like the λ-axis, the p-m coordinate system changes depending on change of the driven conditions of the motor-generator 10.

Hereinafter, how to derive the relationship between the output voltage vector Vnvt on the p-m coordinate system transformed from the d-q coordinate system and the current vector Ivnt transformed from the λ-O coordinate system will be described.

Turning the d-q coordinate system about the origin 0 of the d-q coordinate system by an angle η in a counterclockwise direction creates the p-m coordinate system; η is set to an angle obtained by the subtraction of π/2 from the voltage phase φ. As described above, turning the d-q coordinate system about the origin 0 of the d-q coordinate system by the angle λ in a clockwise direction creates the λ-O coordinate system.

These relationships between the aforementioned coordinate systems derive the following equation [eq21] from the equation [eq20] when reference characters ΔVp and ΔV1 respectively represent infinitesimal changes of the p- and m-axis voltage components Vp and Vm corresponding to the infinitesimal changes of the d- and q-axis voltage components Vd and Vq:

$$\begin{bmatrix} \Delta Vp \\ \Delta Vn \end{bmatrix} = \begin{bmatrix} \cos\eta & \sin\eta \\ -\sin\eta & \cos\eta \end{bmatrix} \begin{bmatrix} R & -\omega \cdot Lq \\ \omega \cdot Ld & R \end{bmatrix} \begin{bmatrix} \cos\lambda & \sin\lambda \\ -\sin\lambda & \cos\lambda \end{bmatrix} \begin{bmatrix} \Delta I\lambda \\ \Delta Io \end{bmatrix} \quad [eq21]$$

$$= \begin{bmatrix} Rc + \omega \cdot L\lambda o & Rs - \omega \cdot Lo \\ -Rs + \omega \cdot L\lambda & Rc + \omega \cdot L\lambda o \end{bmatrix} \begin{bmatrix} \Delta I\lambda \\ \Delta Io \end{bmatrix}$$

Where $$L\lambda = Ld \cdot \cos\eta \cdot \cos\lambda + Lq \cdot \sin\eta \cdot \sin\lambda$$

$$Lo = Ld \cdot \sin\eta \cdot \sin\lambda + Lq \cdot \cos\eta \cdot \cos\lambda$$

$$Lo\lambda = Ld \cdot \cos\eta \cdot \sin\lambda - Lq \cdot \sin\eta \cdot \cos\lambda$$

$$L\lambda o = Ld \cdot \sin\eta \cdot \cos\lambda - Lq \cdot \cos\eta \cdot \sin\lambda$$

$$Rc = R \cdot \cos(\eta - \lambda)$$

$$Rs = R \cdot \sin(\eta - \lambda)$$

Solving the equation [eq21] in terms of the λ-axis current change ΔIλ and the O-axis current change ΔIo derives the following equation [eq22]:

$$\begin{bmatrix} \Delta I\lambda \\ \Delta Io \end{bmatrix} = \frac{1}{R^2 + \omega^2 \cdot Ld \cdot Lq} \begin{bmatrix} Rc + \omega \cdot Lo\lambda & -Rs - \omega \cdot Lo \\ Rs - \omega \cdot L\lambda & Rc + \omega \cdot L\lambda o \end{bmatrix} \begin{bmatrix} \Delta Vp \\ \Delta Vl \end{bmatrix} \quad [eq22]$$

An increase or decrease of the infinitesimal change ΔVm is equivalent to an increase or decrease of the amplitude of the output voltage vector Vnvt, and an increase or decrease of the infinitesimal change ΔVp is equivalent to an increase or decrease of the phase of the output voltage vector Vnvt.

In order to control only the m-axis voltage component Vm so as to control currents flowing in the motor-generator 10 with little influence from change of the p-axis voltage component Vp, it is necessary to (1) Set a value of the angle λ that permits a value of (Rc−ω·Loλ) to be zero at the right side of the equation [eq22]

(2) Control the m-axis voltage component Vm using the λ-axis current Iλr.

In addition, in order to control only the m-axis voltage component Vm so as to control currents flowing in the motor-generator 10 with little influence from change of the p-axis voltage component Vp, it is also necessary to (1) Set a value of the angle λ that permits a value of (Rs−ω·Lλ) to be zero at the right side of the equation [eq22]

(2) Control the m-axis voltage component Vm using an O-axis current Io flowing in an O-axis of the λ-O coordinate system.

A sufficiently high value of the electrical angular velocity ω establishes the following formulas Rc<<ω·Loλ and Rs<<ω·Lλ.

This establishment of the formula Rc<<ω·Loλ derives that controlling the m-axis voltage component Vm using the λ-axis current Iλr necessitates the following equation −ω·Loλ=0, i.e. Loλ=0, being established. This derives the following equations [eq23]:

$$Lo\lambda = Ld \cdot \cos\eta \cdot \sin\lambda - Lq \cdot \sin\eta \cdot \cos\lambda = 0 \quad [eq23]$$

$$\lambda = \tan^{-1}\left(\frac{Lq}{Ld}\tan\eta\right) = \tan^{-1}\left(\frac{Lq}{Ld}\tan\left(\phi - \frac{\pi}{2}\right)\right)$$

$$= -\tan^{-1}\left(\frac{Lq}{Ld}\frac{1}{\tan\phi}\right) = \tan^{-1}\left(\frac{Ld}{Lq}\tan\phi\right) - \frac{\pi}{2}$$

On the other hand, this establishment of the formula Rs<<ω·Lλ derives that controlling the m-axis voltage component Vm using the O-axis current Io necessitates the following equation −ω·Lλ=0, i.e. Lλ=0, being established. This derives the following equations [eq24]:

$$L\lambda = Ld \cdot \cos\eta \cdot \cos\lambda + Lq \cdot \sin\eta \cdot \sin\lambda = 0 \qquad [eq24]$$

$$\lambda = -\tan^{-1}\left(\frac{Ld}{Lq}\frac{1}{\tan\eta}\right) = \tan^{-1}\left(\frac{Lq}{Ld}\tan\eta\right) - \frac{\pi}{2} = \tan^{-1}\left(\frac{Lq}{Ld}\tan\left(\phi - \frac{\pi}{2}\right)\right) - \frac{\pi}{2}$$

$$= -\tan^{-1}\left(\frac{Lq}{Ld}\frac{1}{\tan\phi}\right) - \frac{\pi}{2} = \tan^{-1}\left(\frac{Ld}{Lq}\tan\phi\right) - \pi$$

Turning the equation [eq23] by only $-\pi/2$ derives the equation [eq24], and the $\lambda$-axis in the equation [eq23] coincides with the O axis in the equation [eq24]. This results in effects achieved by controlling the m-axis voltage component Vm using the $\lambda$-axis current I$\lambda$r being identical to effects achieved by controlling the m-axis voltage component Vm using the O-axis current Io. The value of the angle $\lambda$ is in agreement with the value of the angle $\lambda$ expressed by the aforementioned equation [eq8].

Next, an example of the specific structure of the controller 30B for performing torque control including amplitude control and phase control will be described with reference to FIG. 18.

Figure 18:
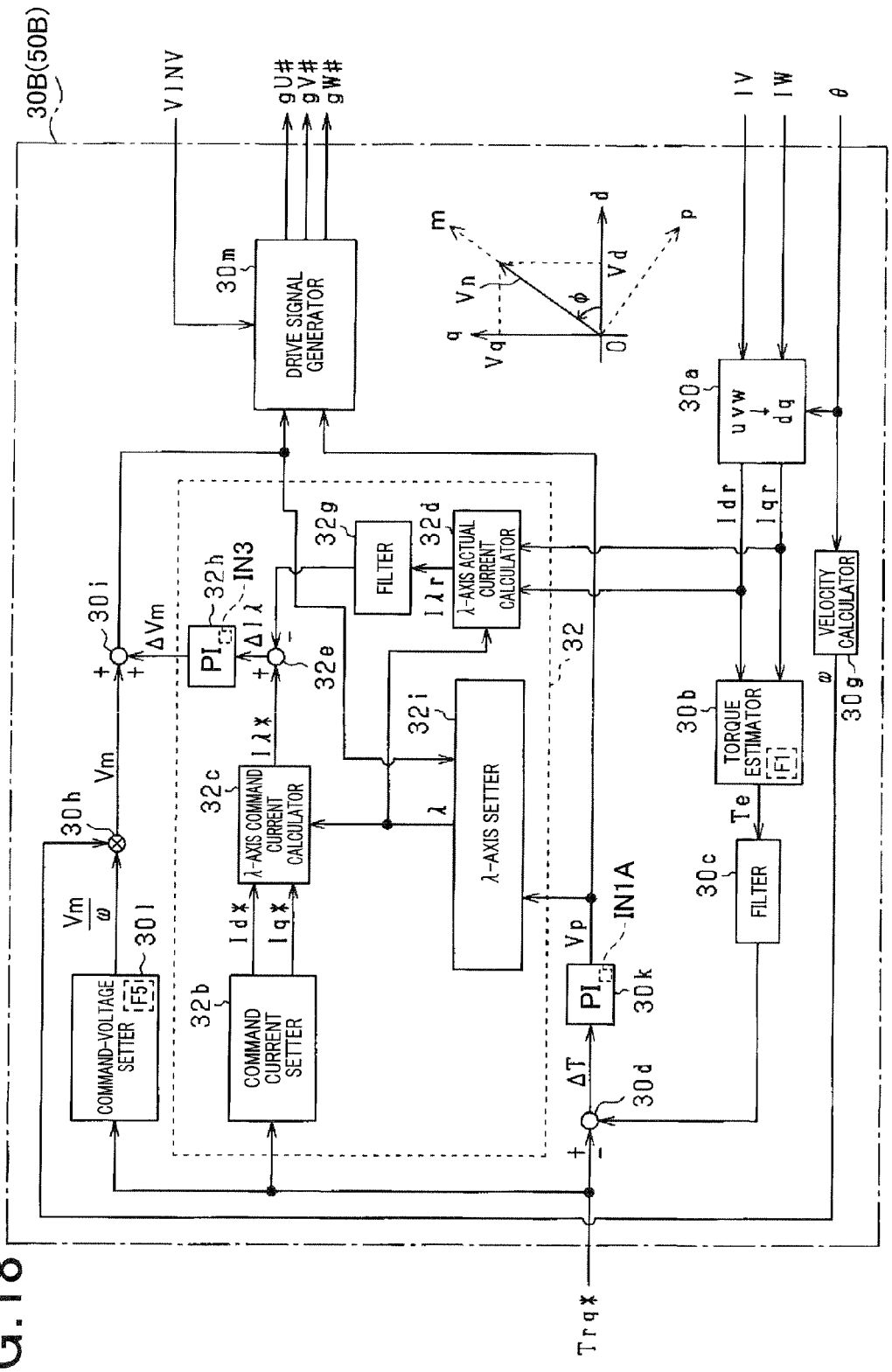
FIG. 18 is a block diagram schematically illustrating an example of the specific structure of a controller of a control apparatus according to the third embodiment.

In FIG. 18, identical modules between the controller 30B and the controller 30 illustrated in FIG. 2, to which identical reference characters are assigned, are omitted in description, and the different modules will be mainly described hereinafter.

A phase setter 30k is operatively connected to the torque deviation calculator 30d, and sets, i.e. calculates, based on the torque deviation $\Delta T$, a p-axis voltage component Vp in the p-m coordinate system. That is, the p-axis voltage component Vp serves as a manipulated variable for feedback controlling the corrected estimated torque Te to match with the request torque Trq*. The p-axis voltage component Vp corresponds to a p-axis component of the output voltage vector Vnvt in the p-m coordinate system. That is, the p-axis voltage component Vp serves as a phase parameter depending on the voltage phase $\phi$.

Specifically, the phase setter 30k calculates the p-axis voltage component Vp in accordance with a predetermined proportional gain and a predetermined integral gain, i.e. feedback gains, of a proportional-integral (PI) feedback control algorithm (PI algorithm) using the torque deviation $\Delta T$ as its input.

In the PI algorithm, the p-axis voltage component Vp is expressed based on the sum of an output, i.e. a proportional gain term, of a proportional unit based on the proportional gain and an output, i.e. an integral gain term, of an integrator IN1A based on the integral gain.

The proportional gain for the p-axis voltage component Vp contributes to change in the p-axis voltage component Vp in proportion to the temporal torque deviation $\Delta T$ from a target value of zero.

The integral gain is proportional to an accumulated offset of instantaneous values of the torque deviation $\Delta T$ over time to reset the accumulated offset (steady-state deviation) over time to zero.

A command-voltage setter 30l has, for example, information F5 in data-table (map) format, in mathematical expression format, and/or program format. The information F5, which is for example stored in the memory 30ME, includes a function, i.e. a correlation, of values of a normalized voltage amplitude Vm/$\omega$ with respect to values of the request torque Trq*. The normalized voltage amplitude Vm/$\omega$ represents division of the command value of the m-axis voltage component Vm in the p-m coordinate system by the electrical angular velocity $\omega$ of the rotor 10a.

The velocity multiplier 30h is operatively connected to the command-voltage setter 30l and to the velocity calculator 30g, and multiplies the normalized command-voltage amplitude V1/$\omega$ by the electrical angular velocity $\omega$, thus calculating a value of the m-axis voltage component Vm. The value of the m-axis voltage component Vm serves as a manipulated variable for feedforward controlling the torque of the motor-generator 10 to match with the request torque Trq*.

In FIG. 18, identical modules between the correction calculator 32B of the controller 30B and the correction calculator 32 of the controller 30 illustrated in FIG. 2, to which identical reference characters are assigned, are omitted in description, and the different modules will be mainly described hereinafter.

A correction calculator 32h is operatively connected to the current deviation calculator 32e. The correction calculator 32h, which serves as an amplitude setter, calculates, based on the current deviation $\Delta I\lambda$, a correction $\Delta Vm$ for the m-axis voltage component Vm; the correction $\Delta Vm$ serves as a manipulated variable for feedback controlling the corrected $\lambda$-axis current I$\lambda$r to match with the $\lambda$-axis command current I$\lambda$*.

Specifically, in the third embodiment, the correction calculator 32h calculates the correction $\Delta Vm$ in accordance with a predetermined proportional gain and a predetermined integral gain of a PI feedback control algorithm (PI algorithm) using the current deviation $\Delta I\lambda$ as its input.

In the PI algorithm, the correction $\Delta Vm$ is expressed based on the sum of an output $\Delta Vpro$ of a proportional unit based on the proportional gain and an output $\Delta Vi$ of an integrator IN3 based on the integral gain.

The proportional gain for the correction $\Delta Vm$ contributes to change in the correction $\Delta Vm$ in proportion to the temporal current deviation $\Delta I\lambda$ from a target value of zero.

The integral gain is proportional to an accumulated offset of instantaneous values of the current deviation $\Delta I\lambda$ over time to reset the accumulated offset (steady-state deviation) over time to zero.

The correction $\Delta Vm$ corresponds to an m-axis component of the output voltage vector Vnvt in the p-m coordinate system. That is, the correction $\Delta Vm$ serves as an amplitude parameter depending on the voltage amplitude Vn.

The corrector 30i is operatively connected to the velocity multiplier 30h, and adds, to the value of the m-axis voltage component Vm output from the velocity multiplier 30h, the correction $\Delta Vm$ calculated by the correction calculator 32B. This addition calculates the sum of the value of the m-axis voltage component Vm and the correction $\Delta Vm$, as a correction value of the value of the m-axis voltage component Vm. The sum of the value of the m-axis voltage component Vm and the correction $\Delta Vm$ will be referred to as a corrected m-axis voltage (Vm+$\Delta Vm$) hereinafter.

A drive signal generator 30m is operatively connected to the phase setter 30k and the corrector 30i. The drive signal generator 30m, which serves as, for example, a switching unit, generates the drive signals g$\alpha$# based on the corrected m-axis voltage (Vm+$\Delta Vm$) obtained by the corrector 30i, the p-axis voltage obtained by the phase setter 30k, and the input voltage VINV in the following approach.

Specifically, the drive signal generator 30m determines the corrected m-axis voltage (Vm+$\Delta Vm$) obtained by the corrector 30i as an amplitude Vn of the output voltage vector Vnvt. The drive signal generator 30m also sets the phase $\phi$ of the output voltage vector Vnvt, which will be referred to as a voltage phase $\phi$, in accordance with the following relation $\phi=\eta+\pi/2$.

The drive signal generator 30*m* particularly performs a filtering process to eliminate noise components included in the value of the angle η. Specifically, the drive signal generator 30*m* calculates the voltage phase φ in accordance with the following equation [eq25]:

$$\phi = \tan^{-1}\left(\frac{-Vp}{Vm + \Delta Vm}\right) + \eta + \frac{\pi}{2} \quad [\text{eq25}]$$

The first term at the right side of the equation [eq25] shows change of the angle η formed between the d-axis of the d-q coordinate system and the p-axis of the p-m coordinate system (see FIG. 17) up to a current drive-signal generation period during which the controller 30B generate the drive signals gα# from a latest previous drive-signal generation period during which the controller 30B generates the drive signals gα#.

The drive signal generator 30*m* subtracts, for each drive-signal generation period, π/2 from the voltage phase φ calculated at the current drive-signal generation period, thus updating, for each drive-signal generation period, the angle η in the second term at the right side of the equation [eq25]. This updating for each drive-signal generation period aims to calculate a value of the voltage phase φ at the next drive-signal generation period. Specifically, the drive signal generator 30*m* calculates, for each drive-signal generation period, the voltage phase φ in accordance with the following equation [eq25] using a value of the angle η updated at the latest previous drive-signal generation period.

Thereafter, the drive signal generator 30*m* generates, for each drive-signal generation period, the drive signals gα# in accordance with the sinusoidal PWM control or the over-modulation torque control including the rectangular-pulse torque control in the same manner as the drive signal generator 30*j* according to the first embodiment.

A λ-axis setter 32*i* of the correction calculator 32B is operatively connected to the phase setter 30*k* and the corrector 30*i*. The λ-axis setter 32*i*, which serves as, for example, an interference-reduction coordinate axis setter, calculates, based on the p-axis voltage Vp obtained by the phase setter 30*k* and the corrected m-axis voltage (Vm+ΔVm), the angle λ between d-axis and the λ-axis.

Specifically, the λ-axis setter 32*i* calculates the voltage phase φ in accordance with the equation [eq25] using the corrected m-axis voltage (Vm+ΔVm). Then, the λ-axis setter 32*i* calculates the angle λ between d-axis and the λ-axis in accordance with the equation [eq23] using the calculated voltage phase φ.

The torque control described above manipulates, as the manipulated variables, the m-axis voltage component Vm and the correction ΔVm for the m-axis voltage component Vm in the q-m coordinate system, thus controlling the corrected estimated torque Te and the λ-axis current Iλr as controlled variables.

Figure 19:
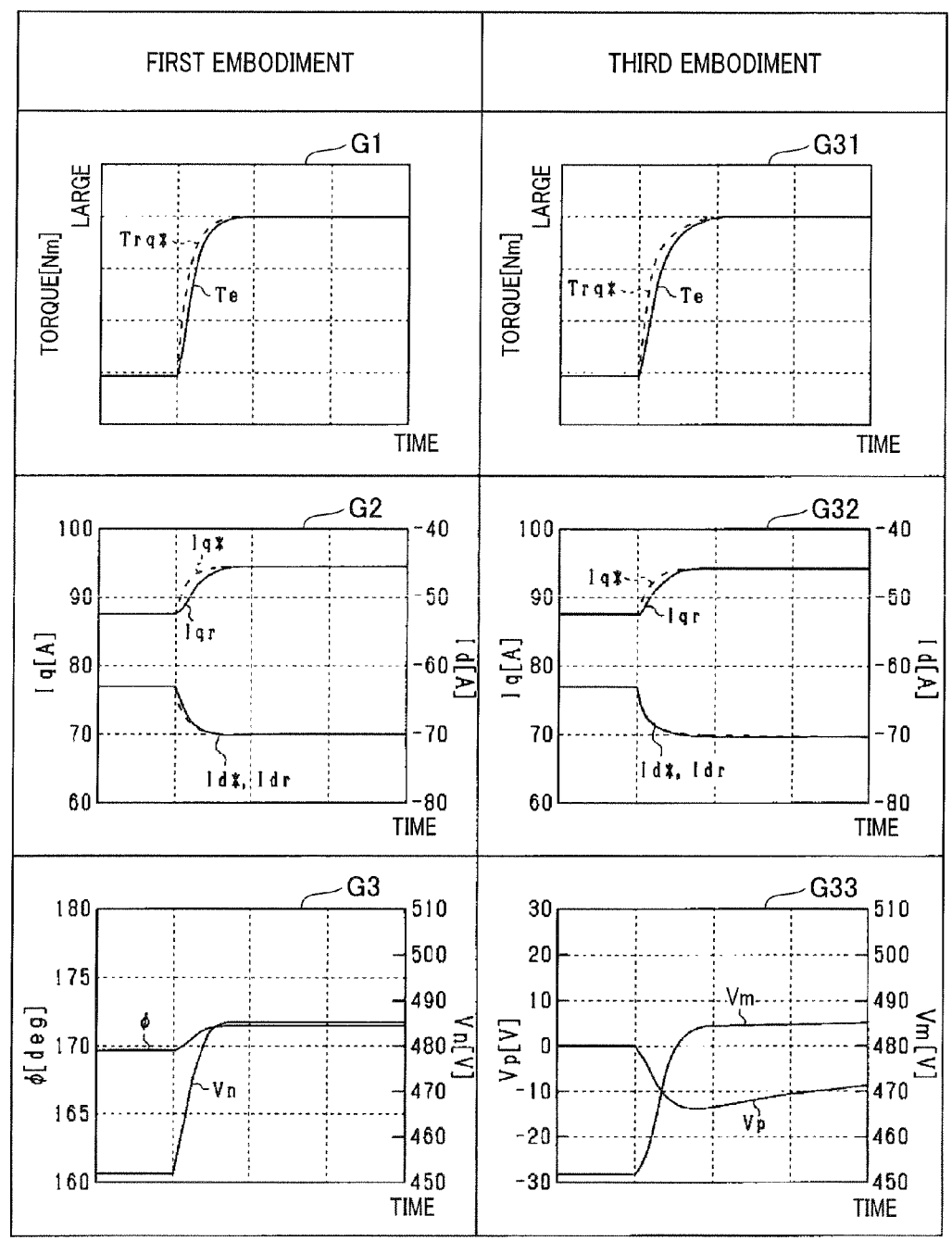
FIG. 19 is a diagram showing an advantage of improvement of current control accuracy achieved by the control apparatus according to the third embodiment as a result of comparison with respect to the control apparatus according to the first embodiment.

FIG. 19 schematically illustrates (1) The graph G1 illustrated in FIG. 10, which shows the first step response of the corrected estimated torque Te of the motor-generator 10

(2) The graph G2 illustrated in FIG. 10, which shows changes of the corrected d- and q-axis currents Idr and Iqr and the d- and q-axis command currents Id* and Iq* during the first step response (3) Changes of the voltage phase φ and the voltage amplitude Vn during the first step response (see graph G3)

(4) A third step response of the corrected estimated torque Te of the motor-generator 10 driven by the control system 50B according to the third embodiment when the request torque Trq* transiently changes from a value to a predetermined higher value in a predetermined very short time (see graph G31)

(5) Changes of the corrected d- and q-axis currents Idr and Iqr and the d- and q-axis command currents Id* and Iq* during the third step response according to the third embodiment (see graph G32)

(6) Changes of the p-axis voltage Vp and the m-axis voltage Vm during the third step response according to the third embodiment (see graph G33).

The scales of the vertical axes of the respective graphs G1 to G3 and G31 to G33 are identical to each other, and the scales of the horizontal axes of the respective graphs G1 to G3 and G31 to G33 are identical to each other.

FIG. 19 shows that calculation of the voltage correction ΔVm in the p-m coordinate system according to the third embodiment, which is merely replaced from calculation of the amplitude correction ΔV based on the λ-axis current Iλr in the λ-axis according to the first embodiment, reduces interference between the amplitude control and the phase control. This permits the control apparatus 50B to maintain both higher controllability of the torque of the motor-generator 10, and higher controllability of the three-phase currents flowing in the motor-generator 10 like the first embodiment.

Note that the graph G33 shows that an absolute value of the p-axis voltage Vp rises at the rising of the request torque Trq* in the third step response. This results from the filtering process applied to the angle η. After the rise, the p-axis voltage Vp will converge to zero if the steady state of the motor-generator 10 is maintained.

Fourth Embodiment

A control apparatus 50C for the motor-generator 10 according to the fourth embodiment of the present disclosure will be described with reference to FIGS. 20 to 22.

The structure and/or functions of the control apparatus 50C according to the fourth embodiment are different from the control apparatus 50 according to the first embodiment by the following points. So, the different points will be mainly described hereinafter.

A controller 30C of the control apparatus 50C is designed to perform an anti-windup task when the amplitude correction ΔV reaches a predetermined correction limit. In addition, the controller 30C is designed to select one of a first control mode for sinusoidal current-feedback PWM control and a second control mode including the over-modulation torque control and the rectangular-pulse torque control.

Next, an example of the specific structure of the controller 30C will be described with reference to FIG. 20. That is, the controller 30C includes (1) A current-feedback control unit, which includes the following modules 38*a* to 38*i* illustrated in FIG. 20, for performing the sinusoidal current-feedback PWM control in the first control mode (2) A torque control unit, which includes the modules 30*b*, 30*c*, 30*d*, 30*e*, 30*f*, 30*h*, 30*i*, 30*j*, 32*a*, 32*c*, 32*d*, 32*e*, 32*f*, 32*g*, and 30*j*, for performing the over-modulation torque control in the second control mode including the rectangular-pulse torque control.

Figure 20:
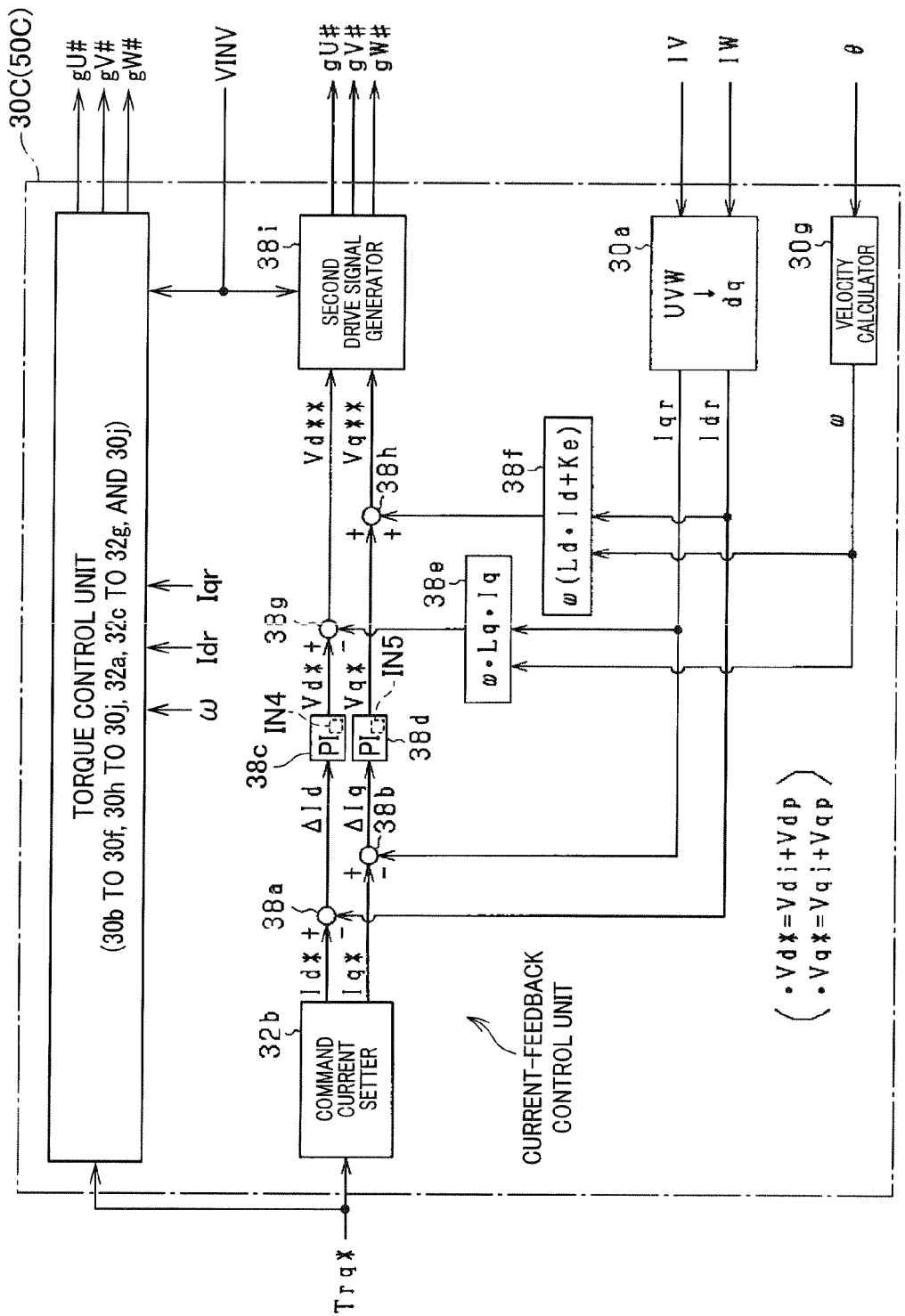
FIG. 20 is a block diagram schematically illustrating an example of the specific structure of a controller of a control apparatus according to the fourth embodiment.
Figure 21:
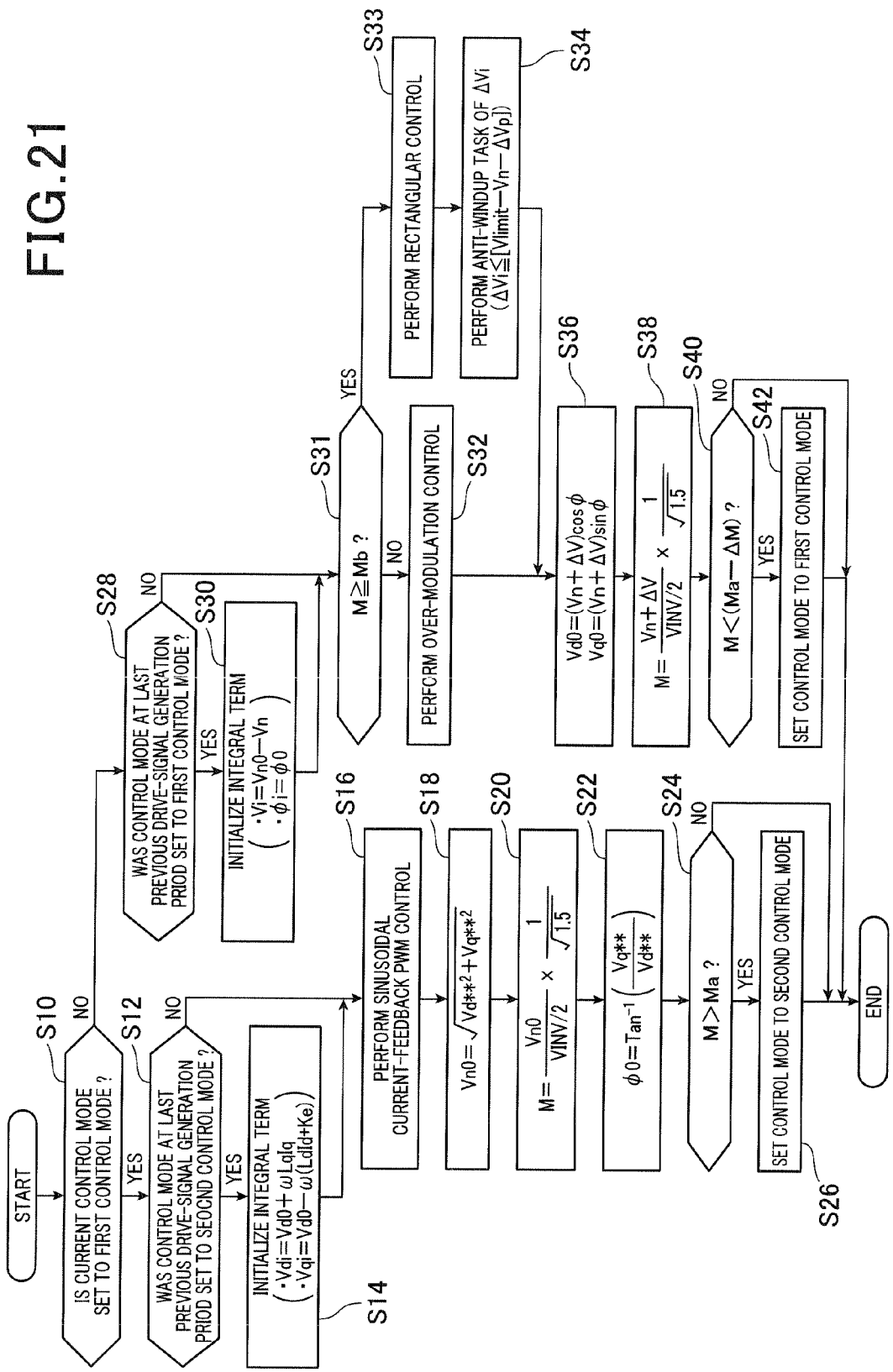
FIG. 21 is a flowchart schematically illustrating an inverter control routine carried out by the controller illustrated in FIG. 20.

In FIG. 20, identical modules between the controller 30C and the controller 30 illustrated in FIG. 2, to which identical reference characters are assigned, are omitted in description, and the different modules will be mainly described hereinafter.

A d-axis deviation calculator 38a is operatively connected to the two-phase converter 30a and the command current setter 32b. The d-axis deviation calculator 38a subtracts the d-axis current Idr obtained by the two-phase converter 30a from the d-axis command current Id* to thereby calculate a d-axis current deviation ΔId between the d-axis current Idr and the d-axis command current Id*.

A q-axis deviation calculator 38b is operatively connected to the two-phase converter 30a and the command current setter 32b. The q-axis deviation calculator 38b subtracts the q-axis current Iqr obtained by the two-phase converter 30a from the q-axis command current Iq* to thereby calculate a q-axis current deviation ΔIq between the q-axis current Iqr and the q-axis command current Iq*.

A d-axis command voltage calculator 38c is operatively connected to the d-axis deviation calculator 38a. The d-axis command voltage calculator 38c calculates, based on the d-axis current deviation ΔId, a d-axis command voltage Vd* serving as a manipulated variable for feedback controlling the d-axis current Idr to match with the d-axis command current Id*.

Specifically, in the fourth embodiment, the d-axis command voltage calculator 38c calculates the d-axis command voltage Vd* in accordance with a predetermined proportional gain and a predetermined integral gain of a PI feedback control algorithm (PI algorithm) using the d-axis current deviation ΔId as its input.

In the PI algorithm, the d-axis command voltage Vd* is expressed based on the sum of an output Vdp, i.e. a proportional gain term, of a proportional unit based on the proportional gain and an output Vdi, i.e. an integral gain term, of an integrator IN4 based on the integral gain.

The proportional gain for the d-axis command voltage Vd* contributes to change in the d-axis command voltage Vd* in proportion to the temporal d-axis current deviation ΔId from a target value of zero.

The integral gain is proportional to an accumulated offset of instantaneous values of the d-axis current deviation ΔId over time to reset the accumulated offset (steady-state deviation) over time to zero.

A q-axis command voltage calculator 38d is operatively connected to q-axis deviation calculator 38b. The q-axis command voltage calculator 38d calculates, based on the q-axis current deviation ΔIq, a q-axis command voltage Vq* serving as a manipulated variable for feedback controlling the q-axis current Iqr to match with the q-axis command current Iq*.

Specifically, in the fourth embodiment, the q-axis command voltage calculator 38d calculates the q-axis command voltage Vq* in accordance with a predetermined proportional gain and a predetermined integral gain of a PI feedback control algorithm (PI algorithm) using the q-axis current deviation ΔIq as its input.

In the PI algorithm, the q-axis command voltage Vq* is expressed based on the sum of an output Vqp, i.e. a proportional gain term, of a proportional unit based on the proportional gain and an output Vqi, i.e. an integral gain term, of an integrator IN5 based on the integral gain.

The proportional gain for the q-axis command voltage Vq* contributes to change in the q-axis command voltage Vq* in proportion to the temporal q-axis current deviation ΔIq from a target value of zero.

The integral gain is proportional to an accumulated offset of instantaneous values of the q-axis current deviation ΔIq over time to reset the accumulated offset (steady-state deviation) over time to zero.

The d- and q-axis command voltage calculators 38c and 38d serve as, for example, means for calculating command voltages, i.e. d- and q-axis command voltages Vd* and Vq*, to be applied to the motor-generator 10 as manipulated variables for feedback controlling (1I The first actual current component, such as a d-axis current Idr, to match with the first command current component, such as a d-axis command current Id*

(2) The second actual current component, such as a q-axis current Iqr, to match with the second command current component, such as a q-axis command current Iq*.

A d-axis non-interference term calculator 38e is operatively connected to the two-phase converter 30a and the velocity converter 30g. The d-axis non-interference term calculator 38e calculates the product of the electrical angular velocity ω, the q-axis current Iqr, and the q-axis inductance Lq as a non-interference term ω·Lq·Iqr with respect to the d-axis. The non-interference term ω·Lq·Iqr will be referred to as a d-axis non-interference term.

A q-axis non-interference term calculator 38f is operatively connected to the two-phase converter 30a and the velocity converter 30g. The q-axis non-interference term calculator 38f calculates the product of the d-axis current Idr and the d-axis inductance Ld, and calculates the sum of the calculated product (Ld·Idr) and a back-emf constant Ke corresponding to the rms value ψ of permanent-magnet flux linkage to each-phase armature winding. Then, the q-axis non-interference term calculator 38f calculates the product of the electrical angular velocity ω and the sum of the calculated product (Ld·Idr) and the back-emf constant Ke as a non-interference term ω·(Ld·Idr+Ke) with respect to the q-axis. The non-interference term ω·(Ld·Idr+Ke) will be referred to as a q-axis non-interference term ω·(Ld·Idr+Ke).

A d-axis interference-removal controller 38g is operatively connected to the d-axis command voltage calculator 38c and the d-axis non-interference term calculator 38e. The d-axis interference-removal controller 38g subtracts the d-axis non-interference term ω·Lq·Iqr from the d-axis command voltage Vd* obtained by the d-axis command voltage calculator 38c to thereby calculate a final d-axis command voltage Vd**.

A q-axis interference-removal controller 38h is operatively connected to the q-axis command voltage calculator 38d and the q-axis non-interference term calculator 38f. The q-axis interference-removal controller 38h subtracts the q-axis non-interference term ω·(Ld·Idr+Ke) from the q-axis command voltage Vq* obtained by the q-axis command voltage calculator 38d to thereby calculate a final q-axis command voltage Vq**.

A second drive signal generator 38i is operatively connected to the d-axis non-interference controller 38g and q-axis non-interference controller 38h. The second drive signal generator 30i, which serves as, for example, a second switching unit, selects one of the first control mode and the second control mode based on a value of the modulation factor M. Then, the second drive signal generator 38i generates, for each drive-signal generation period, the drive signals gα# in the selected one of the first control mode and the second control mode using the final d-axis command voltage Vd and the final q-axis command voltage Vq.

When the corrected voltage amplitude (Vn+ΔV) becomes equal to or higher than the predetermined upper limit at which the modulation factor M reaches the second specified value Mb, the amplitude of the output voltage of the inverter 20 is fixed to the input voltage VINV independently of the corrected voltage amplitude (Vn+ΔV). This automatically stops the amplitude control of the over-modulation torque control in the second control mode. This stably shifts the controller 30C, that is, the second drive signal generator 38i, from the over-modulation torque control including the amplitude control and the phase control to the rectangular-pulse torque control including the phase control without switching the control mode of the controller 30C from the second control mode to another mode. While performing the rectangular-pulse torque control, the controller 30C performs the anti-windup task to limit the integral gain term ΔVi constituting the amplitude correction ΔV. This prevents the amplitude correction ΔV from exceeding the predetermined correction limit. This prevents the corrected voltage amplitude (Vn+ΔV) from exceeding a predetermined upper limit, which will be referred to as an upper-limit amplitude Vlimit.

Next, how the controller 30C switches its control mode between the first control mode and the second control mode will be described in accordance with an inverter control routine including a set of instructions stored in the memory 30ME and illustrated in FIG. 21. For example, the controller 30C starts to perform the inverter control routine every drive-signal generation period.

When starting the inverter control routine, the controller 30C determines whether its current control mode is set to the first control mode for the sinusoidal current-feedback PWM control in step S10. When the controller 30C determines that the current control mode is set to the first control mode (YES in step S10), the inverter control routine proceeds to step S12. In step S12, the controller 30C determines whether the control mode at the latest previous drive-signal generation period was set to the second control mode for the over-modulation torque control including the rectangular-pulse torque control.

When the controller 30C determines that the control mode at the latest previous drive-signal generation period was set to the second control mode (YES in step S12), the inverter control routine proceeds to step S14. In step S14, the controller 30C initializes the integral gain term Vdi for the d-axis command voltage Vd* in the d-axis command voltage calculator 38c to a predetermined first value. In step S14, the controller 30C also initializes the integral gain term Vqi for the q-axis command voltage Vq* in the q-axis command voltage calculator 38d to a predetermined second value.

In the third embodiment, the controller 30C initializes the integral gain term Vdi to the predetermined first value that is the sum of the d-axis non-interference term ω·Lq·Iq and a d-axis initial voltage value Vd0. The controller 30C also initializes the integral gain term Vqi to the predetermined second value that is the subtraction of the q-axis non-interference term ω·(Ld·Id+Ke) from a q-axis initial voltage value Vq0. The d- and q-axis initial voltage values Vd0 and Vq0 will be calculated in step S36 described later.

Otherwise, when it is determined that the control mode at the latest previous drive-signal generation period was unset to the second control mode (NO in step S12), or that the operation in step S14 has been completed, the inverter control routine proceeds to step S16. In step S16, the controller 30C performs the sinusoidal current-feedback PWM control based on the modules 32b and 38a to 38i described hereinbefore in accordance with FIG. 20 for a current drive-signal generation period.

Next, the controller 30C calculates the sum of the square of the final d-axis command voltage Vd and the square of the final q-axis command voltage Vq in step S18. In step S18, the controller 30C calculates, by the second drive signal generator 38i, the square root of the sum of the square of the final d-axis command voltage Vd and the square of the final q-axis command voltage Vq to thereby calculate an initial value Vn0 of the amplitude voltage Vn.

Next, the controller 30C divides the initial value V0 of the voltage amplitude Vn by half of the input voltage VINV to obtain a quotient in step S20. Then, the controller 30C divides the quotient by $\sqrt{1.5}$, i.e.

$$\sqrt{\frac{3}{2}},$$

thus calculating a value of the modulation factor M in step S20.

Following the operation in step S20, the controller 30C divides the final q-axis command voltage Vq by the final d-axis command voltage Vd to obtain a quotient in step S22. Then, the controller 30C calculates the arctangent of the quotient to thereby calculate an initial value φ0 of the voltage phase φ in step S22. Like the calculation of the arctangent of the $$\left(\frac{\Delta Iq\phi}{\Delta Id\phi}\right)$$

in the equation [eq7], the controller 30C calculates the initial value φ0 of the voltage phase φ between −π and +π inclusive.

Next, the controller 30C determines whether the controller 30C switches its control mode from the first control mode for the sinusoidal current-feedback PWM control to the second control mode for the over-modulation torque control including the rectangular-pulse torque control in step S24. For example, in step S24, the controller 30C determines whether the controller 30C switches its control mode from the first control mode to the second control mode based on determination of whether the value of the modulation factor M calculated in step S20 is equal to or more than the first specified value Ma set forth above.

When it is determined that the value of the modulation factor M calculated in step S20 is more than the first specified value Ma (YES in step S24), the controller 30C determines that the controller 30C should switch its control mode from the first control mode to the second control mode in step S26. Then, the controller 30C sets the control mode to the second control mode in step S26. After setting of the control mode in step S26, the controller 30C terminates the inverter control routine. Otherwise, when it is determined that the value of the modulation factor M calculated in step S20 is equal to or smaller than the first specified value Ma (NO in step S24), the controller 30C terminates the inverter control routine.

On the other hand, when it is determined that the current control mode is unset to the first control mode (NO in step S10), the controller 30C determines that the current control mode is set to the second control mode, so that the inverter control routine proceeds to step S28. In step S28, the controller 30C determines whether the control mode at the latest previous drive-signal generation period was set to the first control mode for the sinusoidal current-feedback PWM control.

When it is determined that the control mode at the latest previous drive-signal generation period was set to the first control mode (YES in step S28), the inverter control routine proceeds to step S30. In step S30, the controller 30C initializes the integral gain term ΔVi constituting the amplitude correction ΔV in the amplitude correction calculator 32f to a predetermined third value. In step S30, the controller 30C also initializes the integral gain term φi constituting the voltage phase φ in the phase setter 30e to a predetermined fourth value.

In the fourth embodiment, the controller 30C initializes the integral gain term ΔVi to the predetermined third value that is the subtraction of the voltage amplitude Vn calculated by the velocity multiplier 30h from the initial value Vn0 of the voltage amplitude Vn in step S30. In step S30, the controller 30C also initializes the integral gain term φi to the initial value φ0 of the voltage phase φ calculated in step S22.

Note that the operations in steps S18, S20, and S30 cause the integral gain term ΔVi and the integral gain term φi for the over-modulation torque control to be stably transferred from those for the sinusoidal PWM control.

Otherwise, when it is determined that the control mode at the latest previous drive-signal generation period was unset to the first control mode (NO in step S28), or that the operation in step S30 has been completed, the inverter control routine proceeds to step S31.

In step S31, the controller 30C serves as, for example, means for transferring the first control, i.e. the over-modulation torque control, to the second control, i.e. the rectangular-pulse torque control when a second manipulated variable, such as the voltage correction ΔV, reaches an upper limit. Specifically, in step S31, the controller 30C determines whether a value of the modulation factor M is equal to or greater than the second specified value Mb.

When the controller 30C determines that the value of the modulation factor M is smaller than the second specified value Mb (NO in step S31), the inverter control routine proceeds to step S32.

In step S32, the controller 30C performs the over-modulation torque control based on the modules 30b to 30f, 30h to 30j, 32a, and 32c to 32g described hereinbefore in accordance with FIG. 2 for a current drive-signal generation period. Thereafter, the inverter control routine proceeds to step S36.

Otherwise, when the controller 30C determines that the value of the modulation factor M is equal to or greater than the second specified value Mb (YES in step S31), the inverter control routine proceeds to step S33.

In step S33, the controller 30C performing the rectangular-pulse torque control, i.e. the phase control. That is, when the modulation factor M is equal to or greater than the second specified value Mb, the amplitude of the output voltage of the inverter 20 is fixed to the input voltage VINV. This automatically stops the amplitude control of the over-modulation torque control in the second control mode.

Specifically, the operations in steps S31 to S33 of the controller 30C serve as, for example, means (steps S32, S33) for performing one of (1) The first control, i.e. the over-modulation torque control, to manipulate both a first manipulated variable and a second manipulated variable to thereby control a controlled variable of the motor-generator 10 to match with a command value (2) The second control, i.e. the rectangular-pulse torque control, to manipulate only the first manipulated variable to thereby control the controlled variable to match with the command value.

When transferring from the over-modulation torque control to the rectangular-pulse torque control, the controller 30C, which serves, for example, an anti-windup task performing means, performs the anti-windup task in step S34. The anti-windup task aims to limit the amplitude correction to be equal to or smaller than the correction limit, thus limiting the corrected voltage amplitude (Vn+ΔV) being equal to or smaller than the predetermined upper limit Vlimit.

For example, the controller 30C subtracts the sum of the voltage amplitude Vn and the proportional gain term ΔVp constituting the amplitude correction ΔV from the predetermined upper limit Vlimit in step S34. Then, the controller 30C determines whether the integral gain term ΔVi exceeds the result of the subtraction in step S34. When it is determined that the integral gain term ΔVi exceeds the result of the subtraction, the controller 30C replaces the integral gain term ΔVi with the result of the subtraction in step S34, thus limiting the integral gain term ΔVi to be equal to or less than the value, i.e. correction limit, given by (Vlimit−Vn−ΔVp). In other words, the controller 30C limits the corrected amplitude (Vn+ΔV) to be equal to or smaller than the predetermined upper limit Vlimit. This limitation can be derived from an equation obtained by solving, with respect to the integral gain term ΔVi, the equation [eq11], whose amplitude correction ΔV has been replaced with the predetermined upper limit Vlimit.

Following the operation in step S32 or S34, the controller 30C calculates an initial value Vd0 of the d-axis voltage Vd and an initial value Vq0 of the q-axis voltage Vq in step S36. For example, in step S36, the controller 30C multiplies, by a cosine function that has the voltage phase φ as an argument thereof, the sum of the voltage amplitude Vn and the voltage correction ΔV, thus calculating the initial value Vd0 of the d-axis voltage Vd; the cosine function is represented as cos φ. In addition, in step S36, the controller 30C multiplies, by a sine function that has the voltage phase φ as an argument thereof, the sum of the voltage amplitude Vn and the voltage correction ΔV, thus calculating the initial value Vq0 of the q-axis voltage Vq; the cosine function is represented as sin φ.

The operations in steps S36 and S14 cause the integral gain term Vdi and the integral gain term Vqi for the sinusoidal PWM control to be stably transferred from those for the over-modulation control.

Following the operation in step S36, the controller 30C divides the sum of the voltage amplitude Vn and the voltage correction ΔV by half of the input voltage VINV to obtain a quotient in step S38. Then, the controller 30C divides the quotient by $\sqrt{1.5}$, i.e.

$$\sqrt{\frac{3}{2}},$$

thus calculating a value of the modulation factor M in step S38.

Next, the controller 30C determines whether the controller 30C switches its control mode from the second control mode for the over-modulation torque control including the rectangular-pulse torque control to the first control mode for the sinusoidal current-feedback PWM control in step S40. For example, in step S40, the controller 30C determines whether the value of the modulation factor M calculated in step S38 is less than a value that is subtraction of a preset value ΔM, such as 0.05, from the first specified value Ma;

the value is represented as (Ma−ΔM). Then, in step S40, the controller 30C determines whether the controller 30C switches its control mode from the first control mode to the second control mode based on the determination of whether the value of the modulation factor M calculated in step S38 is less than the value (Ma−ΔM). The preset value ΔM is used to prevent chattering due to frequent switching between the first control mode and the second control mode.

When it is determined that the value of the modulation factor M calculated in step S38 is less than the value (Ma−ΔM) (YES in step S40), the controller 30C determines that the controller 30C should switch its control mode from the second control mode to the first control mode in step S42. Then, the controller 30C sets the control mode to the first control mode in step S42. After setting of the control mode in step S42, the controller 30C terminates the inverter control routine.

Otherwise, when it is determined that the value of the modulation factor M calculated in step S38 is equal to or more than the value (Ma−ΔM) (NO in step S40), the controller 30C terminates the inverter control routine.

Next, technical advantages achieved by the structure of the controller 30C of the control system 50C according to the fourth embodiment will be described hereinafter with reference to FIG. 22 while comparing with that of a controller of a control system according to a second comparative example. The controller according to the second comparative example is substantially designed to be identical to the controller 30C according to the fourth embodiment except that the controller according to the second comparison example switches its control mode to (1) A sinusoidal current-feedback PWM control mode when a value of the modulation factor M is within a predetermined first region defined, for example, to be smaller than the first specified value Ma (2) A known over-modulation current-feedback PWM control mode when the value of the modulation factor M is within a predetermined second region defined, for example, to be equal to or greater than the first specified value Ma and smaller than the second specified value Mb (3) A rectangular control mode, i.e. a phase control mode or a torque feedback control mode, that performs the phase control set forth above when the value of the modulation factor M is within a predetermined third region defined, for example, to be equal to or greater than the second specified value Mb.

Figure 22:
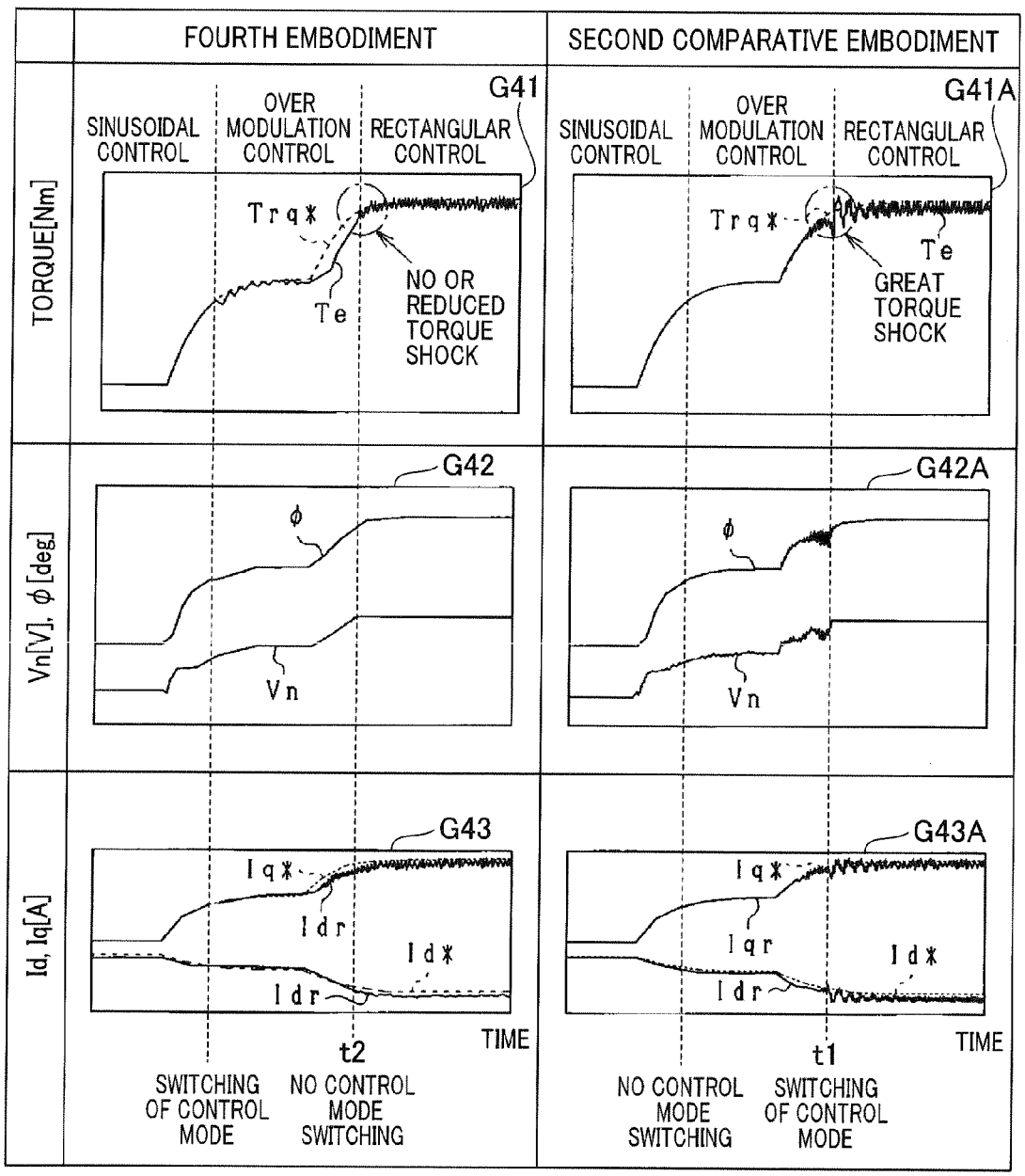
FIG. 22 is a view showing advantages achieved by the control apparatus according to the fourth embodiment as a result of comparison with respect to a control apparatus according to a second comparative example.

FIG. 22 schematically illustrates (1) A fifth step response, i.e. a fifth transient response, of the corrected estimated torque Te of the motor-generator 10 driven by the control system 50C according to the fourth embodiment when the request torque Trq* transiently changes from a value to a predetermined higher value in a predetermined very short time (see graph G41)

(2) Changes of the voltage phase φ and the voltage amplitude Vn during the fifth step response according to the fourth embodiment (see graph G42)

(3) Changes of the corrected d- and q-axis currents Idr and Iqr and the d- and q-axis command currents Id* and Iq* during the fifth step response according to the fourth embodiment (see graph G43)

(4) A sixth step response, i.e. a sixth transient response, of the corrected estimated torque Te of the motor-generator 10 driven by the control system according to the second comparative example when the request torque Trq* transiently changes from a value to a predetermined higher value in a predetermined very short time (see graph G41A)

(5) Changes of the voltage phase φ and the voltage amplitude Vn during the sixth step response according to the second comparative example (see graph G42A)

(3) Changes of the corrected d- and q-axis currents Idr and Iqr and the d- and q-axis command currents Id* and Iq* during the sixth step response according to the second comparative example (see graph G43A).

The comparative example requires switching of the control mode of the controller among the sinusoidal current-feedback PWM control mode, the over-modulation current-feedback PWM control mode, and the rectangular control mode. The over-modulation current-feedback PWM control mode may result in reduction of the controllability of the motor-generator 10 due to high-frequency components contained in the output voltage of the inverter 20. The over-modulation current-feedback PWM control mode also may result in reduction of the controllability of the motor-generator 10 due to some cases where desired voltage amplitudes matching with respective command voltage amplitudes may not be obtained at some frequencies of the carrier signal.

In view of these issues, the technology disclosed in Japanese Patent Application Publication No. 2010-088205 filters at least one pair of d- and q-axis command currents and d- and q-axis command voltages for the over-modulation current-feedback PWM control mode. This filtering distorts each of three-phase sinusoidal command voltages based on the filtered at least one pair of d- and q-axis command currents and d- and q-axis command voltages from a corresponding one of sinusoidal command voltages obtained by the sinusoidal current-feedback PWM control mode.

In view of these issues, the technology disclosed in Japanese Patent Application Publication No. 2008-312420 corrects three-phase command voltages according to a number of a PWM controller; the number is defined by division of the frequency of the triangular carrier signal by the frequency of the three-phase command voltages. This aims to improve the controllability of an AC motor corresponding to the motor-generator 10.

With respect to the technology disclosed in the Application Publication No. 2010-088205, users desire for the technology to address the reduction in the control response for the controlled variable of an AC motor corresponding to the motor-generator 10. The technology disclosed in the Application Publication No. 2008-312420 makes it possible to control the output voltage of the inverter for the over-modulation current-feedback PWM control mode with a higher accuracy, thus improving the controllability of the AC motor without distorting each of three-phase sinusoidal command voltages.

Unfortunately, each of the technologies disclosed in the Application Publications No. 2010-088205 and 2008-312420 requires switching of its control mode from the over-modulation current-feedback PWM control mode to the rectangular control mode when performing the rectangular control mode. The switching of the control mode from the over-modulation current-feedback PWM control mode to the rectangular control mode requires whole change of the structure of performing the over-modulation current-feedback PWM control mode to that of performing the rectangular control mode (see timing t1 in FIG. 22). This whole change may make it difficult to stably switch the control mode from the over-modulation current-feedback PWM control mode to the rectangular control mode, resulting in the occurrence of torque shock.

Actually, FIG. 22 shows the occurrence of great torque shock when the control mode of the controller according to the second comparative example is switched from the over-modulation current-feedback PWM control mode to the rectangular control mode (see the graph G41A).

In contrast, the control system 50C according to the fourth embodiment transfers from the over-modulation torque control to the rectangular-pulse torque control without changing from the structure of performing the over-modulation torque control to the structure of performing the rectangular-pulse torque control. This reduces the risk of the occurrence of torque shock even if the over-modulation torque control is transferred to the rectangular-pulse torque control (see timing t2 in FIG. 22).

In addition, like the first embodiment, the control system 50C is configured to adjust the λ-axis current Iλr in the λ-axis, which is a non-interference axis having no interferes from change of the voltage phase φ, to match with the λ-axis command current Iλ* in the second control mode. This results in the d-axis and q-axis currents Idr and Iqr to stably follow the respective d- and q-axis command currents Id* and Iq*. That is, the control system 50C performs (1) The sinusoidal current-feedback PWM control to cause the d-axis and q-axis currents Idr and Iqr to stably follow the respective d- and q-axis command currents Id* and Iq* when the operation range of the inverter 20 is within the sinusoidal PWM control range (2) The over-modulation torque control to cause the λ-axis current Iλr in the λ-axis, which is a non-interference axis having no interferes from change of the voltage phase φ, to follow the λ-axis command current Iλ* when the operation range of the inverter 20 is within the over-modulation control range (3) The rectangular-pulse torque control to control the phase φ of the output voltage vector Vnvt to cause the torque deviation ΔT to be zero when the operation range of the inverter 20 is within the rectangular-pulse control range.

Thus, the control system 50C achieves both higher and more stable controllability of the motor-generator 10 over the whole of the operation ranges of the inverter 20.

The control system 50C according to the fourth embodiment particularly performs the anti-windup task to prevent the amplitude correction ΔV from exceeding the correction limit when transferring from the over-modulation torque control to the rectangular-pulse torque control. This anti-windup task prevents the integral gain term ΔVi from accumulating when the amplitude correction ΔV reaches the correction limit. This prevents a delay in the response of the amplitude correction calculator 32f, i.e. the controller 30C.

Fifth Embodiment

A control apparatus 50D for the motor-generator 10 according to the fourth embodiment of the present disclosure will be described with reference to FIGS. 23 and 24.

The structure and/or functions of the control apparatus 50D according to the fifth embodiment are different from the control apparatuses 50B and 50C according to the third and fourth embodiments by the following points. So, the different points will be mainly described hereinafter.

A controller 30D of the control apparatus 50D is designed to perform the anti-windup task set forth above when the sum of the voltage amplitude Vn and the amplitude correction ΔV reaches the predetermined upper limit Vlimit. In addition, the controller 30D is designed to select one of the first control mode for the sinusoidal current-feedback PWM control and the second control mode including the over-modulation torque control and the rectangular-pulse torque control.

The controller 30D according to the fifth embodiment is designed to perform, by a current-feedback control unit, the sinusoidal current-feedback PWM control in accordance with the p-m coordinate system set forth above.

Hereinafter, how to design the sinusoidal current-feedback PWM control in accordance with the p-m coordinate system will be described.

Transforming the voltage equation [eq1] to a voltage equation in the p-m coordinate system drives the following equation [eq26]:

$$\begin{bmatrix} Vd \\ Vq \end{bmatrix} = \begin{bmatrix} R + Lp \cdot s + \omega \cdot Lpm & -\omega \cdot Lm - Lpm \cdot s \\ \omega \cdot Lp - Lpm \cdot s & R + Lm \cdot s - \omega \cdot Lpm \end{bmatrix} \begin{bmatrix} Ip \\ Im \end{bmatrix} + \quad [eq26]$$

$$\omega \cdot Ke \begin{bmatrix} \sin\eta \\ \cos\eta \end{bmatrix}$$

Where $$Lp = Ld \cdot \cos^2\eta + Lq \cdot \sin^2\eta = \frac{1}{2}\{Ld + Lq - (Lq - Ld)\cos 2\eta\}$$

$$Lm = Ld \cdot \sin^2\eta + Lq \cdot \cos^2\eta = \frac{1}{2}\{Ld + Lq - (Lq - Ld)\cos 2\eta\}$$

$$Lpm = \frac{Ld - Lq}{2}\sin 2\eta$$

Note that the equation [eq26] changes the differential operator p to a Laplace operator s. Based on the equation [eq26], a p-axis non-interference term Vpff and an m-axis non-interference term Vmff are expressed by the following equations [eq27] and [eq28]:

$$Vpff = \omega(Lm \cdot Im - Ke \cdot \sin \eta) \qquad [eq27]$$

$$Vlff = \omega(Lp \cdot Ip + Ke \cdot \cos \eta) \qquad [eq28]$$

Next, an example of the specific structure of the controller 30D will be described with reference to FIG. 23. In FIG. 23, identical modules between the current-feedback control unit of the controller 30D and that of the controller 30C illustrated in FIG. 20, to which identical reference characters are assigned, are omitted in description, and the different modules will be mainly described hereinafter.

The current-feedback control unit of the controller 30D includes a first p-m converter 39a, an angle calculator 39b, a second p-m converter 39c, a p-axis deviation calculator 39d, an m-axis deviation calculator 39e, a p-axis command voltage calculator 39f, and an m-axis command voltage calculator 39g. The controller 30D also includes a p-axis non-interference term calculator 39h, an m-axis non-interference term calculator 39i, a p-axis non-interference controller 39j, an m-axis non-interference controller 39k, and a second drive signal generator 39l.

The first p-m converter 39a is operatively connected to the angle calculator 39b. The first p-m converter 39a converts the d- and q-axis command currents Id* and Iq* in the d-q coordinate system to p- and m-axis command currents Ip* and Im* in the p-m coordinate system using the angler η formed between the d-axis of the d-q coordinate system and the p-axis of the p-m coordinate system (see FIG. 17). The angle η formed between the d-axis of the d-q coordinate system and the p-axis of the p-m coordinate system is calculated by the angle calculator 39b. How the angle calculator 39b calculates the angle η formed between the d-axis of the d-q coordinate system and the p-axis of the p-m coordinate system will be described later.

The second p-m converter 39c is operatively connected to the two-phase converter 30a. The second p-m converter 39c, which serves as, for example, an actual current calculator, converts the d- and q-axis currents Idr and Iqr in the d-q coordinate system to p- and m-axis currents Ipr and Imr in the p-m coordinate system using the angle η calculated by the angle calculator 39b.

The p-axis deviation calculator 39d is operatively connected to the first and second p-m converters 39a and 39b. The p-axis deviation calculator 39d subtracts the p-axis current Ipr obtained by the second p-m converter 39c from the p-axis command current Id* obtained by the first p-m converter 30a to thereby calculate a p-axis current deviation ΔIp between the p-axis current Ipm and the p-axis command current Ip*.

The m-axis deviation calculator 39e is operatively connected to the first and second p-m converters 39a and 39b. The m-axis deviation calculator 39e subtracts the m-axis current Imr obtained by the second p-m converter 39c from the m-axis command current Im* obtained by the first p-m converter 30a to thereby calculate an m-axis current deviation ΔIm between the m-axis current Imr and the m-axis command current Im*.

The p-axis command voltage calculator 39f is operatively connected to the p-axis deviation calculator 39d. The p-axis command voltage calculator 39f calculates, based on the p-axis current deviation ΔIp, a p-axis command voltage Vp* serving as a manipulated variable for feedback controlling the p-axis current Ipr to match with the p-axis command current Ip*.

Specifically, the p-axis command voltage calculator 39f calculates the p-axis command voltage Vp* in accordance with a predetermined proportional gain and a predetermined integral gain of a PI feedback control algorithm (PI algorithm) using the p-axis current deviation ΔIp as its input.

In the PI algorithm, the p-axis command voltage Vp* is expressed based on the sum of an output Vpp, i.e. a proportional gain term, of a proportional unit based on the proportional gain and an output Vpi, i.e. an integral gain term, of an integrator IN6 based on the integral gain.

The proportional gain for the p-axis command voltage Vp* contributes to change in the p-axis command voltage Vp* in proportion to the temporal p-axis current deviation ΔIp from a target value of zero.

The integral gain is proportional to an accumulated offset of instantaneous values of the p-axis current deviation ΔIp over time to reset the accumulated offset (steady-state deviation) over time to zero.

The m-axis command voltage calculator 39g is operatively connected to the m-axis deviation calculator 39l. The m-axis command voltage calculator 39g calculates, based on the m-axis current deviation ΔIm, an m-axis command voltage Vm* serving as a manipulated variable for feedback controlling the m-axis current Imr to match with the m-axis command current Im*.

Specifically, the m-axis command voltage calculator 39g calculates the m-axis command voltage Vm* in accordance with a predetermined proportional gain and a predetermined integral gain of a PI feedback control algorithm (PI algorithm) using the p-axis current deviation ΔIm as its input.

In the PI algorithm, the m-axis command voltage Vm* is expressed based on the sum of an output Vmp, i.e. a proportional gain term, of a proportional unit based on the proportional gain and an output Vmi, i.e. an integral gain term, of an integrator IN7 based on the integral gain.

The proportional gain for the m-axis command voltage Vm* contributes to change in the m-axis command voltage Vm* in proportion to the temporal m-axis current deviation ΔIm from a target value of zero.

The integral gain is proportional to an accumulated offset of instantaneous values of the m-axis current deviation ΔIm over time to reset the accumulated offset (steady-state deviation) over time to zero.

The p-axis non-interference term calculator 39h is operatively connected to the velocity calculator 30g, the angle calculator 39b, and the second p-m converter 39b. The p-axis non-interference term calculator 39h calculates the p-axis non-interference term Vpff in accordance with the equation [eq27] using the angle η calculated by the angle calculator 39b, the electrical angle velocity ω calculated by the velocity calculator 30g, and the m-axis current Imr obtained by the second p-m converter 39b.

The m-axis non-interference term calculator 39i is operatively connected to the velocity calculator 30g, the angle calculator 39b, and the second p-m converter 39b. The m-axis non-interference term calculator 39i calculates the m-axis non-interference term Vmff in accordance with the equation [eq28] using the angle η calculated by the angle calculator 39b, the electrical angle velocity ω calculated by the velocity calculator 30g, and the p-axis current Ip obtained by the second p-m converter 39b.

The p-axis non-interference controller 39j is operatively connected to the p-axis command voltage calculator 39f and the p-axis non-interference term calculator 39h. The p-axis non-interference controller 39j subtracts the p-axis non-interference term Vpff from the p-axis command voltage Vp* to thereby calculate a final p-axis command voltage Vp**.

The m-axis non-interference controller 39k is operatively connected to the m-axis command voltage calculator 39g and the m-axis non-interference term calculator 39i. The m-axis non-interference controller 39k adds the m-axis non-interference term Vmff to the m-axis command voltage Vm* to thereby calculate a final m-axis command voltage Vm**.

The angle calculator 39b is operatively connected to the p- and m-axis non-interference controllers 39j and 39k in addition to the first p-m converter 39a, the p-axis non-interference term calculator 39h, and the m-axis non-interference term calculator 39i. The angle calculator 39b calculates the angle η formed between the d-axis of the d-q coordinate system and the p-axis of the p-m coordinate system using the final p- and m-axis command voltages Vp and Vm. For example, the angle calculator 39b substitutes the final p- and m-axis command voltages Vp and Vm into the p- and m-axis voltage components Vp and Vm of the equation [eq25], and substitutes an m-axis component of the output voltage vector Vnvt to the correction ΔVm of the equation [eq25]. This calculates the voltage factor φ. Then, the angle calculator 39b subtracts π/2 from the calculated voltage phase φ, thus calculating the angle η formed between the d-axis of the d-q coordinate system and the p-axis of the p-m coordinate system.

The second drive signal generator 39l is operatively connected to the p-axis non-interference controller 39j and m-axis non-interference controller 39k. The second drive signal generator 39l, which serves as, for example, a second switching unit, selects one of the first control mode and the second control mode based on a value of the modulation factor M. Then, the second drive signal generator 39l generates, for each drive-signal generation period, the drive signals gα# in the selected one of the first control mode and the second control mode using the final p-axis command voltage Vp and the final m-axis command voltage Vm.

Like the fourth embodiment, when the corrected voltage amplitude (Vm+ΔVm) becomes equal to or higher than the predetermined upper limit at which the modulation factor M reaches the second specified value Mb, the amplitude of the output voltage of the inverter 20 is fixed to the input voltage VINV independently of the corrected voltage amplitude (Vm+ΔVm). This automatically stops the amplitude control of the over-modulation torque control in the second control mode.

Next, how the controller 30D switches its control mode between the first control mode and the second control mode will be described in accordance with an inverter control routine including a set of instructions stored in the memory 30ME and illustrated in FIG. 24. For example, the controller 30D starts to perform the inverter control routine every drive-signal generation period. In FIG. 23, identical steps, i.e. instructions, illustrated in FIG. 21, to which identical step numbers are assigned, are omitted in description, and the different steps will be mainly described hereinafter.

Figure 23:
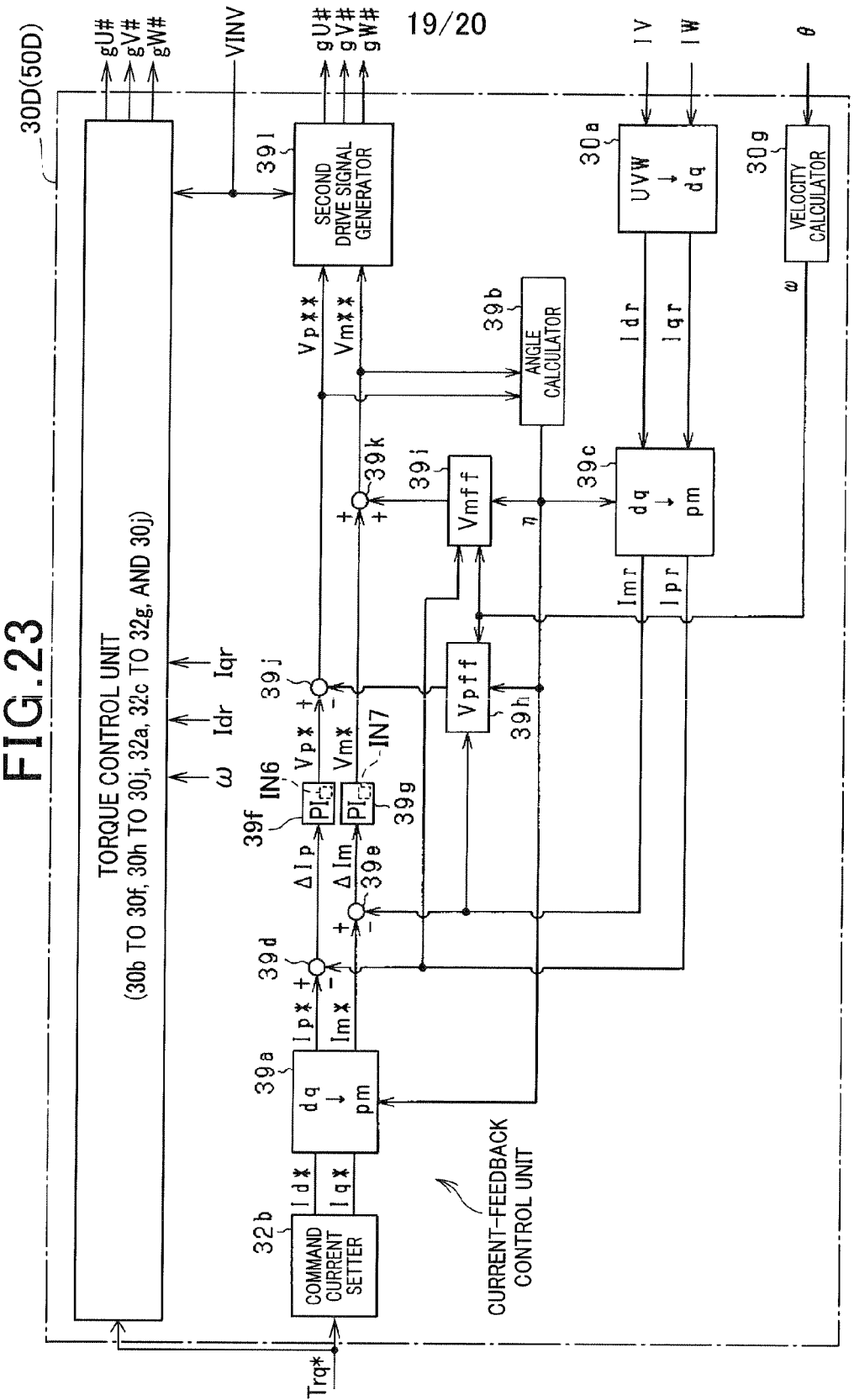
FIG. 23 is a block diagram schematically illustrating an example of the specific structure of a controller of a control apparatus according to the fifth embodiment.
Figure 24:
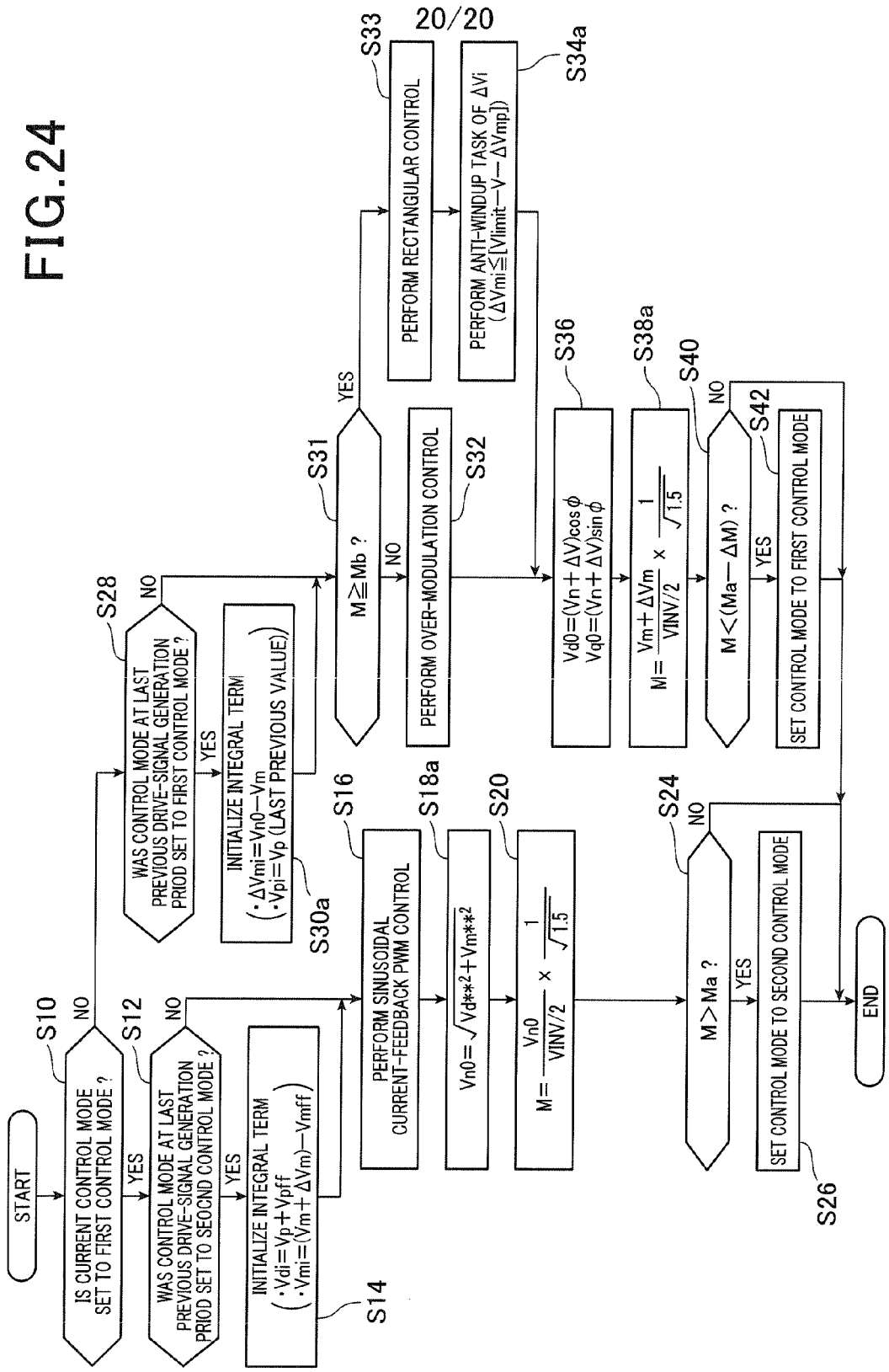
FIG. 24 is a flowchart schematically illustrating an inverter control routine carried out by the controller illustrated in FIG. 23.

Referring to FIG. 23, when the controller 30D determines that the control mode at the latest previous drive-signal generation period was set to the second control mode (YES in step S12), the inverter control routine proceeds to step S14a. In step S14a, the controller 30D initializes the integral gain term Vpi for the p-axis command voltage Vp* in the p-axis command voltage calculator 39f to a predetermined first value. In step S14a, the controller 30D also initializes the integral gain term Vmi for the m-axis command voltage Vm* in the m-axis command voltage calculator 39g to a predetermined second value.

In the fourth embodiment, the controller 30D initializes the integral gain term Vpi to the predetermined first value that is the sum of the p-axis non-interference term Vpff and the p-axis voltage Vp calculated by the phase setter 30k. The controller 30D also initializes the integral gain term Vmi to the predetermined second value that is the subtraction of the m-axis non-interference term Vmff from the corrected m-axis voltage (Vm+ΔVm) obtained by the corrector 30i.

When it is determined that the control mode at the latest previous drive-signal generation period was unset to the second control mode (NO in step S12), or that the operation in step S14a has been completed, the inverter control routine proceeds to step S16. After the operation in step S16 has been completed, the inverter control routine proceeds to step S18a.

In step S18a, the controller 30D calculates the sum of the square of the final p-axis command voltage Vp and the square of the final m-axis command voltage Vm. Then, the controller 30D calculates, by the second drive signal generator 39l, the square root of the sum of the square of the final p-axis command voltage Vp and the square of the final m-axis command voltage Vm to thereby calculate an initial value Vn0 of the amplitude voltage Vn. Thereafter, the inverter control routine proceeds to step S20.

On the other hand, when the controller 30D determines that the control mode at the latest previous drive-signal generation period was set to the first control mode (YES in step S28), the inverter control routine proceeds to step S30a. In step S30a, the controller 30D initializes the integral gain term ΔVmi constituting the amplitude correction ΔVm in the amplitude correction calculator 32h to a predetermined third value. In step S30a, the controller 30D also initializes the integral gain term Vpi constituting the p-axis voltage Vp in the phase setter 30k to a predetermined fourth value.

In the fifth embodiment, the controller 30D initializes the integral gain term ΔVmi to the predetermined third value that is the subtraction of the voltage amplitude Vm calculated by the velocity multiplier 30h in step S18a from the initial value Vn0 of the voltage amplitude Vn in step S30a. In step S30a, the controller 30D also initializes the integral gain term Vpi to a latest previous integral gain term Vpi calculated in the latest previous drive-signal generation period.

When it is determined that the value of the modulation factor M is equal to or greater than the second specified value Mb (YES in step S31), the inverter control routine proceeds to step S33.

In step S33, the controller 30D performs the rectangular-pulse torque control, i.e. the phase control.

When transferring from the over-modulation torque control to the rectangular-pulse torque control, the controller 30D serves as, for example, means for performing the anti-windup task to perform the anti-windup task in step S34a. The anti-windup task aims to limit the amplitude correction ΔVm to be equal to or smaller than a predetermined correction limit, thus limiting the corrected voltage amplitude (Vm+ΔVm) being equal to or smaller than the predetermined upper limit Vlimit.

Specifically, the controller 30D subtracts the sum of the voltage amplitude Vm and the proportional gain term ΔVmp constituting the amplitude correction ΔVl from the predetermined upper limit Vlimit in step S34a. Then, the controller 30D determines whether the integral gain term ΔVmi exceeds the result of the subtraction in step S34a. When it is determined that the integral gain term ΔVmi exceeds the result of the subtraction, the controller 30D replaces the integral gain term ΔVmi with the result of the subtraction in step S34a, thus limiting the integral gain term ΔVmi to be equal to or less than the value given by (Vlimit−Vm−ΔVmp). In other words, the controller 30D limits the corrected amplitude (Vm+ΔVm) to be equal to or smaller than the predetermined upper limit Vlimit.

Following the operation in step S32 or S34a, the controller 30D divides the sum of the voltage amplitude Vl and the voltage correction ΔVl by half of the input voltage VINV to obtain a quotient in step S38a. Then, the controller 30D divides the quotient by $\sqrt{1.5}$, i.e $$\sqrt{\frac{2}{3}},$$

thus calculating a value of the modulation factor M in step S38a. After completion of the operation in step S38a, the inverter control routine proceeds to step S40.

As described above, the control system 50D according to the fifth embodiment transfers from the over-modulation torque control to the rectangular-pulse torque control without changing from the structure of performing the over-modulation torque control to the structure of performing the rectangular-pulse torque control. In addition, the control system 50D suppresses interference between the amplitude control and the phase control. Thus, the control system 50D according to the fifth embodiment achieves substantially the same advantages as those achieved by the control system 50C according to the fourth embodiment.

Each of the first to fifth embodiments can be modified as follows.

The control apparatus 50A according to the second embodiment can variably set each of the feedback gains Kpv and Kiv, which are used by the amplitude correction calculator 32f, based on change of at least one of the electrical angular velocity ω and voltage phase φ. The control apparatus 50A according to the second embodiment can also be variably set each of the feedback gains Kpv and Kiv, which are used by the amplitude correction calculator 32f, based on at least one of currents, such as d- and q-axis currents Idr and Iqr, flowing in the motor-generator 10 and the torque of the motor-generator 10. How to variably set each of the feedback gains Kpv and Kiv will be described below.

The d- and q-axis voltages Vd and Vq are expressed by the following equations [eq29a] and [eq29b] assuming that the motor-generator 10 is driven in a steady state and the influence of the resistance R of each-phase armature winding is negligible:

$$Vd \approx -\omega \cdot Lq \cdot Iqr \quad [eq29a]$$

$$Vq \approx \omega(Ld \cdot Idr + \psi) \quad [eq29b]$$

This permits the voltage phase φ to be expressed by the following equation [eq30]:

$$\phi = \tan^{-1}\left(-\frac{Ld \cdot Idr + \psi}{Lq \cdot Iqr}\right) \quad [eq30]$$

During execution of the maximum torque control, determining the request torque Trq* uniquely determines each of the d- and q-axis currents Idr and Iqr from the equation [eq17]. This leads that determining the request torque Trq* determines the voltage phase φ from the equation [eq30]. Thus, using, in place of the voltage phase φ, the request torque Trq* and the electrical angular velocity ω permits each of the feedback gains Kpv and Kiv, which are used by the amplitude correction calculator 32f, to be set. For example, the control system 50A can set each of the feedback gains Kpv and Kiv such that a value of each of the feedback gains Kpv and Kiv increases with decrease of the request torque Trq*.

Note that using a surface permanent magnet synchronous motor (SPMSM), which is a non-salient-pole motor, as the motor-generator 10 makes the inductance Ld in the d-axis match with the inductance Lq in the q-axis. This permits each of the feedback gains Kpv and Kiv to be determined based on the q-axis current Iqr and the electrical angular velocity ω in accordance with the equations [eq 17] and [eq30]

The control apparatus 50A according to the second embodiment can variably set each of the feedback gains Kpφ and Kiφ, which are used by the phase setter 30e, based on change of at least one of the electrical angular velocity ω, voltage phase φ, and voltage amplitude Vn. The control apparatus 50A according to the second embodiment can also variably set each of the feedback gains Kpφ and Kiφ, which are used by the phase setter 30e, based on at least one of currents, such as d- and q-axis currents Idr and Iqr, flowing in the motor-generator 10 and the torque of the motor-generator 10. For example, the control system 50A can set each of the feedback gains Kpφ and Ki φ such that a value of each of the feedback gains Kpφ and Kiφ increases with decrease of the torque of the motor-generator 10 and/or decrease of the d- and q-axis currents Idr and Iqr. How to specifically set each of the feedback gains Kpφ and Kiφ is, for example, disclosed in Japanese Patent Application Publication No. 2012-085485 incorporated herein.

The control apparatuses 50B to 50D according to the third to fifth embodiments each can use the method of variably setting each of the feedback gains described in the second embodiment and its modifications.

The method of deriving the λ-axis is not limited to the method described in the first embodiment. For example, the following method can be used for deriving the λ-axis.

First, the λ-axis current change ΔIλ and the O-axis current change ΔIo in the λ-O coordinate system are expressed by the following equation [eq31] in accordance with the equation [eq6]:

$$\begin{bmatrix} \Delta I\lambda \\ \Delta Io \end{bmatrix} = \frac{Vn}{\omega}\begin{bmatrix} \cos\lambda & \sin\lambda \\ -\sin\lambda & \cos\lambda \end{bmatrix}\begin{bmatrix} \frac{\cos\phi}{Ld} \\ \frac{\sin\phi}{Lq} \end{bmatrix}\Delta\phi = \frac{Vn}{\omega}\begin{bmatrix} \frac{\cos\phi\cos\lambda}{Ld} + \frac{\sin\phi\sin\lambda}{Lq} \\ \frac{\cos\phi\cos\lambda}{Ld} + \frac{\sin\phi\sin\lambda}{Lq} \end{bmatrix}\Delta\phi \quad [eq31]$$

Setting the term associating the λ-axis current change ΔIλ with the infinitesimal change Δφ of the voltage phase φ in the equation [31] to zero permits the λ-axis current Iλr be independent from change of the voltage phase φ. This derives the following equation [eq32]:

$$\frac{\cos\phi\cos\lambda}{Ld} + \frac{\sin\phi\sin\lambda}{Lq} = 0 \quad [eq32]$$

Solving the equation [eq32] with respect to λ derives the following equation [eq33]:

$$\lambda = \tan^{-1}\left(-\frac{Lq}{Ld}\frac{1}{\tan\phi}\right) = -\tan^{-1}\left(\frac{Lq}{Ld}\frac{1}{\tan\phi}\right) = \tan^{-1}\left(\frac{Ld}{Lq}\tan\phi\right) - \frac{\pi}{2} \quad [eq33]$$

The equation [eq33] shows that a coordinate axis, in which change of the voltage vector Vnvt becomes zero when the present voltage phase φ changes by an infinitesimal value Δφ, is set as the λ-axis. Note that setting the λ-axis from the equation [eq33] requires that the polarity of each of the feedback gains Kpv and Kiv used by the amplitude correction calculator 32f is revered from the polarity of a corresponding one of the feedback gains Kpv and Kiv according to the first embodiment.

The controller of each of the control apparatuses 50 to 50D according to the first to fifth embodiments can perform the feedback control by at least one of the phase setter 30e and the amplitude correction calculator 32f in accordance with an integral feedback algorithm or a proportional-derivative (PD) feedback algorithm or a PID algorithm.

Each of the first to fifth embodiments can eliminate the command-voltage setter 30f and the velocity multiplier 30h from a corresponding controller. This modification can use the λ-axis current Iλ to set each of the feedback gains Kpv and Kiv to be a higher value, resulting in maintenance of a higher controllability of the torque of the motor-generator 10.

The controller of each of the control apparatuses 50 to 50D according to the first to fifth embodiments can set a non-interference axis, i.e. a λ-axis, in the d-q coordinate system; the non-interference axis extends in a direction slightly different from the direction that is perpendicular to the changing direction of the current vector Invt. This modification achieves advantages identical to those achieved by a corresponding embodiment.

The method of setting a non-interference axis, i.e. an λ-axis, in the d-q coordinate system is not limited to the methods disclosed in the respective embodiments.

For example, let us assume that, when the rpm of the rotor 10a of the motor-generator 10a is within a low rpm range so that the relations R<<ω·Ld and R<<ω·Lq are not satisfied. In this assumption, a modified method of setting a non-interference axis, i.e. an λ-axis, in the d-q coordinate system can use the resistance R of each-phase armature winding when calculating the λ-axis. Specifically, this assumption permits the equation [eq6] to be modified as the following equation [eq34], and the equation [eq7] to be modified as the following equation [eq35]:

$$\begin{bmatrix} \Delta Id\phi \\ \Delta Iq\phi \end{bmatrix} = \begin{bmatrix} R & -\omega \cdot Lq \\ \omega \cdot Ld & R \end{bmatrix} \begin{bmatrix} Vd\phi - Vd \\ Vq\phi - Vq \end{bmatrix} = \qquad [eq34]$$

$$\frac{Vn}{R^2 + LdLq\omega^2} \begin{bmatrix} -R\sin\phi + \omega Lq\cos\phi \\ R\cos\phi + \omega Ld\sin\phi \end{bmatrix} \Delta\phi$$

$$\alpha = \tan^{-1}\left(\frac{\Delta Iq\phi}{\Delta Id\phi}\right) = \tan^{-1}\left(\frac{R\cos\phi + \omega Ld\sin\phi}{-R\sin\phi + \omega Lq\cos\phi}\right) \qquad [eq35]$$

Substituting the change direction a of the current vector Invt calculated from the equations [eq34] and [eq35] permits the angle λ between the d-axis and the λ-axis to be calculated.

In addition, a sufficiently smaller value between the inductance Ld in the d-axis and the inductance Lq in the q-axis causes the value (Ld/Lq) to become close to 1. This enables the λ-axis to be determined from only the voltage phase φ in accordance with the equation [eq7]. Using an SPMSM, whose Ld/Lq is 1, as the motor-generator 10 also enables the λ-axis to be determined from only the voltage phase φ in accordance with the equation [eq7].

The drive signal generator 30j compares in amplitude each of three-phase sinusoidal command voltages with a triangular carrier signal, and generates, based on the results of the comparison, the drive signals gα# when performing at least the sinusoidal PWM control or over-modulation torque control. The present disclosure is however not limited to the comparing method.

A controller according to a first modification of each of the first to fifth embodiments includes a plurality of line-to-line voltage patterns, i.e. line-to-line pulse voltage patterns. Each of the line-to-line voltage patterns is designed to match with a value of the amplitude Vn of the output voltage vector Vnvt within a predetermined range for which the voltage amplitude Vn is variable. The plurality of line-to-line voltage patterns are stored in the memory 30ME of the controller or an external memory provided outside the controller.

The drive signal generator 30j of the controller according to the first modification selects one of the plurality of line-to-line voltage patterns stored in the memory 30ME or the external memory; the selected line-to-line voltage pattern matches with a value of the voltage amplitude Vn obtained by the corrector 30i. Then, the drive signal generator 30j converts the selected line-to-line voltage pattern into an on-off pulse pattern for each of the switching elements Sα#. Subsequently, the drive signal generator 30j determines output timings of pulses included in the on-off pulse pattern for each of the switching elements Sα# according to the voltage phase φ obtained by the phase setter 30e. This generates drive signals gα# for the respective switching elements Sα#.

How to convert line-to-line voltage patterns into pulse patterns for driving the control terminal of a switching element is for example disclosed in "Pulse Harmonics Modulation with Reducing Pulse Number of Inverter for High Efficient Motor Drive", 2010 Annual Conference of I.E.E. of Japan, Industry Application Society, 1-134, pp. I-627 to I-632. This disclosure is incorporated entirely herein by reference.

The drive signal generator 30j generates, based on the voltage amplitude Vn and the phase φ of the output voltage vector Vnvt, three-phase sinusoidal command voltages that are shifted by an electrical angle of 2π/3 radian, i.e. 120 electrical degrees, in phase from each other, but the present disclosure is not limited thereto.

Specifically, the drive signal generator 30j according to a second modification of each of the first to fifth embodiments superimposes triple harmonics on each of three-phase sinusoidal command voltages to thereby generate modified three-phase command voltages. This method performed by the drive signal generator 30j according to the second modification is disclosed in, for example, "Actual Theory and Design of AC Servo System", 1990, SOGO ELECTRONICS PRESS.

The controller of each of the control apparatuses 50 to 50D according to the first to fifth embodiments uses estimated torque Te to perform the phase control, but the present disclosure is not limited thereto. Specifically, the torque estimator 30b can include a torque meter for measuring actual torque actually generated by the motor-generator 10, and use the measured actual torque in place of the estimated torque Te to perform the phase control.

The controller of each of the control apparatuses 50 to 50D according to the first to fifth embodiments uses estimated torque Te that is a parameter indicative of a controlled variable of the motor-generator 10, but the present disclosure is not limited thereto. Another controlled variable of the motor-generator 10 can be used for the torque control. For example, the controller of each of the control apparatuses 50 to 50D can be configured to use an O-axis current flowing in the O-axis perpendicular to the λ-axis. In this modification, the controller performs the phase control such that the O-axis current follows an O-axis command current input from, for example, the control system 26.

If the control system 26 serves as a system for controlling an actual rotational speed, i.e. rpm, of the motor-generator 10, which is a controlled variable thereof, using the rpm deviation of the actual rpm from a request rpm, the controller of each of the control apparatuses 50 to 50D can be configured to perform the phase control directly using the rpm deviation input from the control system 26. This configuration permits calculation of the torque deviation of the estimated torque Te from the request torque Trq*, and calculation of the voltage phase φ based on the torque deviation to be eliminated. This configuration can perform the amplitude control using the current deviation ΔIλ between the corrected λ-axis current Iλr and the λ-axis command current iλ*. This configuration also permits the λ-axis command current calculator 32c to determine a λ-axis command current Iλ* using information including a map in data-table format and/or one or more model equations, and the estimated torque Te. Specifically, the information, which is for example stored in the memory 30ME, includes a function, i.e. correlation, of values of the λ-axis command current Iλ* with respect to values of the estimated torque Te. That is, the λ-axis command current calculator 32c refers to the information using an input value of the estimated torque Te. Then, the λ-axis command current calculator 32c extracts a value of the λ-axis command current Iλ*, which matches with the input value of the estimated torque Te. This extraction obtains the value of the λ-axis command current Iλ*. That is, this configuration achieves advantages that are identical to those achieved by the control system 50 according to the first embodiment.

The controller of each of the control apparatuses 50 to 50D according to the first to fifth embodiments can calculate the λ-axis current Iλr directly using the three-phase currents Iu, Iv, and Iw without using the d- and q-axis currents Id and Iq and the equation [eq10]. For example, the λ-axis setter 32a of the controller can be configured to calculate the λ-axis current Iλr directly using a function, i.e. a correlation, among the angle λ between d-axis and the λ-axis, the λ-axis current Iλr, the three-phase currents Iu, Iv, and Iw, and the electrical angle θ. The λ-axis command current calculator 32c of each of the control apparatuses 50 to 50D can calculate the λ-axis current Iλr using a function, i.e. a correlation, between the λ-axis current Iλr and the d- and q-axis command currents Id* and Iq*, or a function, i.e. a correlation, between the λ-axis current Iλr and the request torque Trq*.

The controller 30C of the control apparatus 50C according to the fourth embodiment includes the current-feedback control unit, which includes the modules 38a to 38i illustrated in FIG. 20, for performing the sinusoidal current-feedback PWM control in the first control mode when the modulation factor M is less than the first specified value Ma. The present disclosure is however not limited to the configuration.

Specifically, the controller 30C can perform in the torque control by the torque unit illustrated in FIG. 2 (FIG. 20) in the first control mode when the modulation factor M is less than the first specified value Ma.

It is desirable that the controller 30C according to this modification selects one of coordinate systems respectively defined for the first control mode and the second control mode, and performs a selected one of the first control mode and the second control mode in accordance with the corresponding one of the selected coordinate systems. In this modification, the controller 30C should select, for example, the d-q coordinate system when selecting the first control mode, and should select, for example, the λ-O coordinate system when selecting the second control mode.

The controller 30C can calculate the d- and q-axis non-interference terms based on the respective d- and q-axis command currents Id* and Iq*. The d-axis command voltage calculator 38c can calculate the d-axis command voltage Vd* in accordance with a PID algorithm using the d-axis deviation ΔId as its input. Similarly, the q-axis command voltage calculator 38d can calculate the q-axis command voltage Vq* in accordance with a PID algorithm using the q-axis deviation ΔIq as its input.

The controller 30C can include an observer that estimates the electrical rotational angle θ of the rotor 10a of the motor-generator 10 without using the rotational angle sensor 46.

The controller 30D of the control apparatus 50D according to the fifth embodiment includes the current-feedback control unit, which includes the modules 39a to 39g illustrated in FIG. 23, for performing the sinusoidal current-feedback PWM control in the first control mode when the modulation factor M is less than the first specified value Ma. The present disclosure is however not limited to the configuration.

Specifically, the controller 30D can perform the torque control by the torque unit illustrated in FIG. 2 (FIG. 23) or the current-feedback PWM control illustrated in FIG. 20 in the first control mode when the modulation factor M is less than the first specified value Ma.

It is desirable that the controller 30D according to this modification selects one of coordinate systems respectively defined for the first control mode and the second control mode, and performs a selected one of the first control mode and the second control mode in accordance with the corresponding one of the selected coordinate systems. In this modification, the controller 30D should select, for example, the d-q coordinate system when selecting the first control mode, and should select, for example, the λ-O coordinate system when selecting the second control mode.

The controller 30D can calculate the p- and m-axis non-interference terms based on the p- and m-axis command currents Ip* and Im*. The p-axis command voltage calculator 39f can calculate the p-axis command voltage Vp* in accordance with a PID algorithm using the p-axis deviation ΔIp as its input. Similarly, the m-axis command voltage calculator 39g can calculate the m-axis command voltage Vm* in accordance with a PID algorithm using the m-axis deviation ΔIm as its input.

The controller 30D can include an observer that estimates the electrical rotational angle θ of the rotor 10a of the motor-generator 10 without using the rotational angle sensor 46.

Each of the first to fifth embodiments uses an IPMSM as an example of rotary machines, but can use another type rotary machine, such as an SPMSM or a wound-field synchronous motor. Rotary machines according to the present disclosure are not limited to synchronous machines. An SPMSM used as the motor-generator 10 according to the first embodiment permits a q-axis current to be used as a controlled variable of the SPMSM because the torque of the SPMSM is defined based on the q-axis current. Induction machines can be used as rotary machines according to the present disclosure. Various types of rotary machines according to the present disclosure can be installed in various types of vehicles, such as an electric automobile. Rotary machines to which the present disclosure is applied are not limited to a component, such as a main engine, of vehicles. Specifically, rotary machines to which the present disclosure is applied can be installed in electric power steering systems and electrical compressors for air conditioning systems.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for feedback controlling a controlled variable of a rotary machine based on a phase of an output voltage vector of a power converter including a switching element, the apparatus comprising:
    an interference-reduction current calculator configured to calculate, as an interference reduction current, a component of a current vector flowing in a coordinate axis in a rotating coordinate system defined with respect to a rotor of the rotary machine, the coordinate axis serving as an interference reduction coordinate axis, the component of the current vector flowing in the interference reduction coordinate axis and having reduced interference from change of the phase of the output voltage vector;

an amplitude setter configured to set, as a manipulated variable for feedback controlling the interference reduction current to a command current value based on a command value for the controlled variable, one of:
an amplitude of the output voltage vector, and
an amplitude parameter indicative of a component of the output voltage vector, the component of the output voltage vector depending on the amplitude of the output voltage vector; and a switching unit configured to perform switching operations of the switching element of the power converter based on the manipulated variable and the phase of the output voltage vector, thus causing the controlled variable to follow the command value.

2. An apparatus for controlling a controlled variable of a rotary machine based on electric power converted by a power converter including a switching element, the apparatus comprising:

a phase setter configured to set, as a first manipulated variable for feedback controlling the controlled variable to a command value, one of:
a phase of an output voltage vector of the power converter in a rotating coordinate system defined with respect to a rotor of the rotary machine, and
a phase parameter indicative of one of a first component and a second component of the output voltage vector in an orthogonal coordinate system having a first axis and a second axis, the first axis and the second axis being perpendicular to each other, one of the first component and the second component depending on the phase of the output voltage vector;

an interference-reduction current calculator configured to calculate, as an interference-reduction current, a component of a current vector flowing in a coordinate axis in the rotating coordinate system, the coordinate axis serving as an interference reduction coordinate axis, the component of the current vector flowing in the interference reduction coordinate axis and having reduced interference from change of the phase of the output voltage vector;

an amplitude setter configured to set, as a second manipulated variable for feedback controlling the interference reduction current to a command current value based on the command value, one of:
an amplitude of the output voltage vector, and
an amplitude parameter indicative of the other of the first component and the second component of the output voltage vector in the orthogonal coordinate system, the other of the first component and the second component depending on the amplitude of the output voltage vector; and a switching unit configured to perform switching operations of the switching element of the power converter based on the first manipulated variable and the second manipulated variable to match the controlled variable with the command value.

3. The apparatus according to claim 2, wherein, when the first manipulated variable changes by an infinitesimal value so that the current vector changes in a direction, the interference reduction coordinate axis is set to be substantially perpendicular to the changing direction of the current vector.

4. The apparatus according to claim 2, wherein, when the first manipulated variable changes by an infinitesimal value, the interference reduction coordinate axis is set to be a coordinate axis in which dy/dx becomes zero, dx representing the infinitesimal value, dy representing a change of the current vector resulted from change of the first manipulated variable by the infinitesimal value.

5. The apparatus according to claim 3, further comprising:
an interference reduction coordinate axis setter configured to set the interference reduction coordinate axis according to at least one of the phase of the output voltage vector and an inductance of the rotary machine,
wherein the interference-reduction current calculator is configured to calculate the interference reduction current using the interference reduction coordinate axis set by the interference reduction coordinate axis setter.

6. The apparatus according to claim 4, further comprising:
an interference reduction coordinate axis setter configured to set the interference reduction coordinate axis according to at least one of the phase of the output voltage vector and an inductance of the rotary machine,
wherein the interference-reduction current calculator is configured to calculate the interference reduction current using the interference reduction coordinate axis set by the interference reduction coordinate axis setter.

7. The apparatus according to claim 3, further comprising:
an interference reduction coordinate axis setter configured to set the interference reduction coordinate axis according to at least one of:
a pair of the first component and the second component of the output voltage vector, and
an inductance of the rotary machine,
wherein the interference-reduction current calculator is configured to calculate the influence reduction current using the interference reduction coordinate axis set by the interference reduction coordinate axis setter.

8. The apparatus according to claim 4, further comprising:
an interference reduction coordinate axis setter configured to set the interference reduction coordinate axis according to at least one of:
a pair of the first component and the second component of the output voltage vector, and
an inductance of the rotary machine,
wherein the interference-reduction current calculator is configured to calculate the influence reduction current using the interference reduction coordinate axis set by the interference reduction coordinate axis setter.

9. The apparatus according to claim 2, further comprising:
a torque estimator configured to estimate torque generated by the rotary machine as the controlled variable.

10. The apparatus according to claim 2, wherein:
the amplitude setter is configured to perform feedback control including at least a feedback gain based on a deviation between the interference reduction current and the command current to set the second manipulated variable according to a result of the feedback control,
the apparatus further comprising:
an amplitude gain setter configured to variably set the feedback gain of the feedback control according to a setting parameter, the setting parameter including at least one of a rotational velocity of the rotor of the rotary machine, torque generated by the rotary machine, a current flowing in the rotary machine, and the phase of the output voltage vector.

11. The apparatus according to claim 10, wherein:
the amplitude gain setter is configured to variably set the feedback gain independently of a value of the setting parameter to thereby maintain, at a constant level, a response of the influence reduction current with respect to the command current.

12. The apparatus according to claim 2, wherein:
the phase setter is configured to perform feedback control including at least a feedback gain based on a deviation between the controlled variable and the command value to set the first manipulated variable based on a result of the feedback control, the apparatus further comprising:
a phase gain setter configured to variably set the feedback gain of the feedback control according to a setting parameter, the setting parameter including at least one of a rotational velocity of the rotor of the rotary machine, torque generated by the rotary machine, a current flowing in the rotary machine, the phase of the output voltage vector, and an output voltage of the power converter.

13. The apparatus according to claim 2, wherein:
the phase gain setter is configured to variably set the feedback gain independently of a value of the setting parameter to thereby maintain, at a constant level, a response of the controlled variable with respect to the command value.

14. The apparatus according to claim 2, wherein:
the phase setter comprises a first integrator for setting the first manipulated variable, and the amplitude setter comprises a second integrator for setting the second manipulated variable, the apparatus further comprising:
means for performing one of:
    first control to manipulate both the first manipulated variable and the second manipulated variable to thereby control the controlled variable to match with the command value; and
    second control to manipulate only the first manipulated variable to thereby control the controlled variable to match with the command value;
means for transferring the first control of the performing means to the second control when the second manipulated variable reaches an upper limit; and
means for performing anti-windup task that limits an integral term of the second integrator to thereby prevent the second manipulated variable from exceeding the upper limit when the first control of the performing means is transferred to the second control.

15. The apparatus according to claim 2, wherein:
the switching unit is a first switching unit that performs first switching operations that are the switching operations of the switching element when a modulation factor of the power converter is equal to or greater than a specified value, the modulation factor being defined based on an input voltage to the power converter and an output voltage of the power converter, and
the rotating coordinate system includes a third axis and a fourth axis perpendicular to each other, the apparatus further comprising:
a command current setter configured to set a command current vector to flow in the rotary machine, the command current vector being required to control the controlled variable to match with the command value,
the command current vector including a first command current component projected on one of the first axis and the third axis, and a second command current component projected on one of the second axis and the fourth axis;
an actual current calculator configured to calculate a first actual current component and a second current component of a current vector actually flowing in the rotary machine,
the first actual current component being projected on one of the first axis and the third axis,
the second actual current component being projected on one of the second axis and the fourth axis;
a command voltage calculator configured to calculate a command voltage to be applied to the rotary machine;
means for calculating a command voltage to be applied to the rotary machine as a manipulated variable for feedback controlling the first actual current component to match with the first command current component and the second actual current component to match with the second command current component; and
a second switching unit that performs second switching operations of the switching element based on the command voltage when the modulation factor of the power converter is smaller than the specified value.

* * * * *